(12) United States Patent
Mulligan et al.

(10) Patent No.: US 7,555,410 B2
(45) Date of Patent: *Jun. 30, 2009

(54) CIRCUIT FOR USE WITH MULTIFUNCTION HANDHELD DEVICE WITH VIDEO FUNCTIONALITY

(75) Inventors: Daniel Mulligan, Austin, TX (US); Marcus W. May, Austin, TX (US); Matthew Brady Henson, Austin, TX (US); Debby Gumto Clarke, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 233 days.

This patent is subject to a terminal disclaimer.

(21) Appl. No.: 11/494,798

(22) Filed: Jul. 27, 2006

(65) Prior Publication Data

US 2007/0052793 A1 Mar. 8, 2007

Related U.S. Application Data

(63) Continuation-in-part of application No. 10/723,710, filed on Nov. 26, 2003, now Pat. No. 7,130,980, and a continuation-in-part of application No. 10/603,640, filed on Jun. 25, 2003.

(60) Provisional application No. 60/429,941, filed on Nov. 29, 2002.

(51) Int. Cl.
*G01R 31/36* (2006.01)

(52) U.S. Cl. ............................. 702/185; 702/63; 702/64

(58) Field of Classification Search ................. 702/185, 702/36, 63, 64, 119, 123, 182, 183; 386/95, 386/109; 381/3

See application file for complete search history.

(56) References Cited

U.S. PATENT DOCUMENTS 3,609,504 A 9/1971 Barker et al.

(Continued)

OTHER PUBLICATIONS

Decision of Board of Patent Appeals and Interferences, USPTO, Appeal 2008-1596, U.S. Appl. No. 10/603,640, Decided Oct. 30, 2008.

*Primary Examiner*—Manuel L Barbee
(74) *Attorney, Agent, or Firm*—Ingrassia, Fisher & Lorenz, P.C.

(57) ABSTRACT

A circuit for use by a multifunction handheld device is coupleable to an audio output device, the multifunction handheld device including a color video display device and a host interface that is coupleable to a host device. The circuit includes a processing module and a memory interface, operably coupled to a memory that stores a plurality of digitally formatted files, and that stores operational instructions that cause the processing module to receive a first digitally formatted file of the plurality of digitally formatted files from the host device when coupled to the host device via the host interface and store the first digitally formatted file in the memory, wherein the first digitally formatted file includes a compressed audio file; receive a second digitally formatted file of the plurality of digitally formatted files from a host device when coupled to the host device via a host interface and store the second digitally formatted file in the memory, wherein the second digitally formatted file includes a compressed video file; playback a selected one of the plurality of digitally formatted files, the playback including the generation of an audio output signal for the audio output device, when the first digitally formatted file is selected, and the playback including rendering the selected one of the digitally formatted files for the color video display device, when the second digitally formatted file is selected.

49 Claims, 30 Drawing Sheets

U.S. PATENT DOCUMENTS

| | | | |
|---|---|---|---|
| 3,925,708 A | 12/1975 | Picciochi | |
| 4,207,527 A | 6/1980 | Abt | |
| 5,018,148 A | 5/1991 | Patel et al. | |
| 5,268,845 A | 12/1993 | Startup et al. | |
| 5,311,441 A | 5/1994 | Tayama et al. | |
| 5,514,946 A | 5/1996 | Lin et al. | |
| 5,602,963 A | 2/1997 | Bissonnette et al. | |
| 5,604,708 A | 2/1997 | Helms et al. | |
| 5,691,619 A | 11/1997 | Vingbo | |
| 5,815,584 A | 9/1998 | Whitecar et al. | |
| 5,949,632 A | 9/1999 | Barreras, Sr. et al. | |
| 5,978,924 A | 11/1999 | Ahn | |
| 6,169,669 B1 | 1/2001 | Choudhury | |
| 6,201,319 B1 | 3/2001 | Simonelli et al. | |
| 6,243,315 B1 | 6/2001 | Goodman | |
| 6,310,556 B1 | 10/2001 | Green et al. | |
| 6,339,526 B1 | 1/2002 | Aboyoussef et al. | |
| 6,388,961 B1 | 5/2002 | Ijichi | |
| 6,493,758 B1 | 12/2002 | McLain | |
| 6,505,055 B1 * | 1/2003 | Kahn et al. | 455/564 |
| 6,590,369 B2 | 7/2003 | Burstein et al. | |
| 6,592,521 B1 | 7/2003 | Urbano et al. | |
| 6,611,537 B1 | 8/2003 | Edens et al. | |
| 6,631,101 B1 | 10/2003 | Chan et al. | |
| 6,717,507 B1 | 4/2004 | Bayley et al. | |
| 6,735,456 B2 | 5/2004 | Cathey et al. | |
| 6,751,404 B1 | 6/2004 | Whitford et al. | |
| 6,751,561 B2 | 6/2004 | Oh | |
| 6,753,625 B2 | 6/2004 | Kelsey | |
| 6,760,618 B1 | 7/2004 | Inoue | |
| 6,760,635 B1 | 7/2004 | Bates et al. | |
| 6,763,470 B1 | 7/2004 | Bell et al. | |
| 6,832,293 B1 | 12/2004 | Tagawa et al. | |
| 6,868,451 B1 * | 3/2005 | Peacock | 709/231 |
| 6,895,449 B2 * | 5/2005 | Tasler | 710/16 |
| 6,928,567 B2 | 8/2005 | Nakai | |
| 7,039,742 B2 | 5/2006 | Lada et al. | |
| 7,058,484 B1 | 6/2006 | Potega | |
| 7,197,412 B2 * | 3/2007 | May et al. | 702/63 |
| 7,283,635 B1 | 10/2007 | Anderson et al. | |
| 2002/0180803 A1 * | 12/2002 | Kaplan et al. | 345/810 |
| 2003/0157920 A1 | 8/2003 | Liu et al. | |
| 2007/0155313 A1 | 7/2007 | Goldberg et al. | |

* cited by examiner multi-function handheld device 40 integrated circuit 12-2 integrated circuit 12-3 cell of GPIO

DAC 72 op amp 150 programmable driver 92 microphone bias 96 input interface 90 display interface system 250

DC to DC converter 26

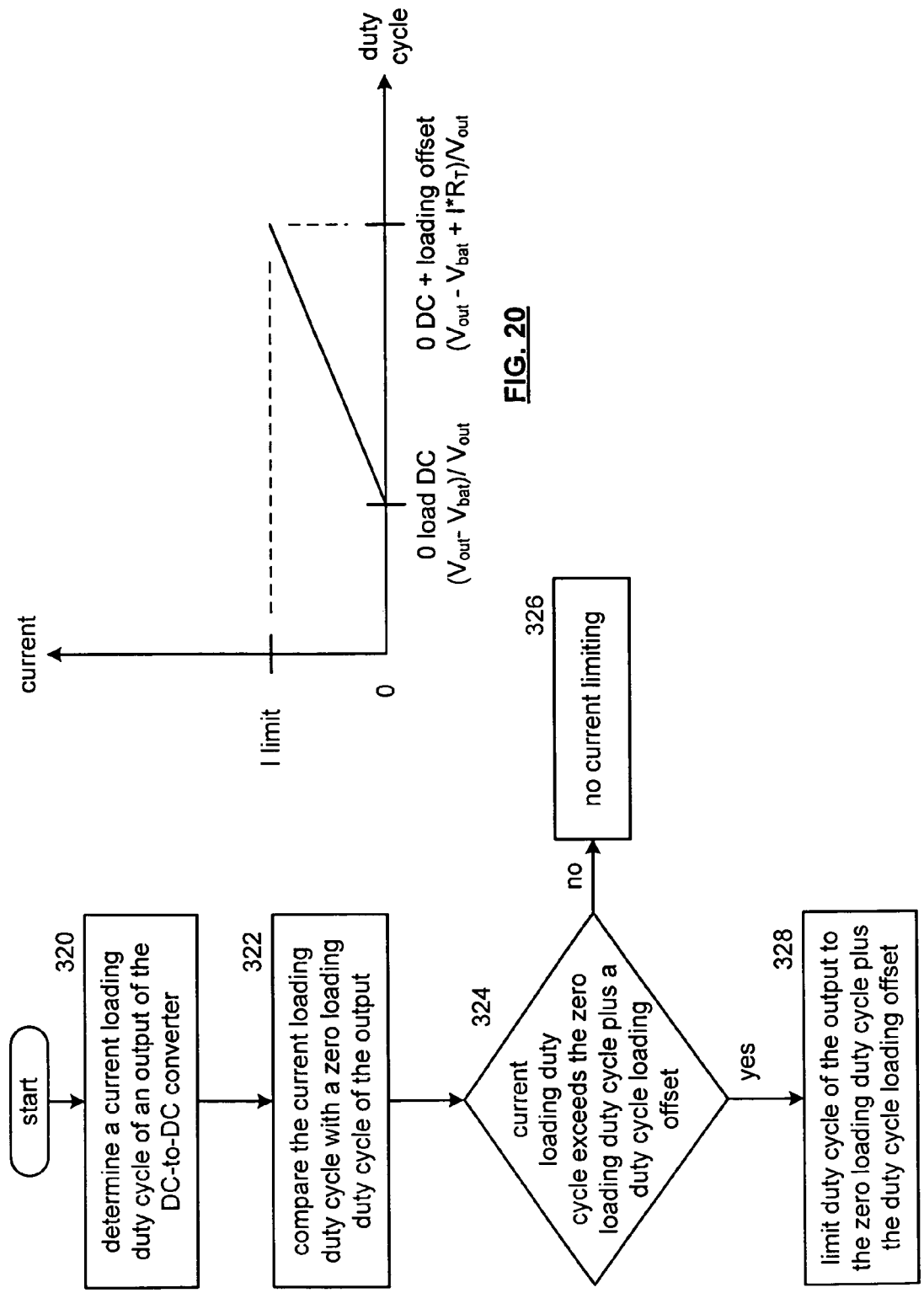

ESD protection circuit 330

ESD protection circuit 335

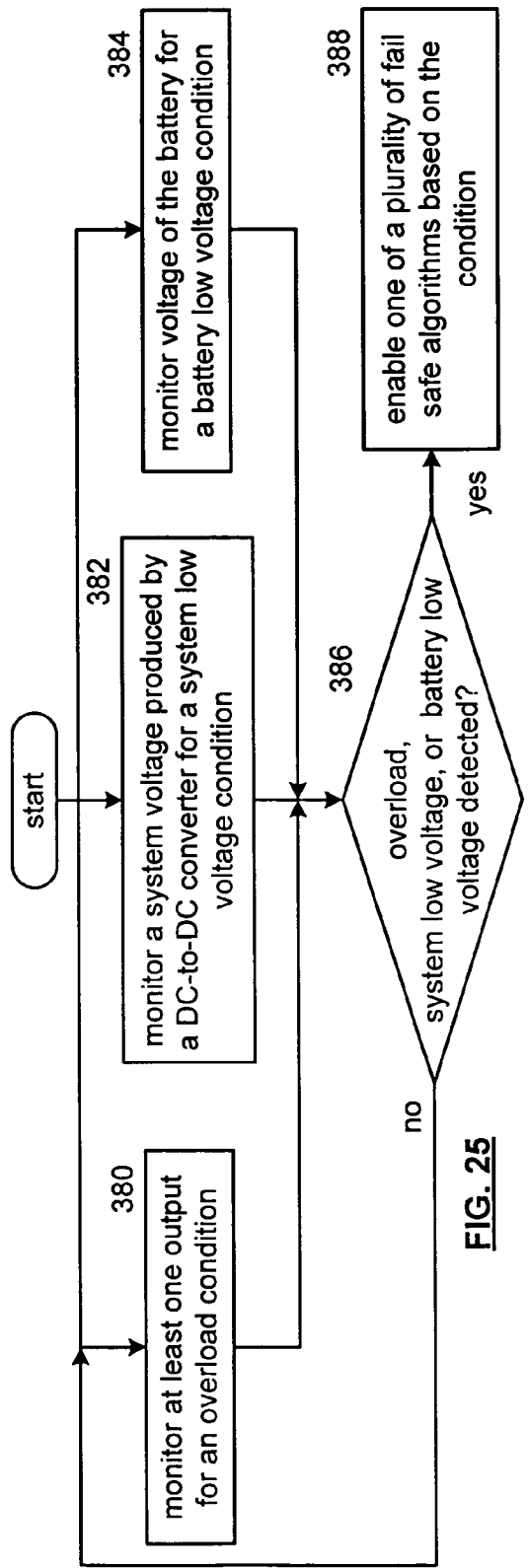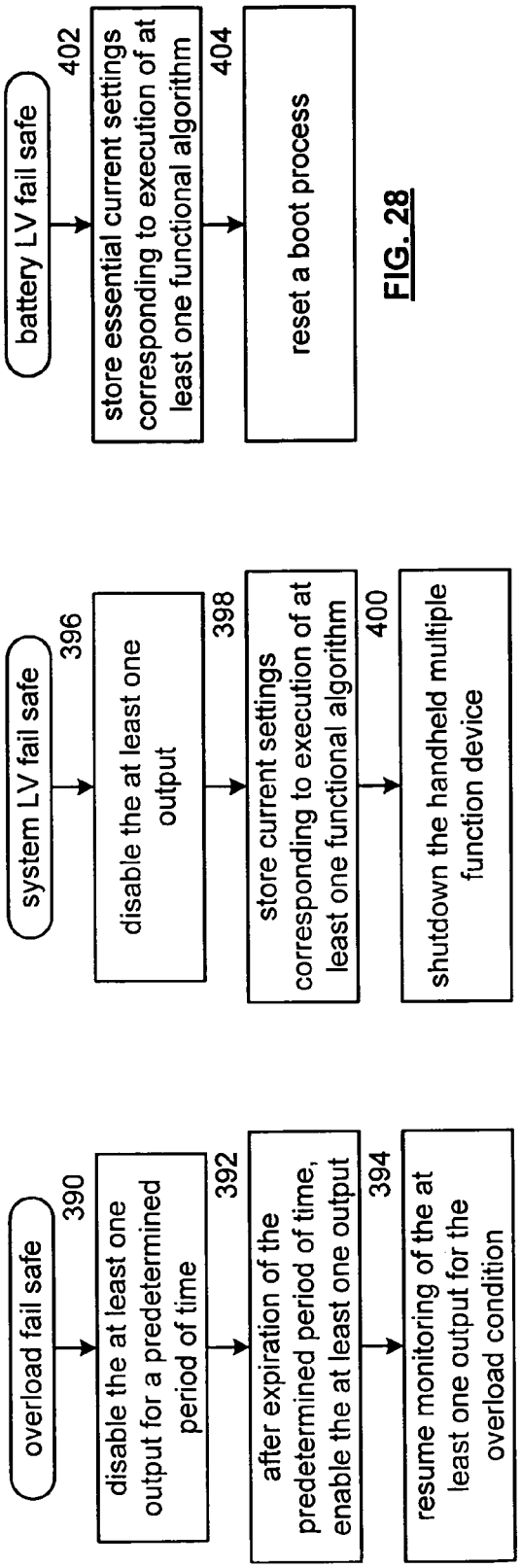

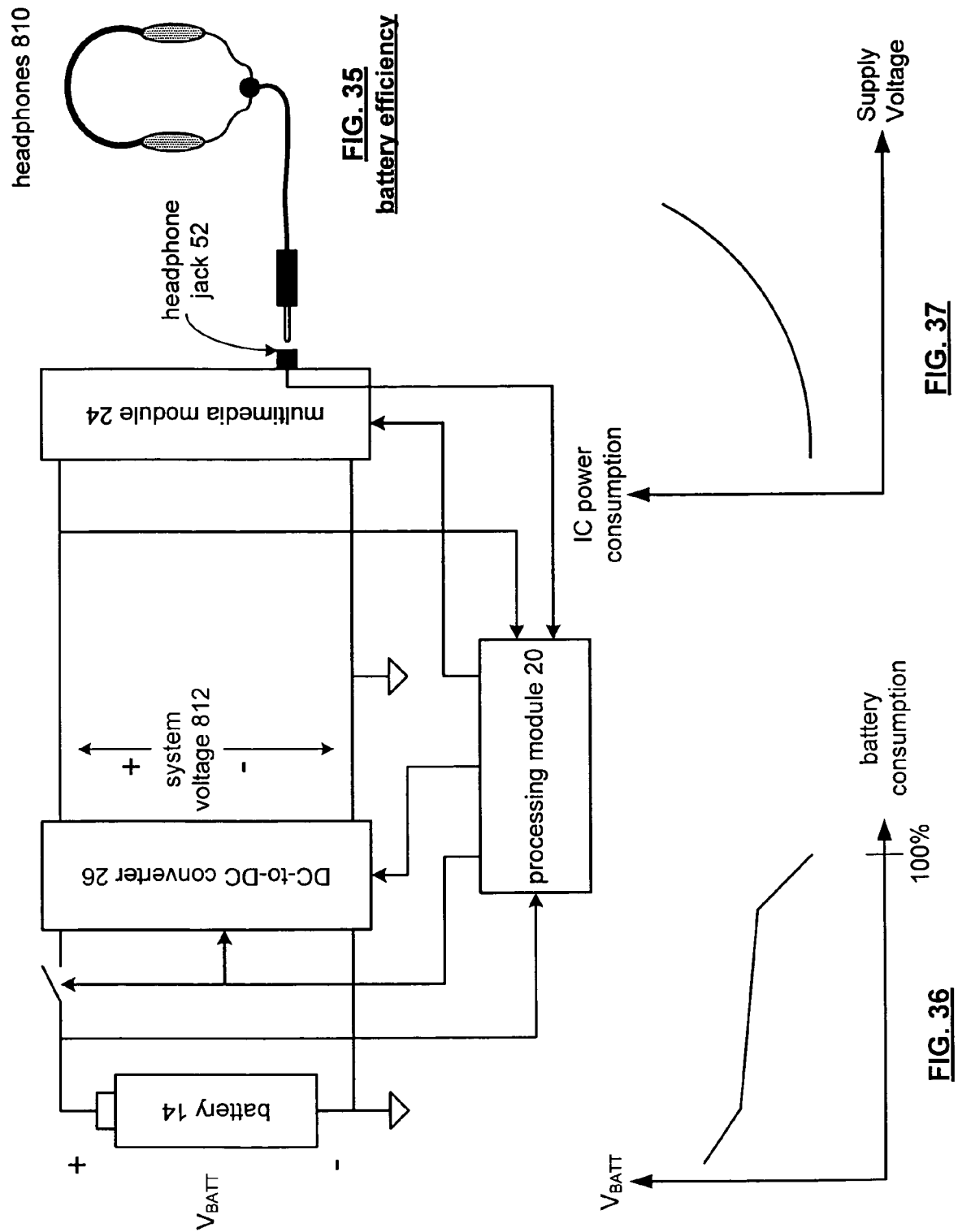

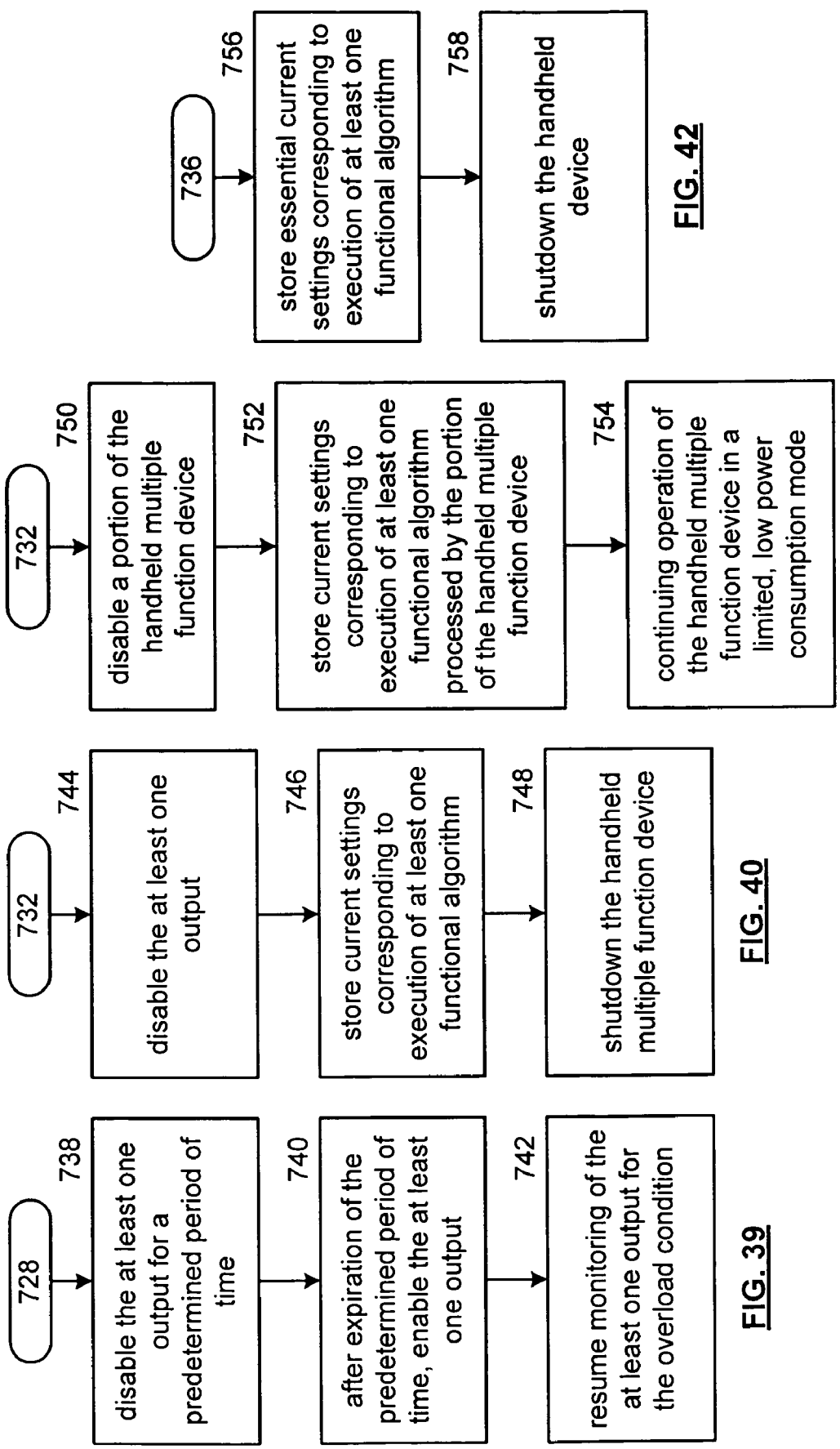

CIRCUIT FOR USE WITH MULTIFUNCTION HANDHELD DEVICE WITH VIDEO FUNCTIONALITY

CROSS REFERENCE TO RELATED PATENTS

This patent is a continuation-in-part of U.S. patent application Ser. No. 10/603,640, entitled METHOD AND APPARATUS FOR EFFICIENT BATTERY USE BY A HANDHELD MULTIPLE FUNCTION DEVICE, filed on Jun. 25, 2003 that claims priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

This patent is a continuation-in-part of U.S. patent application Ser. No. 10/723,710, entitled USE OF A RESOURCE IDENTIFIER TO IMPORT A PROGRAM FROM EXTERNAL MEMORY FOR AN OVERLAY, filed on Nov. 26, 2003 now U.S. Pat. No. 7,130,980. that claims priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

BACKGROUND OF THE INVENTION

1. Technical Field of the Invention

This invention relates generally to portable electronic equipment and more particularly to an integrated circuit of a multi-function handheld device that is capable of playing back stored audio and video files.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices include one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person may need to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIG. 1 is a schematic block diagram of a handheld device and corresponding integrated circuit in accordance with one embodiment of the present invention.

FIG. 2 is a schematic block diagram of another handheld device and corresponding integrated circuit in accordance with one embodiment of the present invention.

FIG. 3 is a schematic block diagram of another integrated circuit in accordance with one embodiment of the present invention.

FIG. 4 is a schematic block diagram of yet another integrated circuit in accordance with one embodiment of the present invention.

FIG. 5 is a schematic block diagram of still another integrated circuit in accordance with one embodiment of the present invention.

FIG. 6 is a schematic block diagram of a further integrated circuit in accordance with one embodiment of the present invention.

FIG. 7 is a schematic block diagram of a cell of a general purpose input output interface in accordance with one embodiment of the present invention.

FIG. 8 is a schematic block diagram of a digital to analog converter in accordance with one embodiment of the present invention.

FIG. 9 is a schematic block diagram of a digital to analog converter in accordance with one embodiment of the present invention.

FIG. 10 is a schematic block diagram of an operational amplifier in accordance with one embodiment of the present invention.

FIG. 11 is a schematic block diagram of a programmable driver in accordance with one embodiment of the present invention.

FIG. 12 is a schematic block diagram of a microphone bias circuit in accordance with one embodiment of the present invention.

FIG. 13 is a schematic block diagram of an input interface system in accordance with one embodiment of the present invention.

FIG. 14 is a schematic block diagram of a display interface system in accordance with one embodiment of the present invention.

FIG. 15 is a diagram of a memory system in accordance with one embodiment of the present invention.

FIG. 16 is a diagram of a program random access memory in accordance with one embodiment of the present invention.

FIG. 17 is a schematic block diagram of another memory system in accordance with one embodiment of the present invention.

FIG. 18 is a schematic block diagram of a DC-to-DC converter in accordance with one embodiment of the present invention.

FIG. 19 is a logic diagram of a method for providing current limit in a DC-to-DC converter in accordance with one embodiment of the present invention.

FIG. 20 is a diagram corresponding to providing current limit in a DC-to-DC converter in accordance with one embodiment of the present invention.

FIG. 25 is a logic diagram of a method for providing efficient battery use in accordance with one embodiment of the present invention.

FIG. 26 is a logic diagram of a method for providing an overload fail-safe algorithm in accordance with one embodiment of the present invention.

FIG. 27 is logic diagram of a method for providing a system low voltage fail-safe algorithm in accordance with one embodiment of the present invention.

FIG. 28 is logic diagram of a method for providing a battery low voltage fail-safe algorithm in accordance with one embodiment of the present invention.

FIG. 35 is a schematic block diagram of the handheld device of FIGS. 1 and/or 2 consuming power and further managing the power consumption to provide efficient battery use in accordance with the present invention.

FIGS. 36 and 37 illustrate graphs regarding power consumption of a battery in accordance with the present invention.

FIG. 39 illustrates an example of a fail-safe algorithm for an overload condition in accordance with the present invention.

FIG. 40 illustrates an example of a fail-safe algorithm for a low system voltage condition in accordance with the present invention.

FIG. 41 illustrates an example of a fail-safe algorithm for a low system voltage condition in accordance with the present invention.

FIG. 42 illustrates an example of a fail-safe algorithm for a low battery voltage condition in accordance with the present invention.

DETAILED DESCRIPTION OF THE EMBODIMENTS OF THE INVENTION

The multi-function handheld device of the present invention substantially meets these needs and others. An embodiment of the device includes a host interface, a bus, a processing module, a memory interface, a multimedia module, and a DC-to-DC converter. The host interface is operable to receive or transmit data with a host device (e.g., personal computer, laptop computer, etc.) when the multi-function handheld device is operably coupled to the host device. The bus provides a medium for transmitting and/or receiving data between the host interface, the processing module, and the memory interface. The processing module functions to place the multi-function handheld device in a first functional mode when the host interface is operably coupled to the host device and places the multi-function handheld device in a second functional mode when the host interface is not operably coupled to the host device.

The memory interface is operably coupled to, when the multi-function handheld device is in the first functional mode, provide data received from the host device to memory coupled to the integrated circuit for storage. The memory interface also provides data retrieved from the memory to the host interface for transmission to the host device. The multimedia module is operably coupled to, when the multi-function handheld device is in the second functional mode, to convert data stored in the memory into rendered output data (e.g., prepares the data to be heard or seen). The DC to DC converter is operably coupled to provide at least a first supply voltage to at least one of the host interface, the processing module, the memory interface, and the multimedia module. With such an integrated circuit, a handheld device may provide multiple functions, thus reducing the burdens of handheld device users.

An embodiment of a handheld device includes the integrated circuit, a battery, and memory, which is coupled to the integrated circuit via the memory interface. The battery is operably coupled to the DC-to-DC converter, which produces therefrom the supply voltage(s) for the integrated circuit. The handheld device may further include a clock source, a speaker, a headphone jack, a microphone, a display, a video capture device, and/or an user input module (e.g., key pad).

Figure 1:
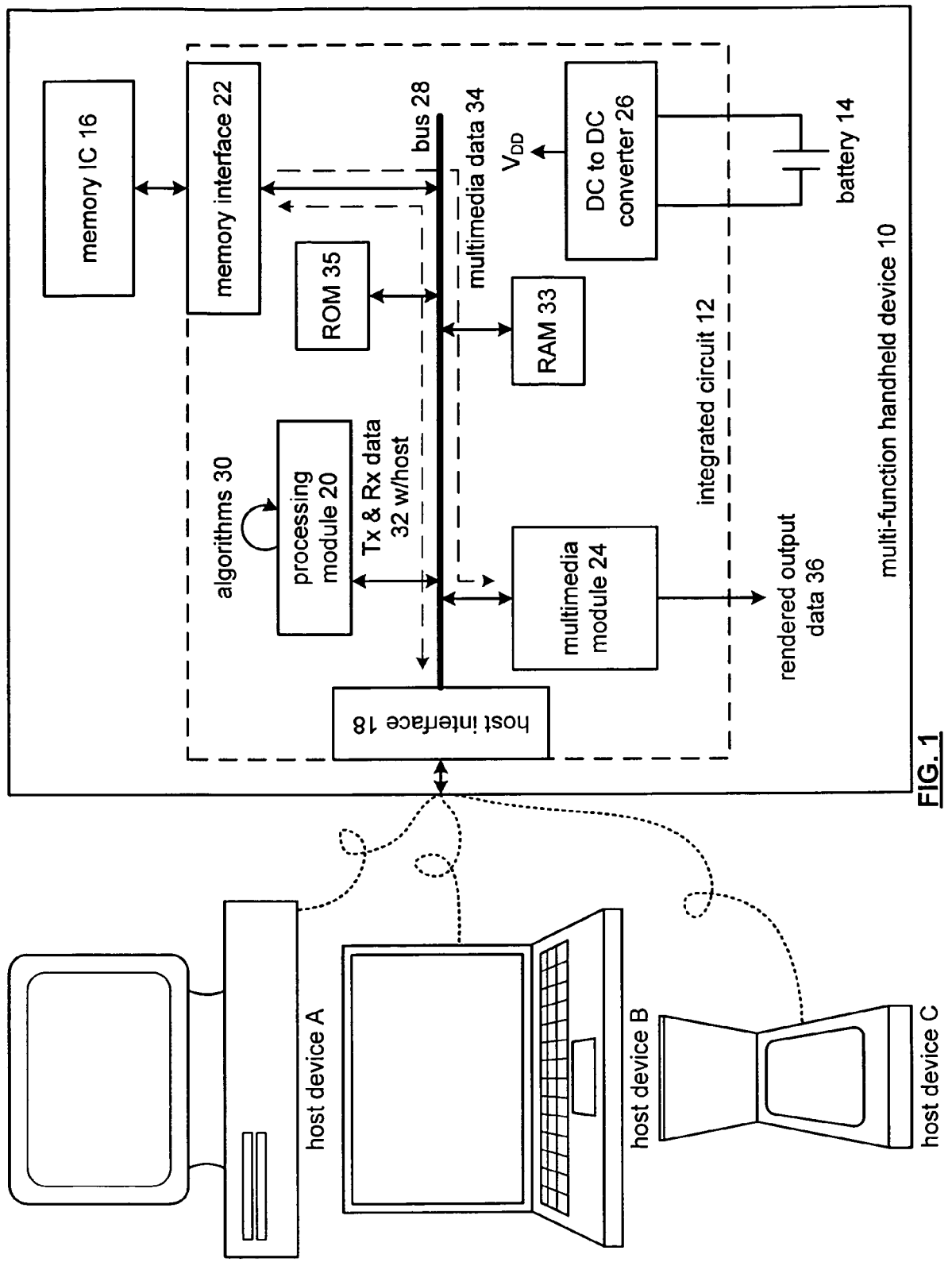

An embodiment of the invention uses an integrated circuit with internal memory that is limited in capacity. The internal memory uses a portion of its storage to provide an overlay space to load programs or portions of programs that are stored in a larger capacity external memory. In one technique, a single overlay space is used in which a main program accesses a stored prelude to identify the proper funclet program to be loaded. In another technique, multiple overlay spaces are established and configured to overlay different or similar functional programs (or portions of programs) in respective overlays. In one approach, a program statement uses an identifier for the function to be identified and an entry point for the access to the function when loaded. FIG. 1 is a schematic block diagram of a multi-function handheld device 10 and corresponding integrated circuit 12 operably coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat.

No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, which will be described in greater detail with reference to FIG. 15-17 and 23-28, where the corresponding operational instructions of the algorithm 30 are stored in memory 16 and/or in memory incorporated in the processing module 20.

The processing module 20 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30. The interoperability of the memory IC 16 and the integrated circuit 12 will be described in greater detail with reference to FIGS. 15-17 and FIGS. 29-34.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data may be formatted in a particular manner. For example, if the handheld device 10 is coupled to the host device via a USB cable, the received data may be in accordance with the format proscribed by the USB specification. The host interface module 18 converts the format of the received data (e.g., USB format) into a desired format by removing overhead data that corresponds to the format of the received data and storing the remaining data as data words. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode, the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

It is to be noted that the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture—, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. It is to be noted that when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Since these functions may be known in the art, no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

The handheld device 10 may be packaged similarly to a thumb drive, a cellular telephone, pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
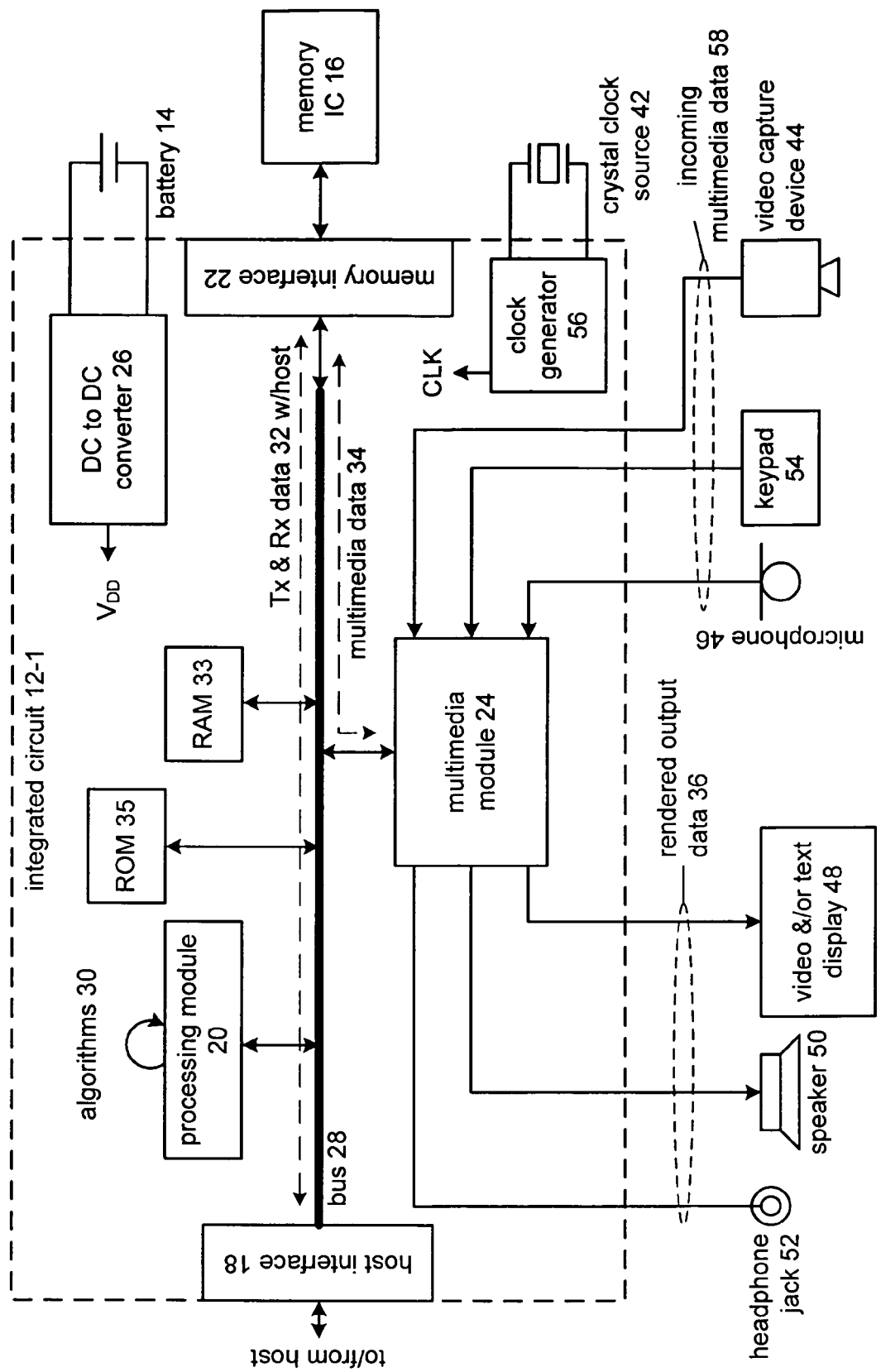

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. The clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the key pad 54 (which may be a keyboard, touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode may include the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
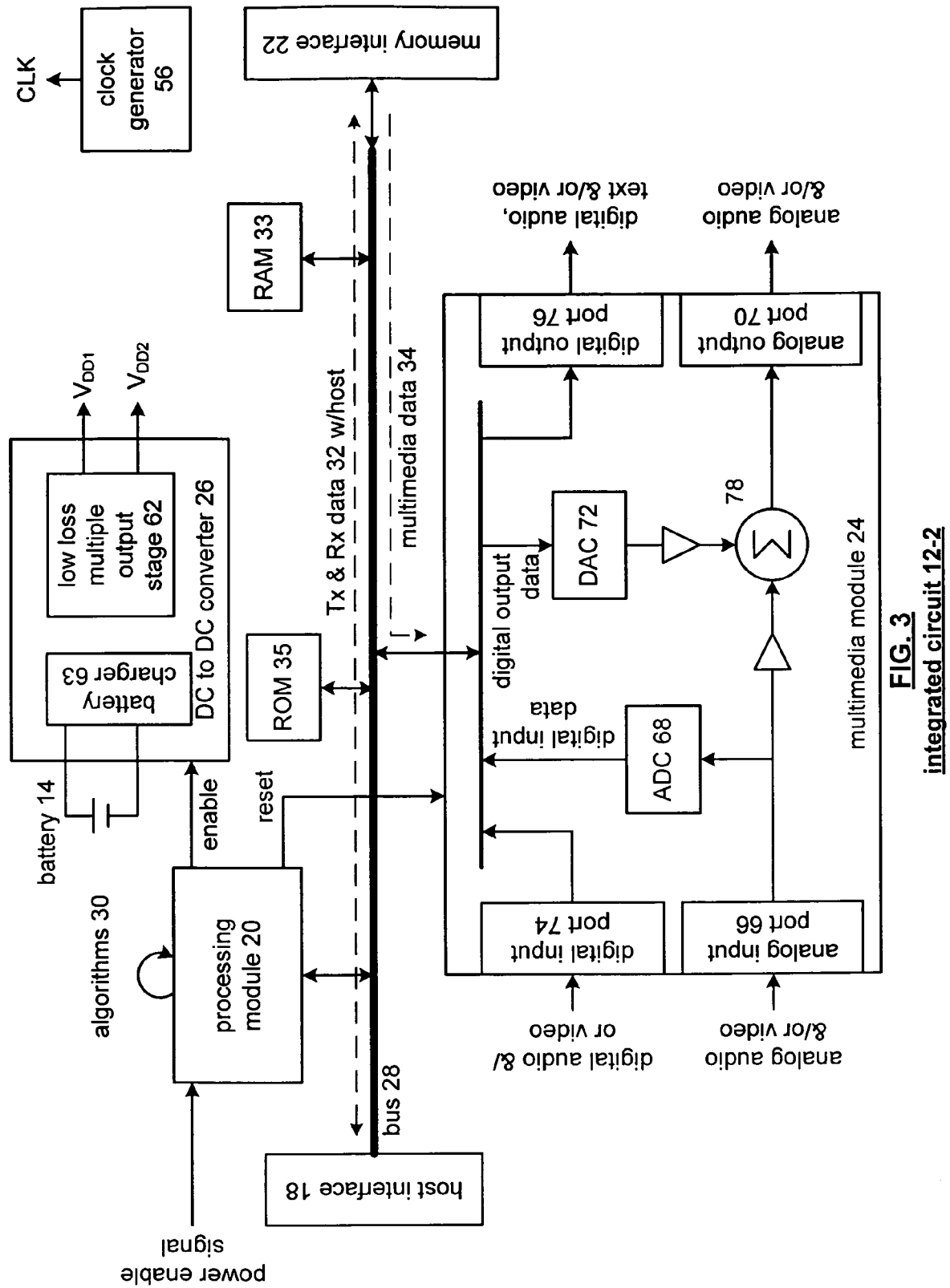

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28 and the multimedia module 24. The DC-to-DC converter 26 includes low loss multiple output stage 62 to produce a first and second output voltage ($V_{DD1}$ and $V_{DD2}$), respectively. Typically, $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules.

The DC-to-DC converter 26 may further include a battery charger 63 and a low loss multiple output stage 62, which will described in greater detail with reference to FIGS. 18-20. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations may adapt those techniques known in the art, thus no further discussion will be provided regarding the battery charger 63 except to further illustrate the concepts of the embodiments of the present invention.

The multimedia module 24 includes an analog input port 66, an analog to digital converter (ADC) 68, an analog output port 70, a digital to analog converter (DAC) 72, a digital input port 74, a digital output port 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, may be stored in RAM 33 as instructed by the processing module 20.

The digital input port 74 is operably coupled to receive digital audio and/or video input signals from, for example, a digital camera, a camcorder, etc. The digital audio and/or video input signals may be stored in RAM 33 under the control of the processing module 20. It is to be noted that the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

The DAC 72, which will be described in greater detail with reference to FIGS. 8-10, receives multimedia data 34 as digital output data and converts it into analog video and/or audio output data that is provided to the mixing module 78. When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

It is to be noted that the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that is coupled to the headphone jack and/or to the speaker. As another example, for recording voice samples (i.e., as a digital dictaphone), the multimedia module 24 may include the analog input port 66 coupled to the microphone and the ADC.

Figure 4:
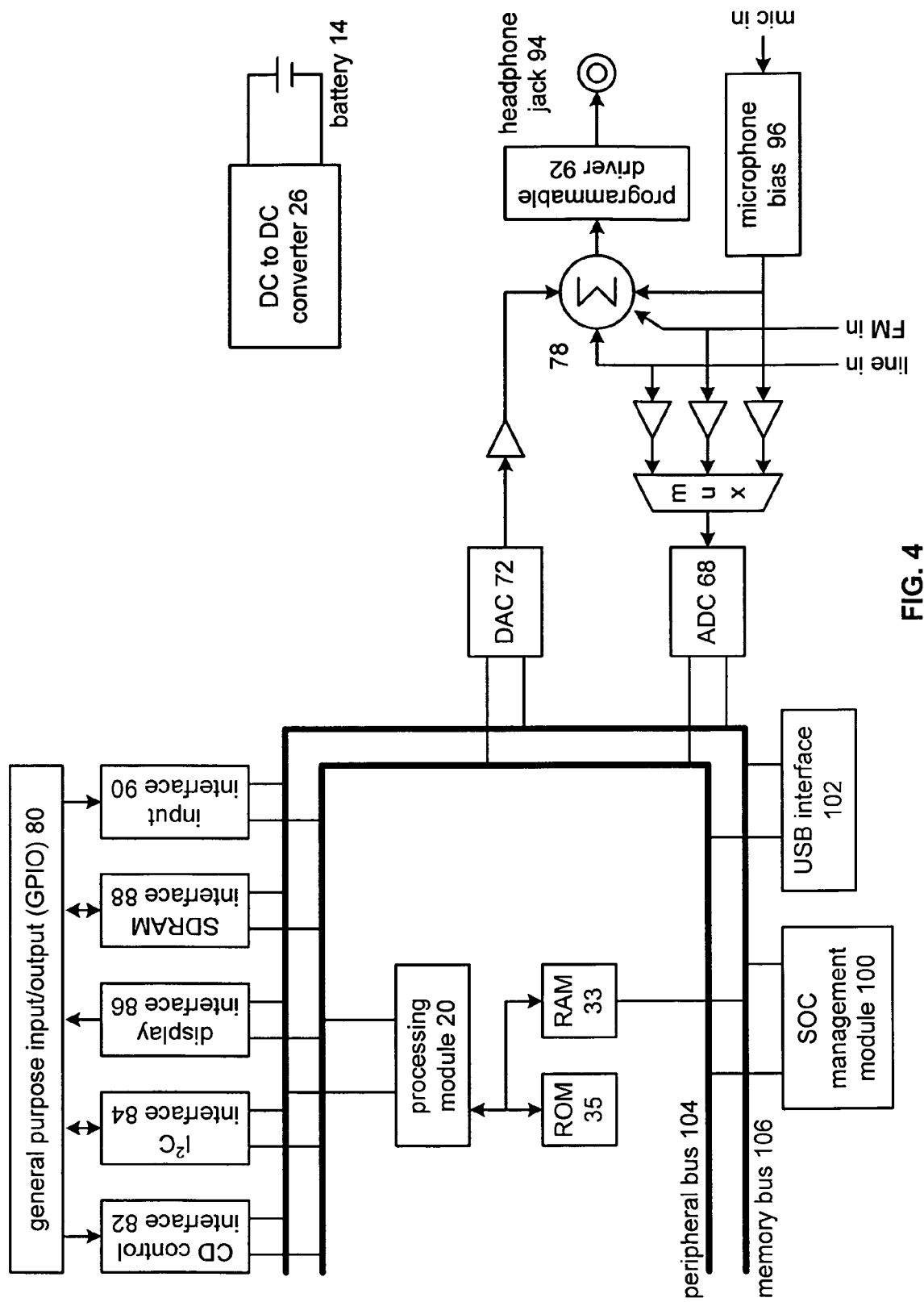

FIG. 4 is a schematic block diagram of an integrated circuit 12-3 that may be incorporated in a multi-function handheld device 10 or 40. The integrated circuit 12-3 includes a general purpose input/output module 80, a CD control interface 82, an I²C interface module 84, a display interface module 86, a static and/or dynamic RAM interface 88, an input interface module 90, processing module 20, ROM 35, RAM 33, a peripheral bus 104, a memory bus 106, a system-on-a-chip (SOC) management module 100, a universal serial bus (USB) interface 102, a digital-to-analog converter 72, an analog-to-digital converter 68, a multiplexer, buffers, mixing module 78, DC to DC converter 26, a programmable driver 92, and a microphone bias module 96.

In operation, the integrated circuit 12-3 may facilitate the transceiving of data with a host device between system memory of a multi-function handheld device and a host device, may playback multimedia data, and/or may record multimedia data via input ports. When the integrated circuit 12-3 is transceiving with a host device, the USB interface 102 operably couples the integrated circuit 12-3 to a host device.

In addition, the SDRAM interface 88 couples, either via the general purpose input/output module 80 or directly, to the system memory (e.g., memory IC 16) of the multi-function handheld device 10. In this configuration, data that is received from the host device is placed on the memory bus 106 by the USB interface 102. The SDRAM interface 88 retrieves the data from the memory bus 106 and forwards it for storage to the system memory under the control of the processing module 20 that is executing a file system storage algorithm. The data being stored may correspond to playback data, such as an MP3 file, a WMA file, a video file, a text file, and/or a combination thereof. Alternatively, or in addition to, the data being received from the host may correspond to programming instructions of an algorithm 30, which may be an MP3 decoder algorithm, a WMA decoder algorithm, a MPEG algorithm, a JPEG algorithm, et cetera.

For providing data from the handheld device 10 to the host device, the SDRAM interface 88 retrieves data from the system memory and places it on the memory bus 106 under the control of the processing module 20 as it executes a file system algorithm. The USB interface 102 retrieves the data from the memory bus 106 and forwards it to the host device in accordance with one of the versions of the USB standard.

Data may also be stored in the system memory that is received via the CD (compact disk) control interface 82, and/or the I²C interface 84 or other type of two or three wire data interface. Via these interfaces 82 and 84, data is received via the general purpose input/output module 80, which will be described in greater detail with reference to FIG. 7, and placed on the memory bus 106. The SDRAM interface 88 retrieves the data from the memory bus 106 and provides it to the system memory, which is done under the control of the processing module as it executes a data storage algorithm.

Figure 12:
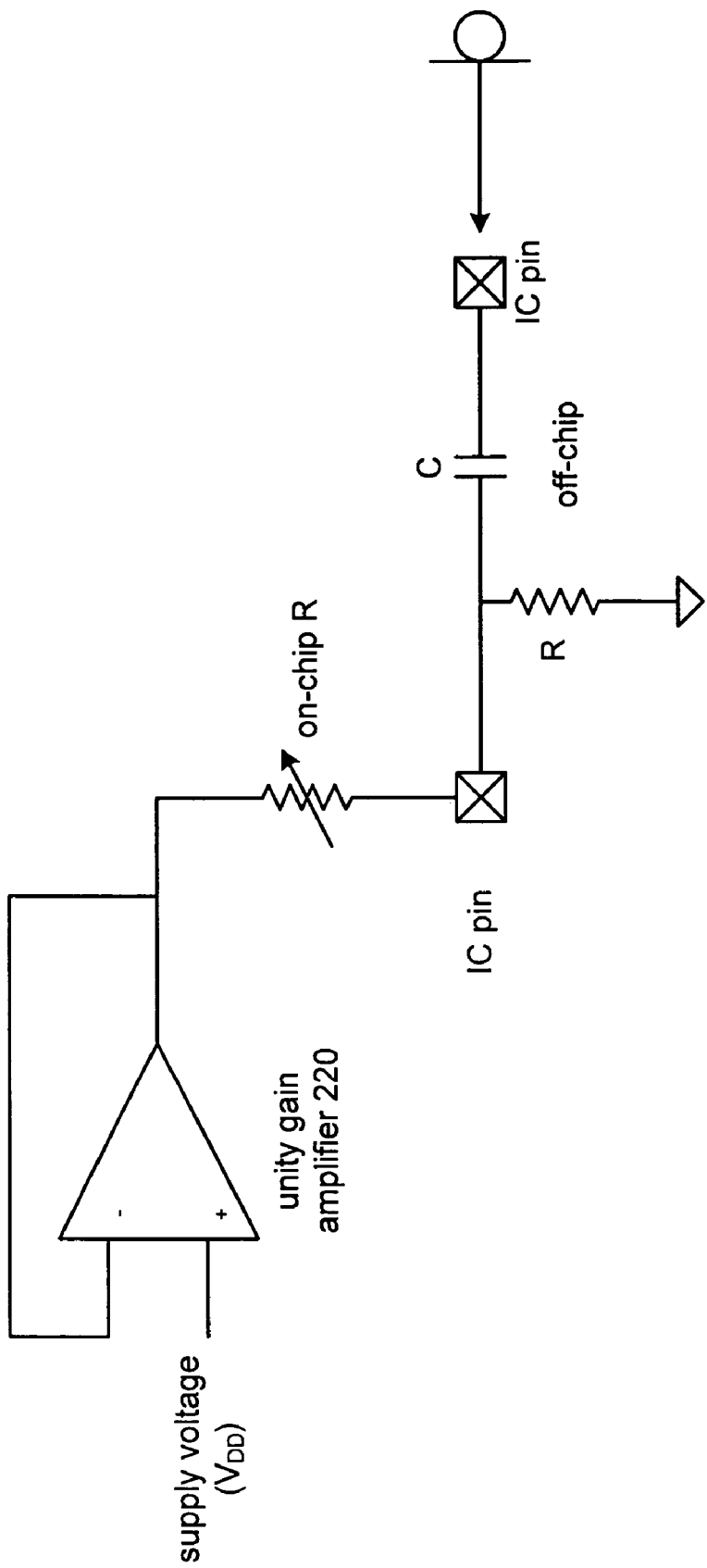

When the integrated circuit 12-3 is recording audio inputs received via the microphone input, the microphone bias circuit 96, which will be described in greater detail with reference to FIG. 12, provides the received audio signals to the mixing module 78 as well as to the multiplexer (mux) via a buffer. The microphone bias circuit 96 biases the audio input for optimal operations. The received audio input signals are converted to digital audio signals via the analog-to-digital converter 68. The digital audio signals may then be stored in system memory (e.g., memory IC 16). Alternatively, the audio input signal may be provided to the summing module 78 and subsequently provided to headphone jack 94 via the programmable driver 92 as a component of a summed analog signal. The summing module 78 may sum, or pass any one of, the audio input signals may be mixed with other analog input signals, such as a line input, an FM radio input, and the analog output of the DAC 72, to produce the summed signal.

When the integrated circuit 12-3 is in a playback mode, digital multimedia data is retrieved from the system memory and provided to the digital-to-analog converter 72. The digital-to-analog converter 72, which will be described in greater detail with reference to FIGS. 8-10, converts the digital multimedia signals, which may be audio data, video data and/or text data, into analog multimedia signals and provides the analog multimedia signals to mixing module 78. In the playback mode, the mixing module 78 may have the other inputs muted, such that its output corresponds directly to the analog multimedia signals provided by the digital-to-analog converter 72.

The programmable driver 92, which will be described in greater detail with reference to FIG. 11, increases the drive power of the analog multimedia signals (e.g., audio signals when the analog multimedia signals are provided to a headphone) and provides it to the headphone jack 94. It is to be noted that a fixed driver may replace the programmable driver 92 to drive the headphone jack 94.

To place the integrated circuit 12-3 into the various operational modes, commands are received via the general purpose input/output module 80 by the input interface 90. The input interface 90, which will be described in greater detail with reference to FIG. 13, receives the input stimulus corresponding to commands, interprets the input stimulus to generate the corresponding commands. The commands are then provided on the peripheral bus 104 and/or the memory bus 106 and processed by the processing module 20.

In addition to producing audio outputs during playback mode, the integrated circuit 12-3 may provide video outputs via the display interface 86, which will be described in greater detail with reference to FIG. 14. The display interface 86 drives the display, which may be an LCD display, LED display, plasma display and/or any other type of display. The data being displayed may correspond to the multimedia data retrieved from the system memory, and/or may correspond to the commands inputted via the input interface 90.

The system-on-a-chip (SOC) management module 100 processes interrupt controls, generates clock signals for the integrated circuit 12-3, performs bit manipulations, performs debugging operations, and executes a Reed-Solomon, or other type of encoding/decoding algorithm to encode and/or decode data.

Figure 18:
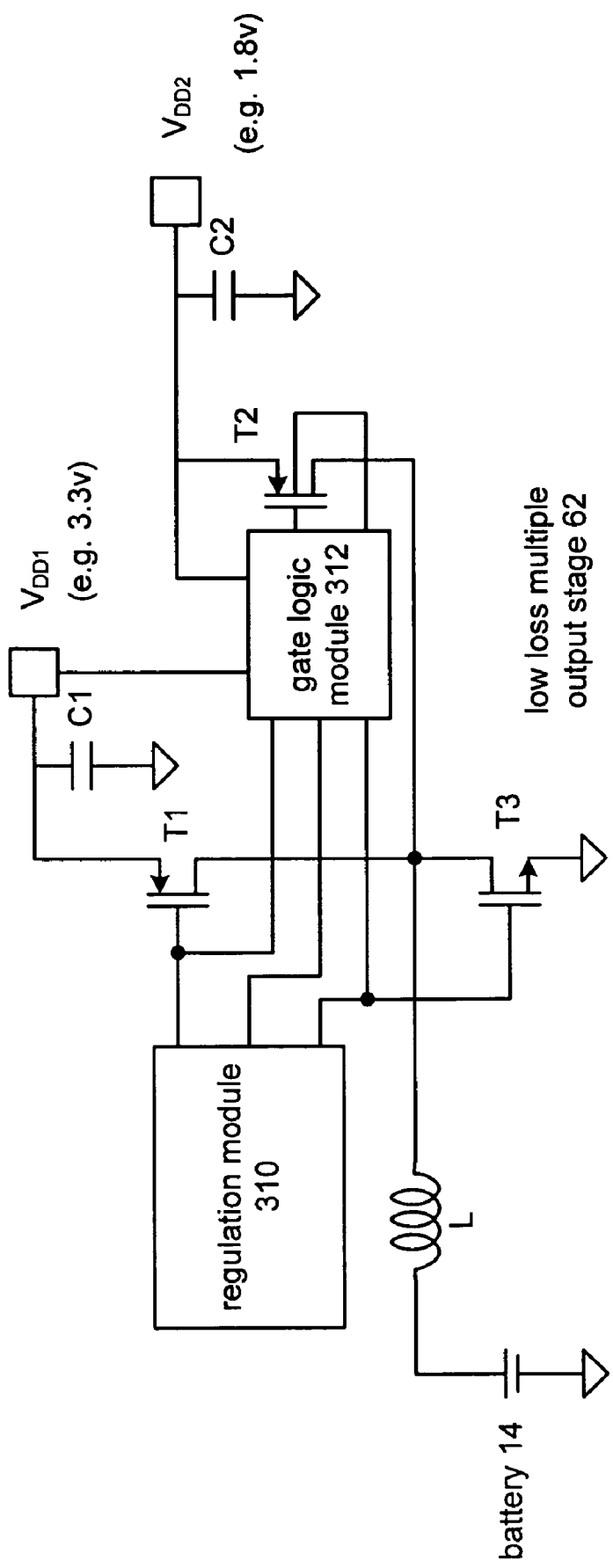

The DC to DC converter 26, which will be described in greater detail with reference to FIGS. 18-20, provides at least one supply voltage for the integrated circuit 12-3 and typically provides two supply voltages. For example, the DC to DC converter 26 may produce a 3.3 volts supply and a 1.8 volt supply.

Figure 5:
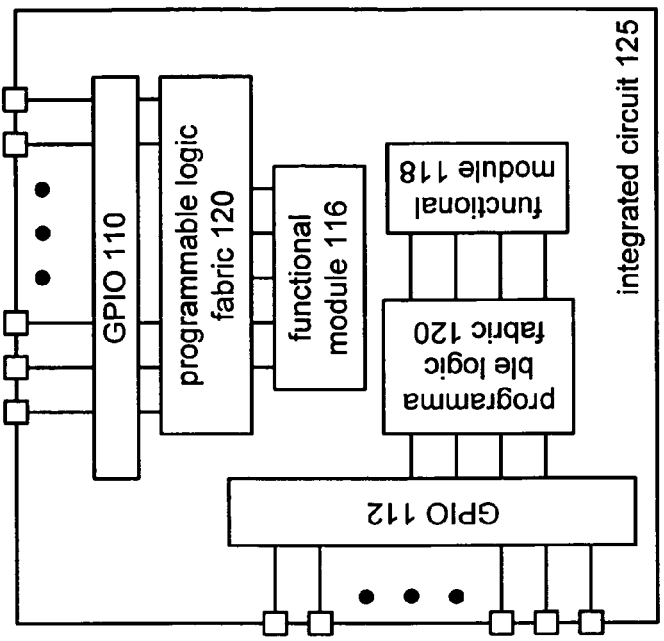

FIG. 5 is a schematic block diagram of an integrated circuit 115 that may be used in a multi-function handheld device 10. In this embodiment, the integrated circuit 115 includes a plurality of general purpose input/output (GPIO) modules 110 and 112. Each GPIO 110 and 112 is coupled to a functional module 116 and 118, respectively. The functional modules 116 and 118 may correspond to the processing module 20, the CD control interface module 82, the I²C interface module 84, display interface module 86, SD RAM interface module 88, the input interface module 90, and/or any other type of data interface that may be used in a handheld multi-function device.

Figure 6:
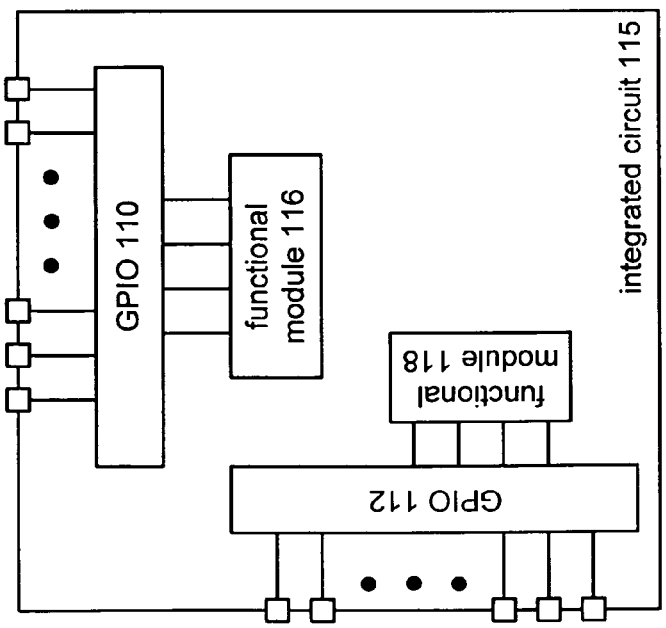

FIG. 6 illustrates an alternate embodiment of an integrated circuit 125 that may be used in the multi-function handheld device 10. In this embodiment, the integrated circuit 125 includes a plurality of GPIOs 110 and 112, a plurality of functional modules 116 and 118 and further includes programmable logic fabric 120. The programmable logic fabric may be field programmable gate array circuitry, programmable gate array circuitry and/or any other type of configurable circuitry. The programmable logic fabric 120 provides flexibility in configuring the functional modules 116 and 118 to the general purpose interfaces 110 and 112.

Figure 7:
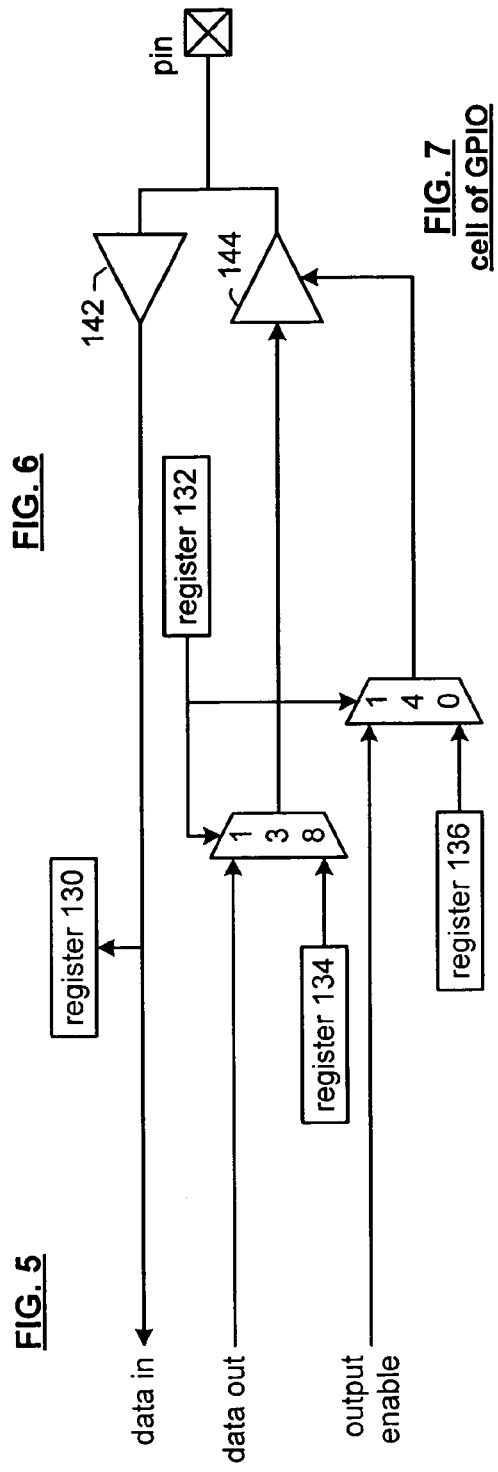

FIG. 7 illustrates a cell of a general purpose input/output module 80, 110 and/or 112. The cell corresponds to one input/output signal coupled to one input/output pin of the integrated circuit. As shown, the cell of the GPIO includes a plurality of registers 130-136, a plurality of multiplexers 138 and 140, and a plurality of drivers 142 and 144. Register 132 stores a mode select signal that controls the multiplexers 138 and 140. In a 1st state of register 132, which may correspond to configuring the pin as an output pin, the 1st state causes the multiplexer 138 to pass output data to driver 144. In addition, multiplexer 140 passes an output enable signal to the tri-state input of driver 144, which activates driver 144. As such, in this state, the pin is configured as an output pin for output data. In a $2^{nd}$ state, multiplexer 138 may pass data stored in register 134 to driver 144 and multiplexer 140 passes the output enable signal to driver 144. In a $3^{rd}$ state, multiplexer 140 may be configured to pass the data stored in register 136 to the tri-state control of the driver 144 and multiplexer 138 may pass the output data to driver 144. In a $4^{th}$ state, multiplexer 140 may pass the data stored in register 136 to the tri-state control input of driver 144 and multiplexer 138 may pass the data stored in register 134. With these various states of configuring the pin as an output pin, the processing module, while executing an algorithm, may write data into the registers 132-136 and use the same output pin for multiple outputs.

When the cell of the GPIO is configured to enable the pin to function as an input pin, the output enable signal is disabled, and register 132 causes multiplexer 140 to pass a signal that holds the output driver 144 in a high impedance state. In this mode, input data received via the pin is provided to the integrated circuit via the driver 142. In addition, the input data may be stored in register 130 under the control of the processing module 20 while it executes an algorithm.

Figure 8:
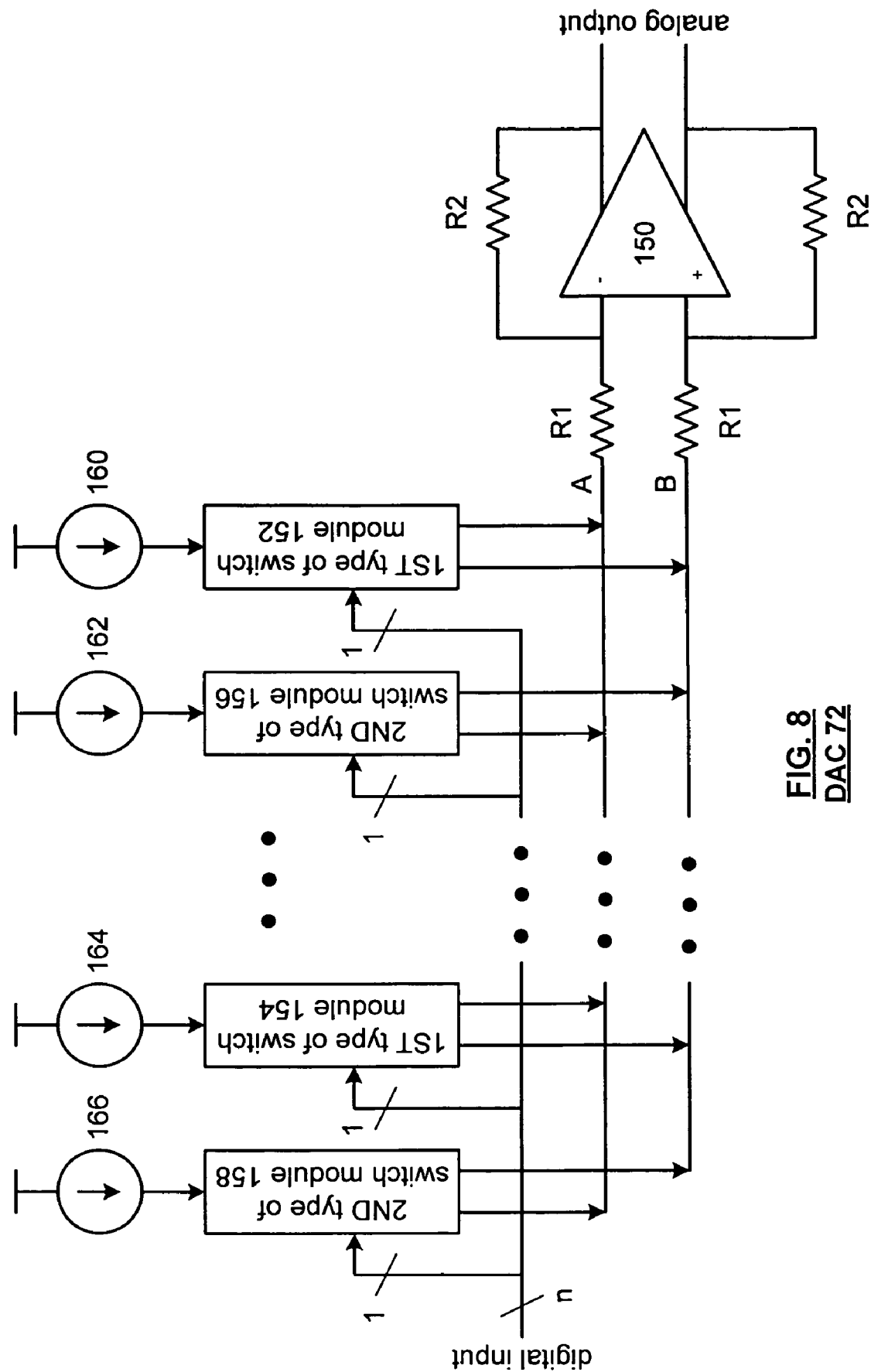

FIG. 8 is a schematic block diagram of the digital-to-analog converter 72. The digital-to-analog converter 72 includes a plurality of current sources 160-166, a plurality of switching modules 152-158, and a differential amplifier 150 wherein the gain of the differential amplifier 150 is based on the ratio of resisters R1 and R2. It is to be noted that the feedback circuitry corresponding to the gain of the operational amplifier 150 may include additional resisters, capacitors, et cetera to establish a desired frequency response.

The switching modules 150-158 include a 1st type of switching module 152 and 154 and a 2nd type of switching module 156 and 158. The switching modules 152-158 are operably coupled to provide currents from its corresponding current source 160-166 to the A and/or B input of the differential amplifier circuit 150. The amount of current provided to the A input and B input is dependent on a corresponding bit of the digital input. As shown, the digital input may include n-bits where one of the n-bits controls the switching of the corresponding switching modules 152-158. For example, if the digital input includes 4 bits, the most significant bit would be provided to switching module 152, the 2nd most significant bit to switching module 156, the 3rd most significant bit to switching module 154 and the 4th most significant bit to switching module 158.

Continuing with the 4-bit example, in one embodiment, the current sources 160-166 are scaled to provide a corresponding current. For example, current source 160 provides a ½ current value, current source 162 provides a ¼th current value, current source 164 provides a ⅛th current value and current source 166 provides a ¹⁄₁₆th current value. In general, current sources 166 and 164, which correspond to the least significant bits, provides a current value of $½^{n}*I$ and $½^{n-1}*I$, respectively. In this example, if the most significant bit is 1, the switching module 152 provides a current to input A and B that produces an analog output voltage of ½ of the maximum output voltage of operational amplifier 150. If the remaining bits of the digital input are 0, the digital value of 1000 produces an analog output of ½ of the maximum analog output.

If the $2^{nd}$ most significant bit is a logic one, switching module 156 provides current to inputs A and B that produces an analog output voltage of $¼^{th}$ the maximum analog output voltage of operational amplifier 150. If this is the only bit that is high, i.e., the digital input is 0100, the resulting analog output is $¼^{th}$ of the maximum analog output value. If, however, the $1^{st}$ and $2^{nd}$ most significant bits are high, i.e., a digital input of 1100, the analog output is the sum of the b $/1;4^{th}$ analog output and ½ analog output, which yields a ¾ths analog maximum output value. The remaining two bits add a $⅛^{th}$ analog value to the analog output and a $¹⁄₁₆^{th}$ maximum analog output component to the resulting analog output, respectively.

When the digital-to-analog converter 72 is implemented on an integrated circuit using CMOS technology, or the like, the components comprising the switching modules 152-154 and the current sources 160-166, while designed to match, do not exactly match due to temperature variations, process variations, et cetera. These mismatches produce errors in the current being supplied to nodes A and B. This error causes the analog output voltage to not directly map to the desired analog voltage for the corresponding digital input (e.g., a digital input of 1100 does not exactly produce a $¾^{th}$ of maximum analog output). In accordance with an embodiment of the presence invention, by having a $1^{st}$ type of switching module that produces a positive error signal and a $2^{nd}$ type of switching module that produces a negative error signal, the resulting error, over time, is substantially reduced. This concept will be described with greater detail with reference to FIG. 9.

It is to be noted that the current sources 160-166 may all be of a like current source wherein the input to the differential operational amplifier 150 may include a resistive network to scale the corresponding digital inputs through the operational amplifier 150.

Figure 9:
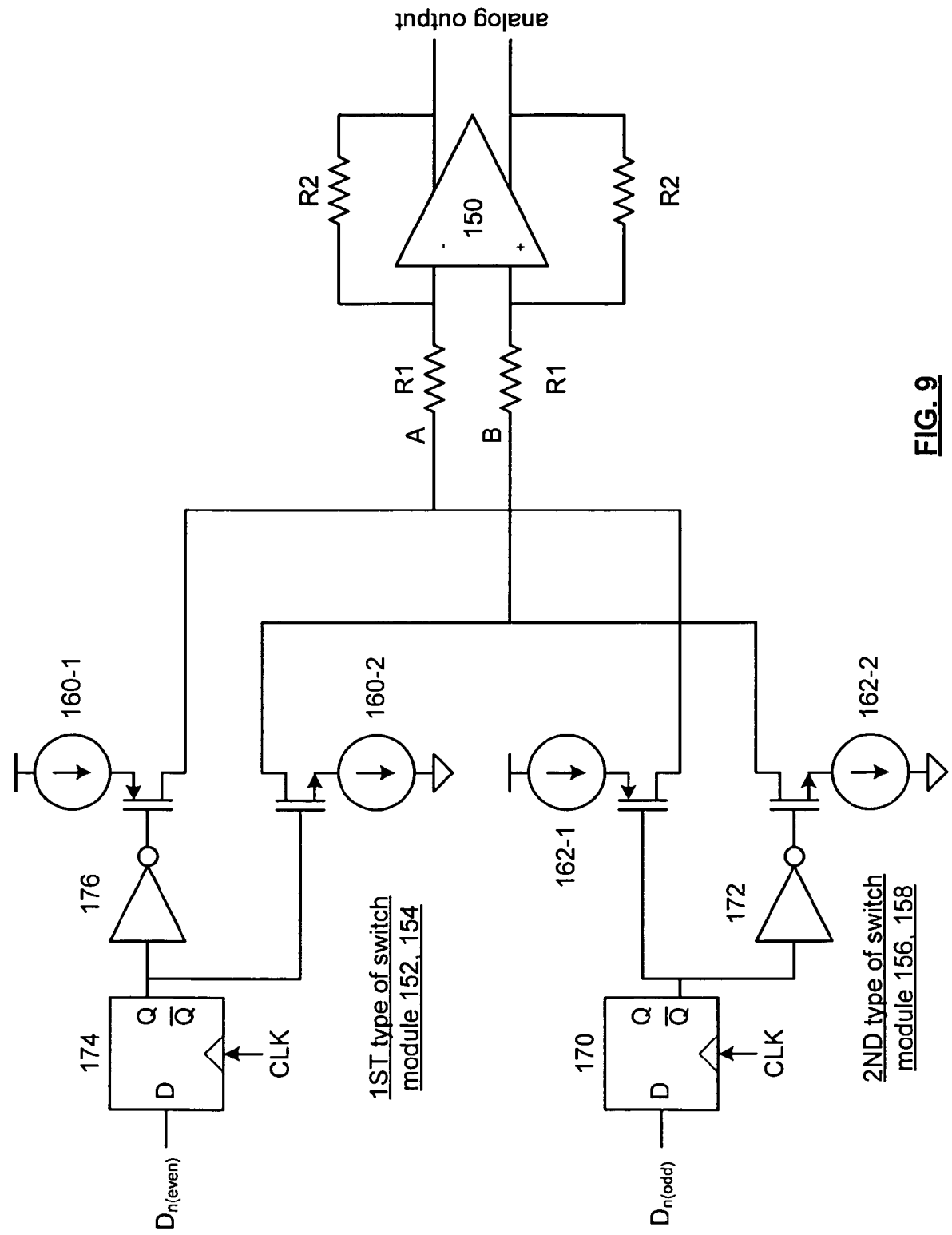

FIG. 9 illustrates the digital-to-analog converter 72 with the $1^{st}$ type of switching module 152, 154 and the $2^{nd}$ type of switching module 156, 158 shown in greater detail. As shown, the $1^{st}$ type of switching module 152, 154 includes a D flip-flop 174, and inverter 176, a P-transistor, an N-transistor and two current sources 160-1 and 160-2. The $2^{nd}$ type of switching module 156, 158 includes a D flip-flop 170, an inverter 172, a P-channel transistor, an N-channel transistor and current sources 162-1 and 162-2.

The $1^{st}$ type of switching module 152, 154 is operably coupled to receive even number bits of the digital input at the D input of flip-flop 174. The non-inverting Q output of flip-flop 174 drives the inverter 176 and the gate of the N-transistor. Accordingly, when the digital input is a logic 1, after the rising (or falling) edge of the clock signal occurs, the non-inverting Q output is high, which enables the N-transistor and the P-transistor. With the N and P-transistors active, current source 160-1 is sourcing current into node A and current source 160-2 is syncing current from node B. Since the switching speeds (i.e., slew rates) of the D flip-flop, inverter 176, and the N and P-channel transistors are not identical, an error signal may result. It is to be noted that the P-channel transistor may be driven from the inverting output Q' of the flip-flop 174 and omit the inverter 176.

The $2^{nd}$ type of switching module 156-158 receives at the D input of flip-flop 170 odd bits of the digital input. Accordingly, when the input of an odd bit is a logic 1, the inverting output Q', when the clock signal transitions, is low. With this signal low, the P-channel transistor is enabled as well as the N-channel transistor through inverter 172. In this configuration, the current source 162-1 is sourcing current into node A and current 162-2 is syncing current from node B. By inverting the triggering of the N and P-channel transistors in the $2^{nd}$ type of switching module with respect to the $1^{st}$ type of switch module, the error produced is in the complimentary direction of the error produced by the first type of switching module. For example, if the $1^{st}$ type of switching module produces a positive error signal, the $2^{nd}$ type of switching module produces a corresponding negative error signal. As such, over time, the positive error signal is substantially cancelled by the negative error signal thus substantially reducing the net error caused by mismatching of the components of the digital-to-analog converter. It is to be noted that a large impedance may be included between node A and B such that when all of the digital inputs are 0, the inputs at node A and B are zero to produce a zero analog output.

Figure 10:
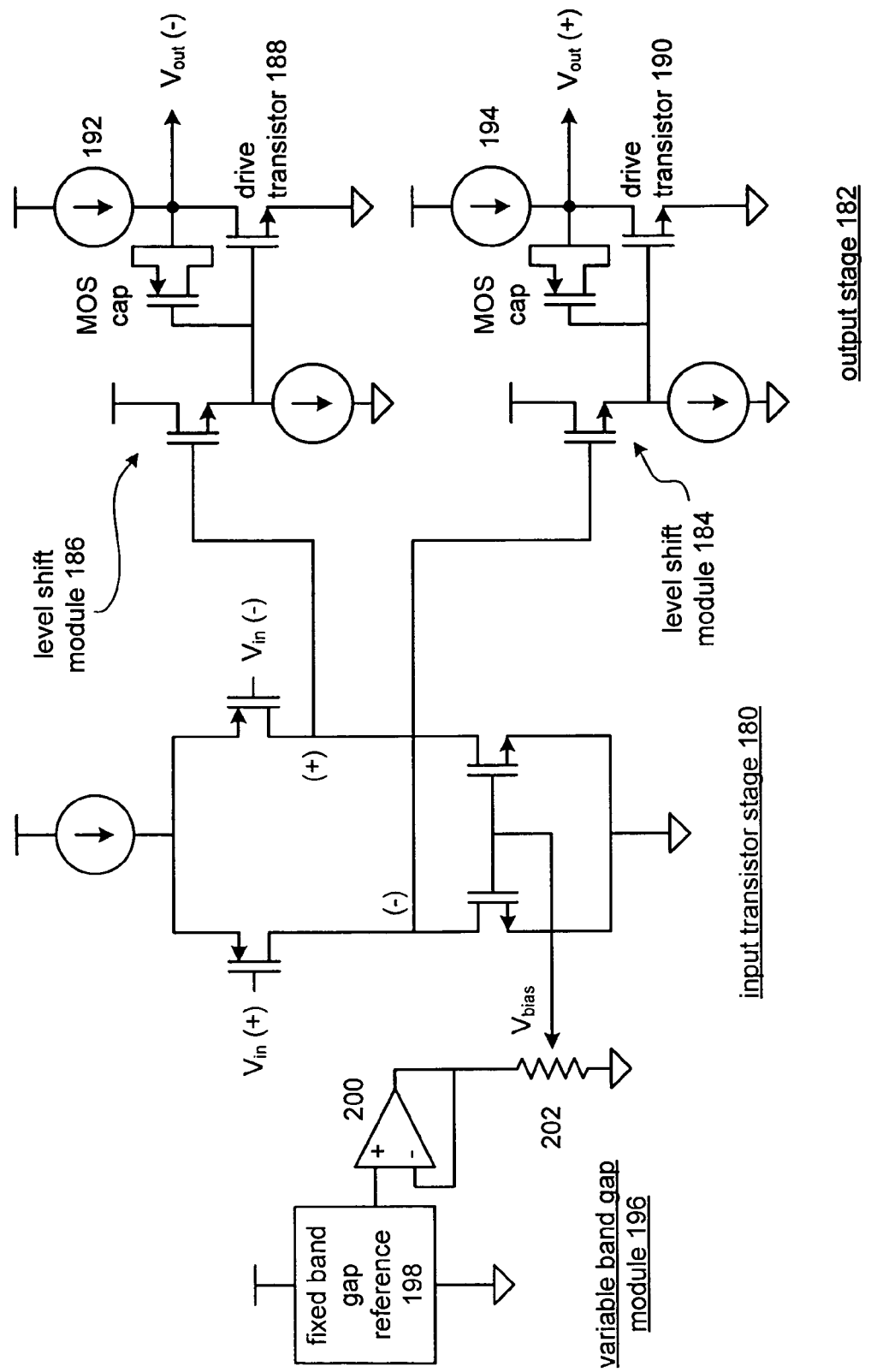

FIG. 10 is a schematic block diagram of operational amplifier 150 that may be used in the digital-to-analog converter 72. It is to be noted that the operational amplifier 150 may have a multitude of uses beyond use in a digital-to-analog converter. The operational amplifier 150 includes a variable band-gap module 196, an input transistor stage 180 and an output stage 182. The variable band-gap gap module 196 includes a fixed band-gap reference 198, a unity gain amplifier 200 and a variable impedance 202. In general, the variable band-gap module 196 allows for a lower bias voltage ($V_{bias}$) to be generated when the integrated circuit including the operational amplifier 150 is operated from lower supply voltages.

The fixed band-gap reference 198 generates a fixed reference voltage (e.g., 1.25 volts) from a supply voltage (e.g., 1.8 volts, 3.3 volts, 1.2 volts, et cetera). The unity gain amplifier 200 mimics the fixed voltage reference and provides it to the variable impedance 202. By tuning the variable impedance 202, the bias voltage may range from the fixed reference voltage down to near 0 voltage. Accordingly, in an operational amplifier, such as the one illustrated in FIG. 10, when the supply voltage is relatively low (e.g., 1.8 volts or less), tuning the bias voltage to equate to approximately ½ of the supply voltage provides better dynamic range for the operational amplifier.

The input transistor stage 180 includes two P-channel transistors and two N-channel transistors. The N-channel transistors are gated based on the bias voltage where the P-channel transistors receive a differential input signal. The input stage 180 produces a differential output indicated by the + and − signs that is provided to the output stage 182.

The output stage includes for each leg of the differential signal produced by the input stage, a level shift module 184-186, a drive transistor 188-190, a current source 192-194, and a MOS capacitor (MOS cap). The MOS cap provides feed-forward compensation for the drive transistors 188 and 190 to improve the performance of the output stage 182. In prior art embodiments, the capacitor across the drive transistors were metal capacitors. As is known in the art, the size of a metal capacitor is significantly greater than the size of a MOS cap but the capacitance value of a MOS cap varies as its operating conditions (e.g., as gate-threshold voltage [$V_T$] changes) change, where the capacitance of a metal capacitor is stable with respect to the voltage applied to it. Since the capacitance value of the feedforward capacitor significantly contributes the frequency response of the output stage, a relatively stable capacitance is desired.

To achieve a relatively stable capacitance for a MOS cap in the output stage 182, the output stage includes level shift modules 184 and 186, which bias their respective MOS caps at a greater threshold voltage such that the MOS caps operate in a more linear capacitance range. With the MOS caps operating in a more linear range, the desired feed-forward compensation across the drive transistors 188 and 190 is more predictable. As shown, the level shift modules 184 and 186 include an N-channel transistor and a current source.

Figure 11:
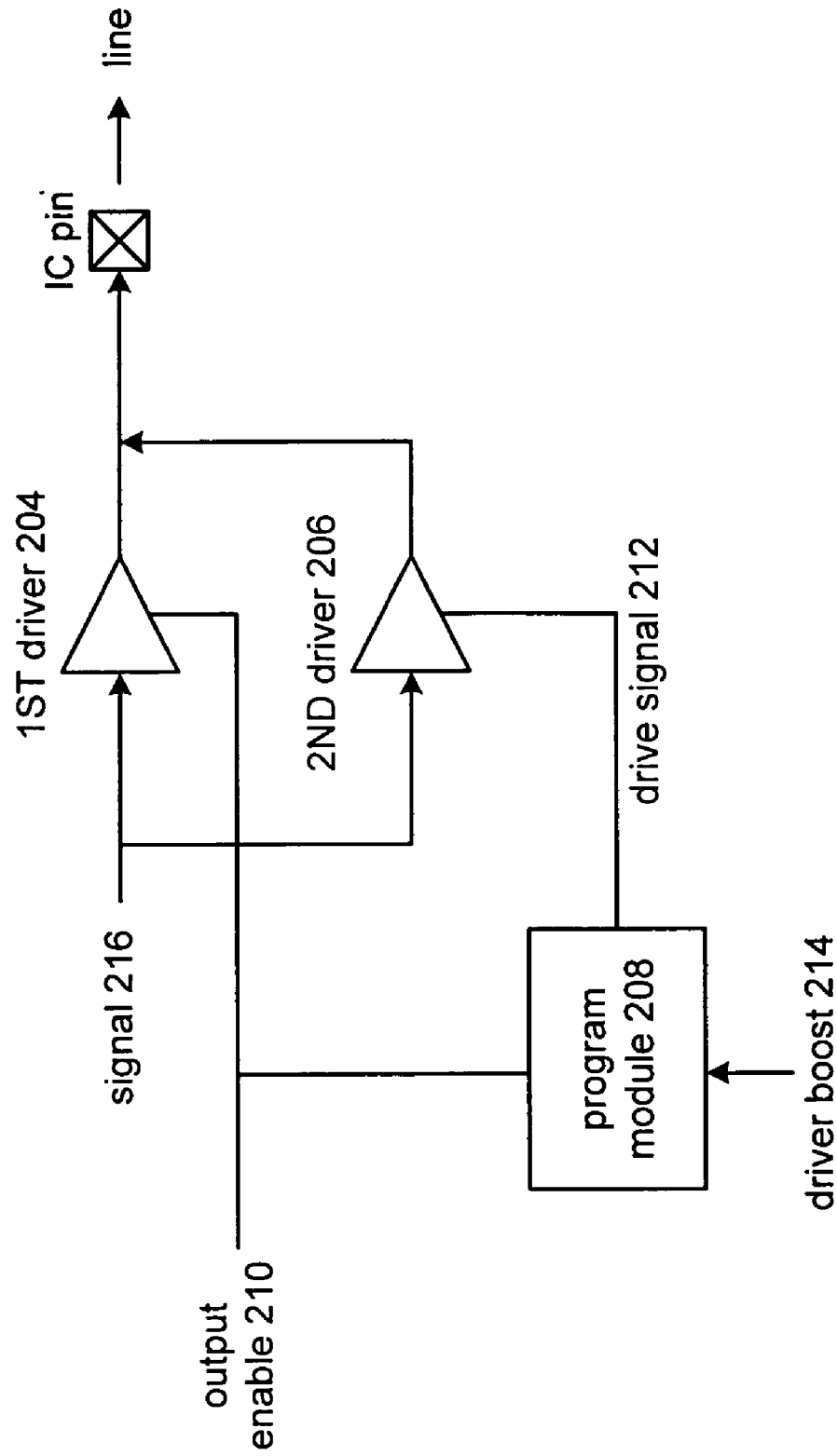

FIG. 11 illustrates a schematic block diagram of a programmable driver 92. The programmable driver 92 includes a program module 208, a $1^{st}$ driver 204 and at least a $2^{nd}$ driver 206. As shown, the $1^{st}$ driver 204 is operably coupled to receive a signal 216 and, when the output enable signal 210 is active, to drive the signal 216 to a line via an integrated circuit pin. The program module 208, based on a drive boost signal 214 enables or disables the $2^{nd}$ driver 206 via the drive signal 212. Accordingly, when the drive signal 212 enables the $2^{nd}$ driver 206, the $1^{st}$ and $2^{nd}$ drivers 204 and 206 drive the signal 216 in parallel thus providing a greater output power to drive the line via the integrated circuit pin. The driver boost signal 214 may be determined based on the load requirements at the IC pin. The load requirements may be dependent on the particular impedance on the line, which may be the impedance of headphones coupled and further varies based on desired volume setting, et cetera. In addition, the determination of the driver boost signal 214 may be based on output signal strength settings.

It is to be noted that the programmable driver 92 may include multiple drivers in parallel with the $1^{st}$ driver 204 each being individually gated by program module 208. For example, the $1^{st}$ driver 204 may be a 4 milliamp driver, the $2^{nd}$ driver may be a 4 milliamp driver, the $3^{rd}$ driver may be an 8 milliamp driver such that, in combinations, a 4 milliamp output may be obtained, an 8 milliamp output may be obtained, a 12 milliamp output may be obtained, or a 16 milliamp output may be obtained.

FIG. 12 illustrates a schematic block diagram of a microphone bias circuit 96, which reduces noise injected into an audio input signal injected by the supply voltage and other sources of noise. The microphone input signal may be very susceptible to noise, which corrupts the corresponding audio input signal.

The microphone bias circuit 96 includes a unity gain amplifier 220, an on-chip variable resistor and two integrated circuit pins. Off-chip, the microphone couples to one integrated circuit pin and also off-chip a resistor-capacitor filter is included to provide part of the biasing. In combination with the on-chip resistor, the off-chip RC filter provides the desired biasing and filtering of the audio input signal.

Figure 13:
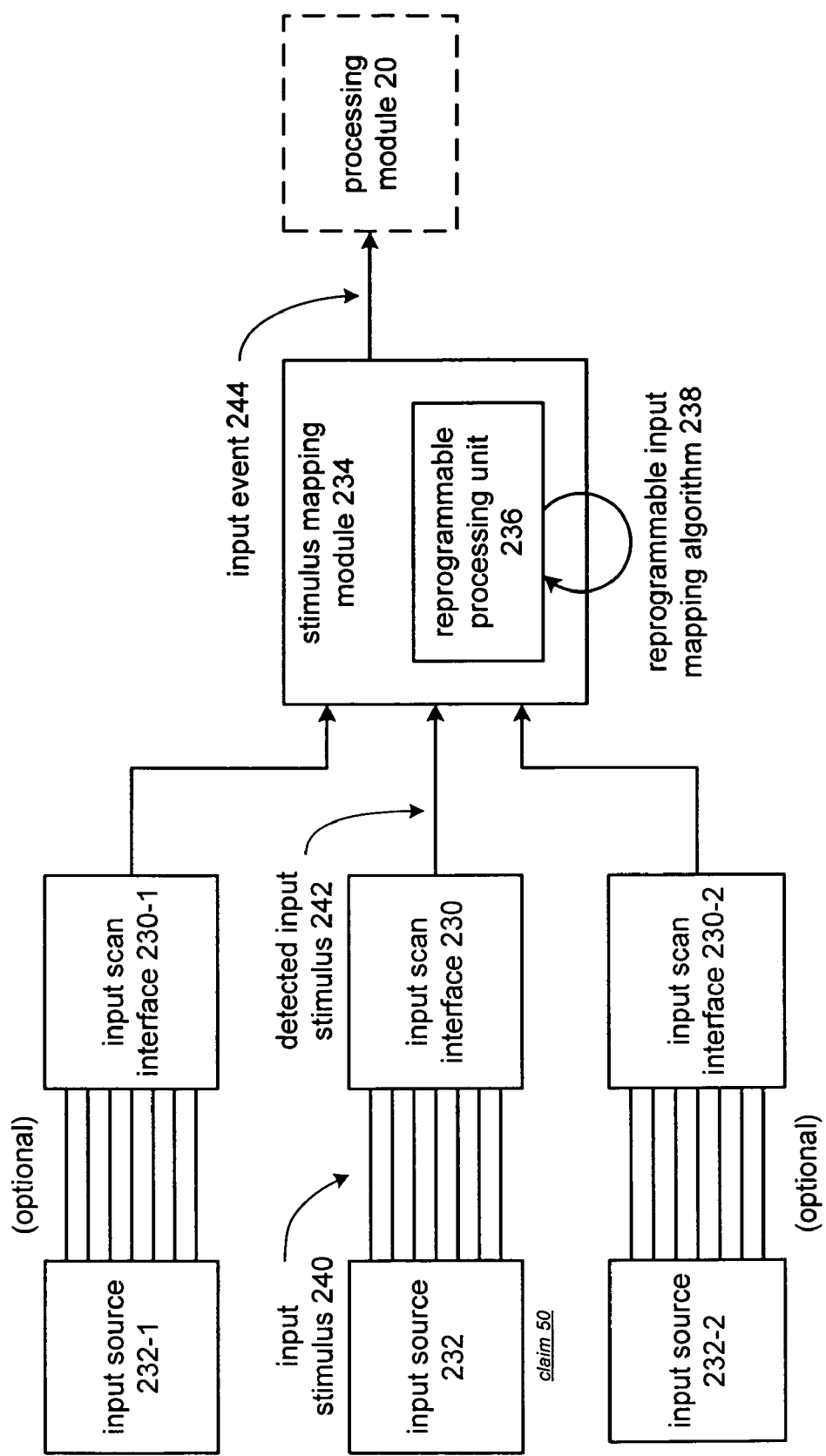

FIG. 13 is a schematic block diagram of the input interface module 90 of an integrated circuit that is operably coupled to receive input stimuli. The input interface 90 includes at least one input scan interface 230, 230-1 and 230-2, and a stimulus mapping module 234. The stimulus mapping module 234 is operably coupled to the processing module 220, which processes the corresponding input commands. Each of the input scan interfaces 230 through 230-2, are operably coupled to an input source 232 through 232-2. The input sources 230 through 232-2 may be a keypad, a joystick, a mouse, a spin ball, an infrared receiver, a serial input port, a radio frequency receiver, a touch screen, et cetera. The corresponding input source produces an input stimulus 240. For example, if the input source 230 is a keypad, when one of the buttons is pushed, a corresponding input stimulus 240 is generated.

The input scan interface 230 receives the input stimulus 240 and generates a corresponding detected input stimulus 242. For example, if the input source 232 is a keypad, and a particular button on the keypad is activated, the input scan interface 230 interprets the particular button that has been activated and provides the indication that that particular button, as the detected input stimulus 242, has been activated to the stimulus mapping module 234.

The stimulus mapping module 234, which may include a reprogrammable processing unit 236, executes a input mapping algorithm 238, which may be reprogrammable, to produce an input event 244. For example, if the input stimulus is a keypad, and a particular button is pushed, the stimulus mapping module 234 interprets which particular button was pushed to generate an input event 244. As a further example, the particular button may be interpreted to correspond to a fast-forward function, pause function, skip function, reverse function, rewind function, play function, volume adjust function, mode select function, record, playback, file storage, et cetera. As such, when the button is activated, the mapping module 234 interrupts the button activation and generates the appropriate input event.

By allowing the stimulus mapping module 234 to interpret the particular stimulus, as opposed to having a direct affiliation of a particular input stimulus to a particular input command, users of the integrated circuit and handheld device manufactures may customize the configurations of its input sources and subsequently change them without hardware modifications to the handheld device. Accordingly, if an input source is changed, the input mapping algorithm 238 is reprogrammed to adjust to the new configuration of the input source without hardware change.

Figure 14:
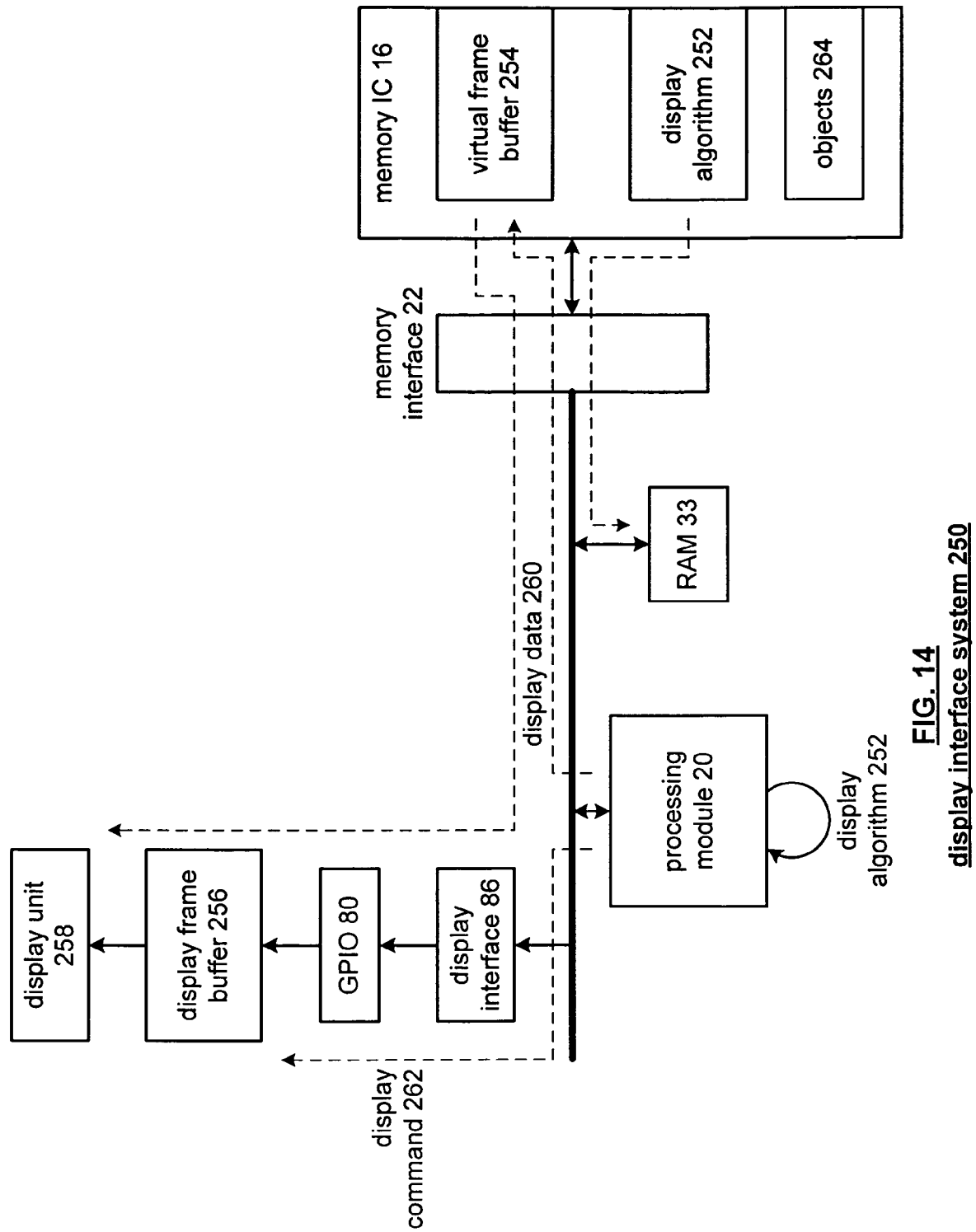

FIG. 14 is a schematic block diagram of a display interface system 250 that may be used in a handheld device in accordance with the present invention. The display interface system 250 includes a display unit 258, display frame buffer 256, the GPIO 80, a display interface 286, the processing module 20, RAM 33, memory interface 22, and memory integrated circuit 16. The memory integrated circuit 16 includes a plurality of memory sections. One memory section may be used as a virtual frame buffer 254, another may store a display algorithm 252 and a 3$^{rd}$ may store objects 264. The objects may correspond to display data, such as text overlays, texture maps, and/or any other pre-stored object information that is desired to be displayed as background, foreground, or combination thereof.

To produce a corresponding display on display unit 258, which may be an LCD display module, LED display, plasma, et cetera, the processing module 20 executes the display algorithm 252. The display algorithm 252 may correspond to playback of audio data, video data, text data, displaying selections of input commands, et cetera. While executing the display algorithm 252, the processing module 20 generates display data 260 that is temporarily stored in the virtual frame buffer 254. When a full frame of data is stored in the virtual frame buffer 254, it is retrieved and provided to the display frame buffer 256 for subsequent display. While display data 260 is being stored in the virtual frame buffer 254, the processing module 20 while executing the display algorithm 252 may manipulate the data within the frame buffer 254 in a variety of ways. For example, the display algorithm 252 may cause the processing module 20 to generate a particular background scene from objects 264 to be stored in the virtual frame buffer 254, to generate an overlay of text, images, et cetera and/or a combination thereof. In addition, the display algorithm 252 may cause a morphing of objects 264 among themselves, with the display data, et cetera. Accordingly, by utilizing a virtual frame buffer 254, the display data 260 may be manipulated in a variety of ways to achieve a desired display.

In addition to producing the display data 260, the processing module 20 also generates a display command 262. The display command 262 is provided to the display frame buffer 256 to control when and how the display data 260 is to be provided from the display frame buffer 256 to the display unit 258. Accordingly, the refreshing of display unit 258 may be done under the control of the processing module 20 at a desired rate or varied rate depending on the particular effects of the display desired.

Figure 15:
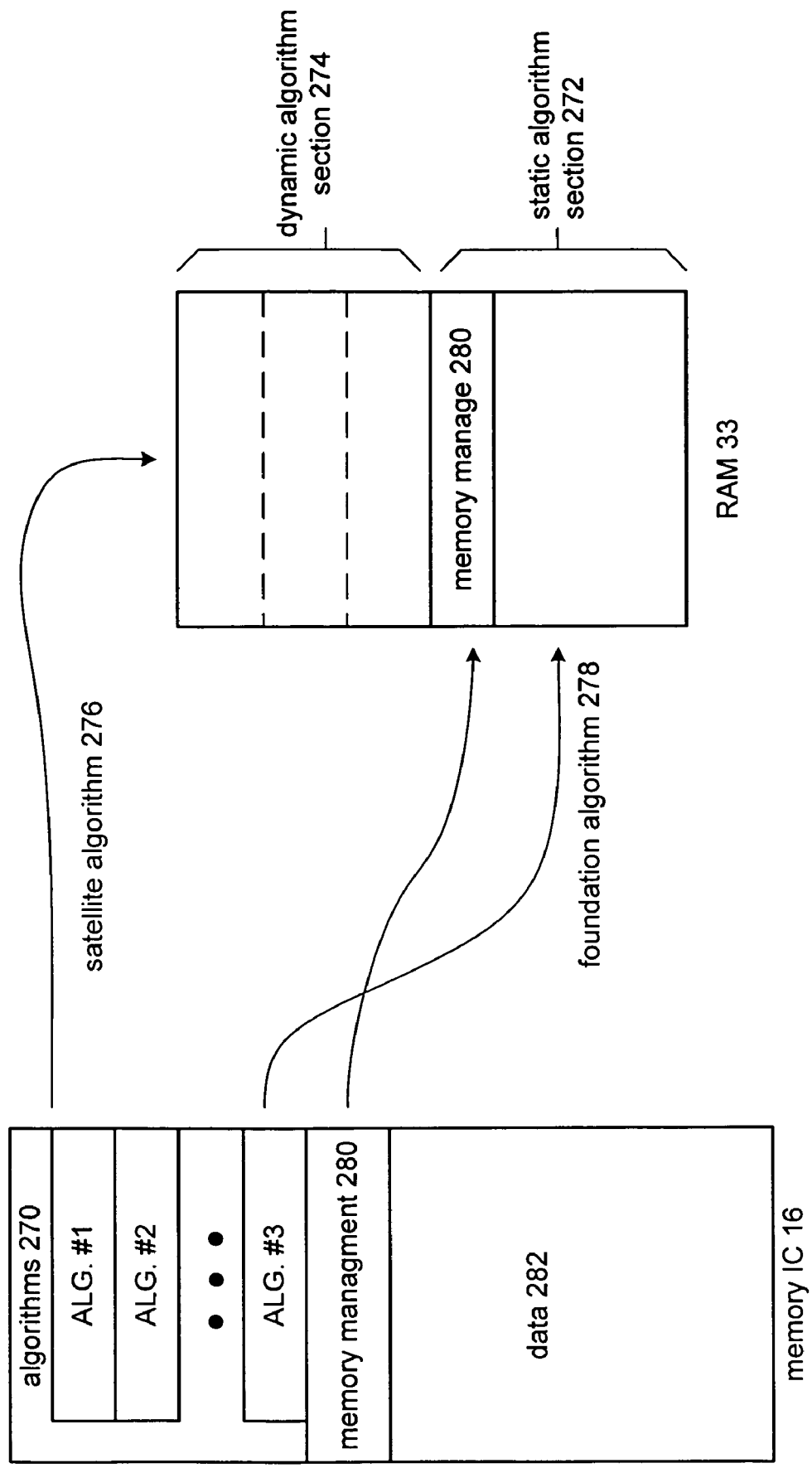

FIG. 15 is a diagram illustrating the memory functionality of the handheld device 10 or 40. As shown, the memory IC 16, which is off-chip memory with respect to the system-on-a-chip integrated circuit 12, 12-1, 12-2, 12-3, includes a data section 282, a management memory section 280 and an algorithm section 270. The algorithm section 270 stores a plurality of algorithms for retrieval and subsequent execution by the system-on-a-chip integrated circuit. The algorithms may include operational instructions, overlays, functional subroutines, foundation algorithms, satellite algorithms, etc. In addition, one or more algorithms may constitute an application. For example, an application may be file storage, MP3 playback, MP3 record, WMA playback, et cetera.

The on-chip RAM 33 includes a static algorithm section 272 and a dynamic algorithm section 274. The static algorithm section 272 stores the memory management algorithm 280, which coordinates the retrieval of algorithms 270 from memory IC 16 and may further coordinate the retrieval of data 282 from the memory integrated circuit 16. The static algorithm section 272 further stores foundation algorithms 278. A foundation algorithm is an algorithm that stays within RAM 33 for a relatively long period of time and may call satellite algorithms during execution, including based on external stimuli such as pause, fast-forward, et cetera. For example, a foundation algorithm 278 may correspond to MP3 decode algorithm, WMA decode algorithm, et cetera. A satellite algorithm 276 is one that is stored a much shorter time in RAM 33 with respect to a foundation algorithm 78 and is generally called by a foundation algorithm. For example, a satellite algorithm 276 may include data mixing, display processing algorithm, a menu algorithm and/or sub-menu algorithms.

The dynamic algorithm section 274 may be partitioned to store varying levels of satellite algorithms 276. For example, one section of the dynamic algorithm section 274 may store satellite algorithms that are rapidly replaced, another section that stores satellite algorithms that are less rapidly replaced, et cetera.

The algorithms stored in the memory integrated circuit 16 may correspond to a file system algorithm, a host system interface algorithm (e.g., such as a USB interface algorithm), an audio playback algorithm, a video playback algorithm, an audio record algorithm, a video record algorithm, and/or a text presentation algorithm. The algorithms may correspond to functional coding blocks that are retrieved only when needed. This will be further illustrated with respect to FIG. 16.

The memory integrated circuit 16 may be a NAND flash memory, which, as is known, is well suited for bulk storage of data but not for high-speed retrieval of data. Accordingly, by utilizing a NAND flash memory as the system memory for a handheld device, the retrieval of data and/or algorithms from the system memory is prioritized over the processing efficiency of the processing module. By prioritizing the retrieval of data and/or algorithms from the system memory over processing efficiency of the processing module reduces power consumption of the functional integrated circuit.

Since the RAM 33 may store in the same locations multiple algorithms, debugging and/or testing the proper functionality of the handheld device is difficult. To reduce this difficulty, each of the algorithms stored in the memory integrated circuit 16 include a unique application identification code. This identification code is utilized by an external debugger device to retrieve the corresponding source code of the algorithm stored in the RAM at any given time. It is to be noted that the memory integrated circuit 16 and hence the RAM 33, stores the algorithms in an object code. For human debugging of a system and/or testing of the system, it is desirable to present source code of the corresponding algorithm. To enable a debugger to provide the appropriate source code, it uses the unique application identification code of the corresponding algorithm stored in RAM 33 to retrieve the appropriate source code.

Figure 16:
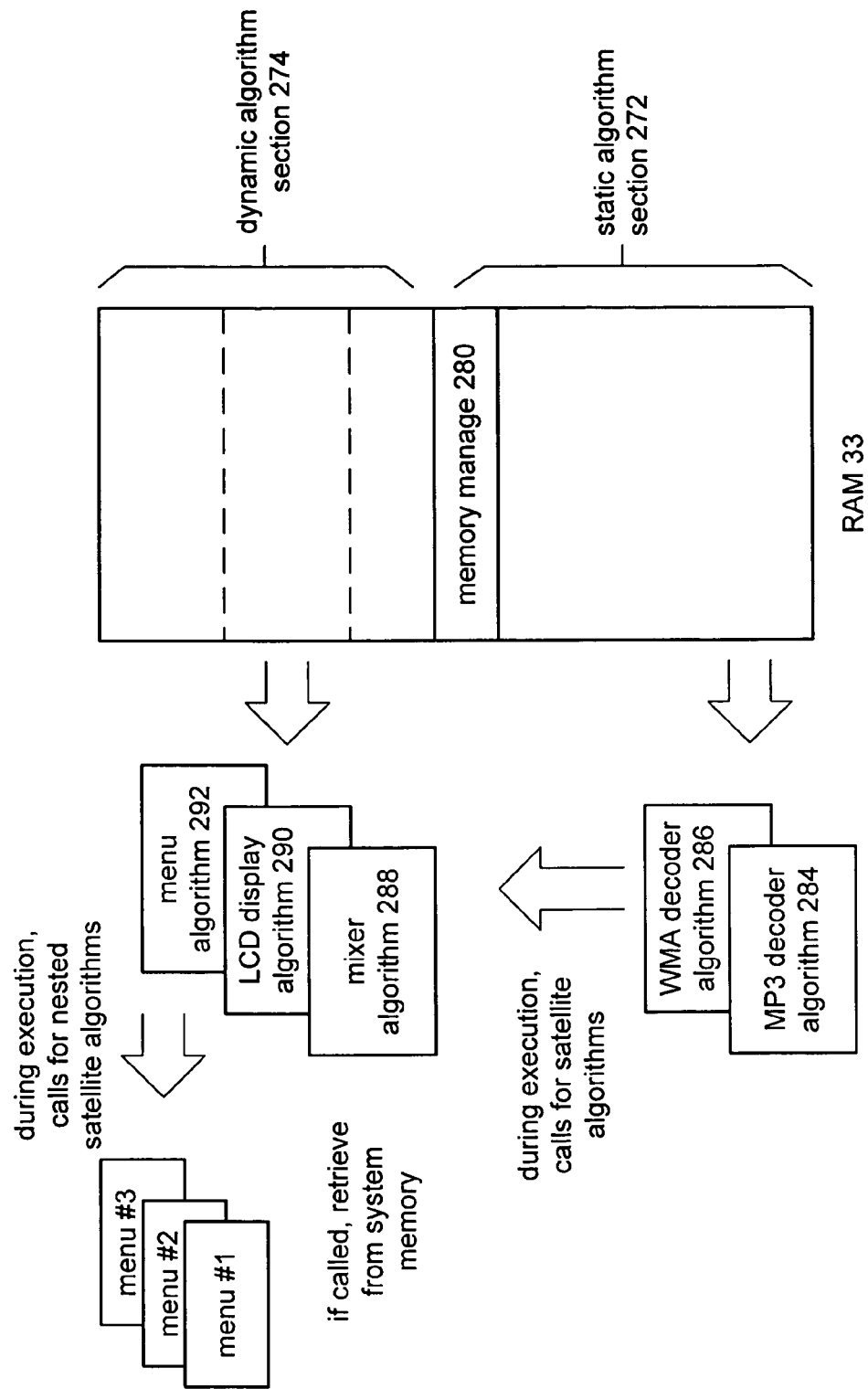

FIG. 16 is a diagram illustrating an example of the use of on-chip RAM 33. As shown, the RAM 33 includes a static algorithm section 272 and a dynamic algorithm section 274. Within the static algorithm section 272, the RAM 33 stores the memory management algorithm 280, which coordinates the retrieval of foundation and satellite algorithms from the system memory IC 16. In this example, a foundation algorithm may be an MP3 decoder algorithm 284 and/or a WMA decoder algorithm 286. Such decoder algorithms 284 and 286 would be stored in the static algorithm section 272 of RAM 33. These algorithms are considered foundation algorithms since as long as the handheld device is in a playback mode, these algorithms may be used.

During the execution of a decoder algorithm 284 or 286, it may call for a satellite algorithm. Such a satellite algorithm may be a mixer algorithm 288, an LCD display algorithm 290 and/or a menu algorithm 292. For example, during the playback of a MP3 file, the user of the handheld device may issue a pause command. For the processing of this pause command, the MP3 decoder would retrieve the LCD display algorithm 290 which, when processed causes a pause function to be displayed on the display. In addition, a corresponding pause function may be retrieved such that the playback is paused until an input stimulus reactivates playback or some other input stimulus is obtained.

In addition, during the execution of the decoder algorithm 284 or 286, the user may request for display of a menu. In this instance, the decoder algorithm 284 or 286 would call the satellite algorithm corresponding to menu algorithm 292. The menu algorithm 292, in turn may retrieve a plurality of nested satellite algorithms corresponding to particular menus. For example, the menu algorithm 292 may include a plurality of topics from which the user may select. Once a particular topic is selected, the corresponding menu, which provides the individual selections for that topic, is retrieved and subsequently provided to the user. As additional satellite algorithms are retrieved from memory, they are stored in the dynamic algorithm section 274 by overriding existing satellite algorithms that are no longer in use or no longer immediately needed. As such, the use of the system memory in conjunction with RAM 33 in this manner, allows the handheld device to execute a variety of applications and have such applications reprogrammed or new applications installed, without hardware change to the memory structure of the system-on-a-chip integrated circuit in an optimal manner that reduces power consumption. Further discussions of the operations of memory 16 and RAM 33 are set forth in detail in reference to FIGS. 29-34.

Figure 17:
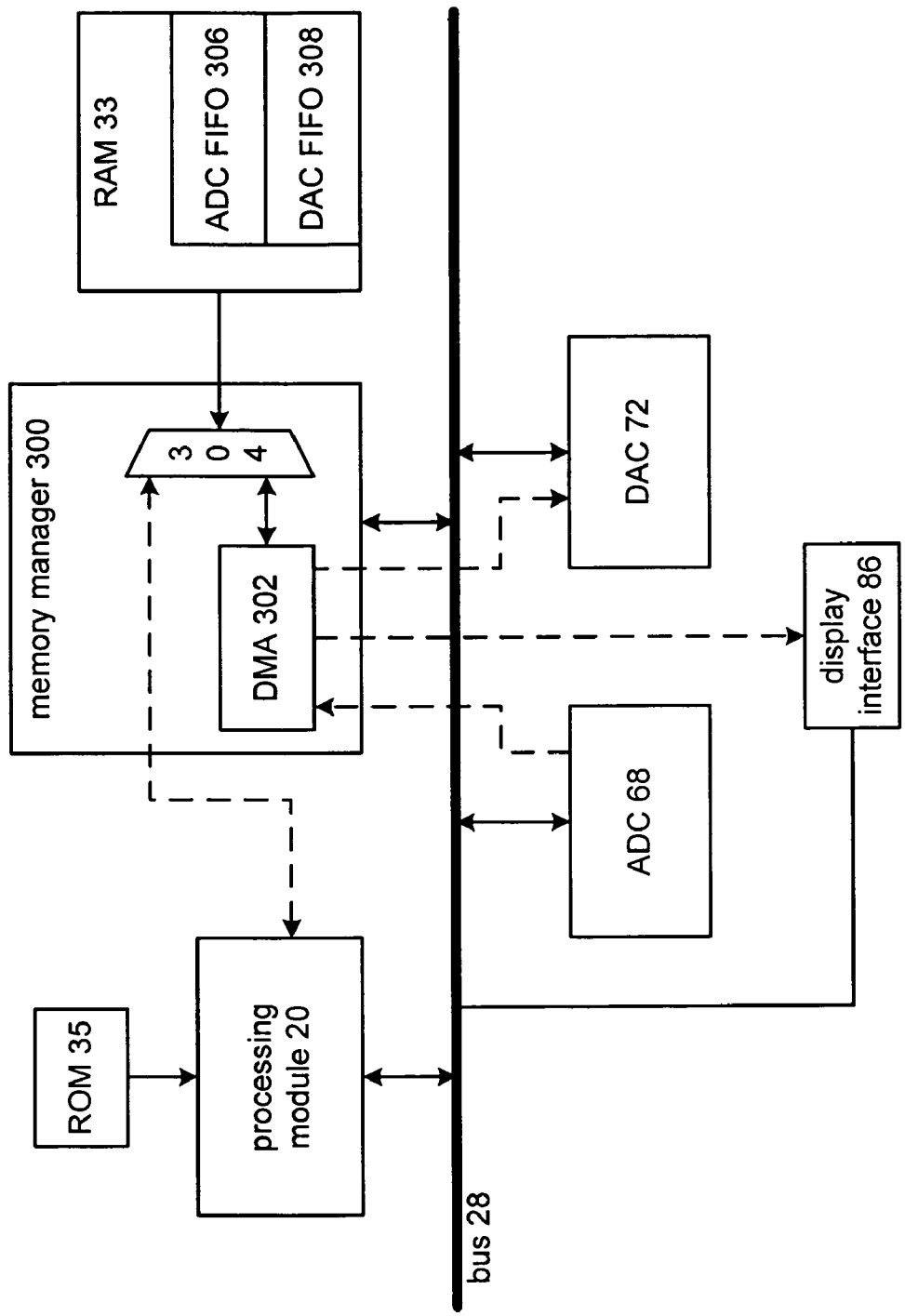

FIGS. 17 is a schematic block diagram illustrating memory access of RAM 33. In this illustration, RAM 33 functions as an L2 cache or L1 cache for processing module 20 and further functions as a first-in-first-out buffer for the analog-to-digital converter and digital-to-analog converter. The memory manager 300, which may include a direct memory access device 302 and a multiplexer 304 controls the access to RAM 33. The multiplexer 304, provides access to RAM 33 among the processing module 20 and the DMA module 302. The DMA module 302 arbitrates access to RAM 33 between the analog-to-digital converter 68, the digital-to-analog converter 72 and the display interface 86. For example, when the analog-to-digital converter 68 is producing digital information, the DMA module 302, via multiplexer 304, provides a path for the analog-to-digital converter 68 to write the digital data into the analog-to-digital converter first-in-first-out section 306 of RAM 33. Similarly, when the digital-to-analog converter 72 is to convert digital data to analog data, it retrieves the data from the DAC FIFO section 308 via the memory manager. The display interface 86 may also retrieve data for display from RAM 33 via the memory manager 300.

By utilizing a single RAM 33 on-chip for multiple functions as opposed to separate RAMs for each function, the overall size of the RAM is reduced, thus reducing the overall size of the system-on-a-chip integrated circuit.

FIG. 18 illustrates a schematic block diagram of the DC to DC converter 26. As shown, the DC to DC converter 26 includes a regulation module 310, a source transistor 33, output transistors T1 and T2, gate logic module 312, output capacitor C1 and C2, an off-chip inductor L and battery 14. In operation, the DC to DC converter 26 produces a $1^{st}$ and $2^{nd}$ output voltage $V_{DD1}$ and $V_{DD2}$. In this configuration, the DC to DC converter 26 is acting in a boost mode. Accordingly, during one phase of a regulation cycle, the regulation module 310 activates transistor T3 and keeps transistors T1 and T2 off. In this configuration, energy is built up across inductor L. During a next interval of the regulation cycle, the regulation module 310 activates either transistor T1 or transistor T2. If, for example, T1 is activated, at least some of the energy stored in inductor L is provided via T1 to capacitor C1 to produce output $V_{DD1}$. Alternatively, when transistor T2 is activated, the energy from the inductor is provided to capacitor C2 to produce output $V_{DD2}$.

If, for example, output $V_{DD1}$ is 3.3 volts and output $V_{DD2}$ is 1.8 volts, without the gate logic module 312, transistor T2 would be required to be a 3.3 volt transistor. It is to be noted that the gate oxide layer of a transistor in addition to its length and width, may need to be increased as the operating voltage increases. Accordingly, a 1.8 volt transistor may be approximately $\frac{1}{4}^{th}$ the size of a 3.3 volt transistor. Further, the operational characteristics of a 3.3 volt transistor in comparison to a 1.8 volt transistor are slower, with respect to turning on and turning off and also has a greater impedance. As the operating rates of a DC to DC converter increase, a 3.3 volt transistor may be ineffective for use on a 1.8 volt output. To overcome this issue, a gate logic module 312 is used to gate transistor T2. By utilizing the gate logic module 312, transistor T2 may be a 1.8 volt transistor for example. The gate logic module functions as illustrated in the truth table illustrated in FIG. 18. For example, if transistor T1 is on, the gate logic module 312 sets the gate and well voltage of transistor T2 to be $V_{DD1}$. If transistor T1 is off and transistor T3 is on, the gate logic module 312 sets the gate and well voltage of transistor T2 to $V_{DD2}$. If transistor T1 is off and transistor T2 is on, the gate logic module 312 sets the gate and well voltage of transistor T2 to 0 volts thus turning transistor T2 on.

FIG. 19 illustrates a logic diagram of a method that may be implemented by the regulation module 310 to provide current limiting for the DC to DC converter 26. The process begins at Step 320 where the regulation module determines a current loading duty cycle of an output of the DC to DC converter. With reference to FIG. 20, the current loading duty cycle of an output of a DC to DC converter corresponds to the particular current being drawn and the adjusted duty cycle to support that load. As shown in FIG. 20, when 0 current (i.e., no load) is placed on the particular output, the duty cycle corresponds to $(V_{out}-V_{bat})V_{out}$. As load is applied to this particular output, the duty cycle is represented by the equation $(V_{out}-V_{bat}+I*R_T)/V_{out}$, where $R_T$ corresponds to the impedance of the corresponding switching transistor (e.g., T1 or T2). Accordingly, the particular current being drawn could have a corresponding duty cycle based on the impedance of the resistor.

Returning to the logic diagram of FIG. 19, the process proceeds to Step 322 where the current loading duty cycle is compared with a zero loading duty cycle of the output. The process then proceeds to Step 324 where a determination is made as to whether the current loading duty cycle exceeds the zero loading duty cycle plus a duty cycle loading offset. The duty cycle loading offset corresponds to the desired current limit setting. Again with reference to FIG. 20, the duty cycle loading offset corresponds to the $I*R_T$ component of the duty cycle with load. If the current loading does not exceed the zero current loading plus the duty cycle offset, the process proceeds to Step 326 where no current limiting is applied.

If, however, the current loading duty cycle exceeds or equals the zero loading duty cycle plus a duty cycle loading offset, the process proceeds to Step 328. At Step 328 the duty cycle is limited for the corresponding output based on the zero loading duty cycle plus the duty cycle loading offset. For example, with reference to FIG. 20, as the load increases from zero, the graph is followed. Once the duty cycle reaches the zero duty cycle plus the loading offset, the current will be at a particular level (i.e., I limit). At this point, the duty cycle is clamped to this value thus clamping the current to this corresponding level.

Figure 21:
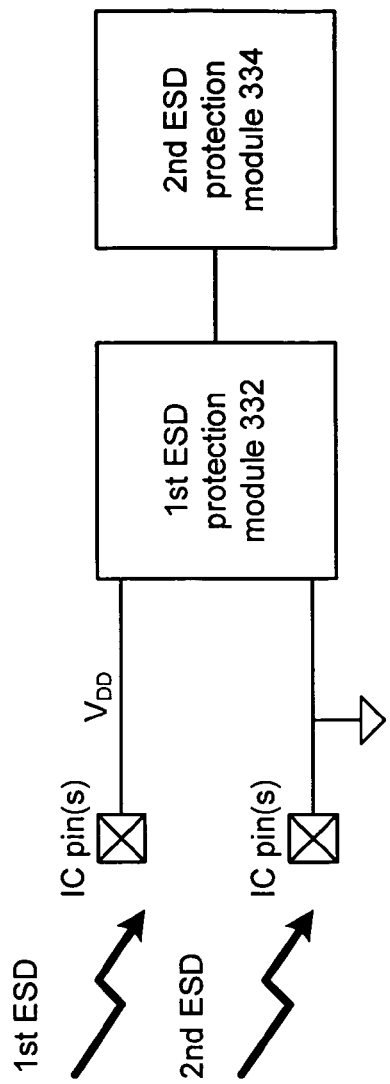
FIG. 21 is a schematic block diagram of an electrostatic protection circuit in accordance with one embodiment of the present invention.

FIG. 21 illustrates a schematic block diagram of an electrostatic discharge (ESD) protection circuit 330 that may be incorporated in the system-on-a-chip integrated circuit 12. The ESD protection circuit 330 includes a $1^{st}$ ESD protection module 332 that is coupled to pins of the integrated circuit. The ESD protection circuit 330 also includes a $2^{nd}$ ESD protection module 334. The $1^{st}$ ESD protection module 332 protects against a $1^{st}$ type of ESD event, which corresponds to when the integrated circuit is not operational and not installed on a printed circuit board. Such ESD protection is required to protect against a 2 kilovolt surge.

The $2^{nd}$ ESD protection module 334 is operably coupled to protect the integrated circuit from a $2^{nd}$ type of ESD event when the integrated circuit is operational and/or installed on a printed circuit board. Such protection may protect against a 15 kilovolt surge.

Figure 22:
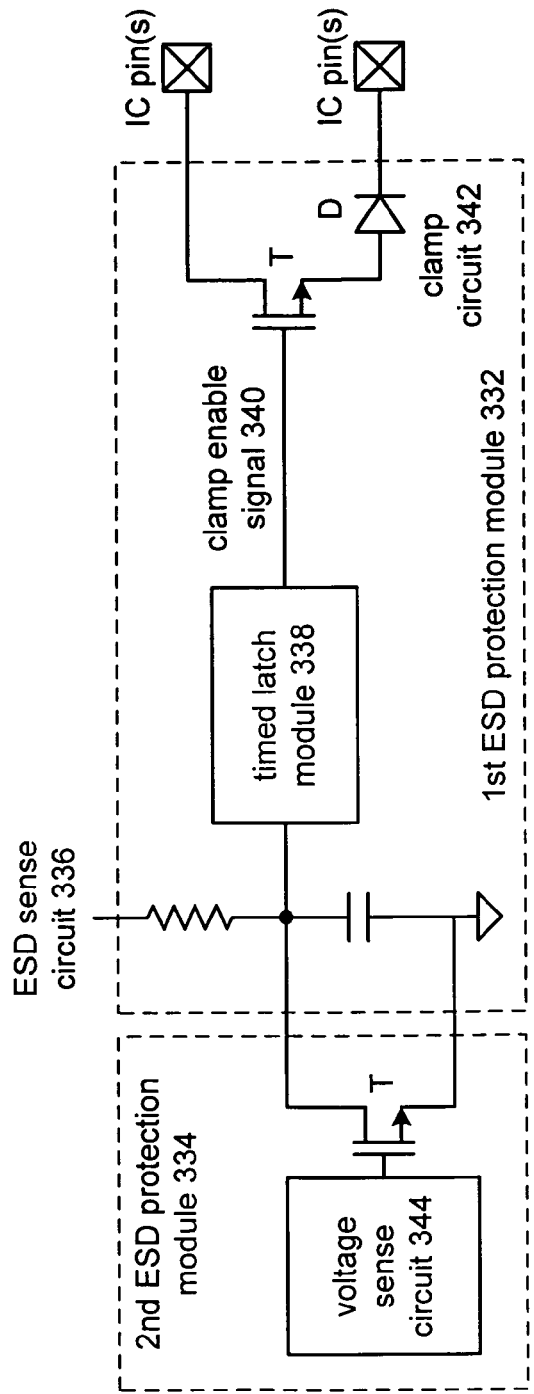
FIG. 22 is a schematic block diagram of another electrostatic protection circuit in accordance with one embodiment of the present invention.

FIG. 22 illustrates a schematic block diagram of an alternate ESD protection circuit 335. The ESD protection circuit 335 includes the $1^{st}$ ESD protection module 332 and the $2^{nd}$ ESD protection module 334. The $1^{st}$ ESD protection module 332 includes an ESD sensing circuit 336, which includes a resistor and capacitor, a timed latch module 338, and a clamping circuit 342. The clamp circuit 342 includes a transistor and may further include an optional diode. When a $1^{st}$ type of ESD event is sensed via the ESD sense circuit 336, and the $2^{nd}$ ESD protection module 334 is disabled, a voltage is imposed across the capacitor triggering the timed latch module 338. The timed latch module 338 generates a clamp enable signal 340 for a particular duration of time (e.g., a few milliseconds to a few seconds) to enable the clamp circuit 342. With the clamp circuit 342 enabled, energy of the ESD event on the integrated circuit pins is substantially dissipated via the clamp circuit 342.

Once the integrated circuit is installed on a printed circuit board, the $2^{nd}$ ESD protection module 334 may be activated. The $2^{nd}$ ESD protection module 334 includes a transistor T and a voltage sense circuit 344. The voltage sense circuit senses whether a supply voltage is present. When a supply voltage is present, transistor T is enabled, which is coupled across the capacitor of the ESD sense circuit 336 of the $1^{st}$ protection module 332. As such, the $2^{nd}$ ESD protection module 334 substantially disables the $1^{st}$ protection module 332 to prevent the shut down of the integrated circuit through latching of the $1^{st}$ ESD protection module. Typically, the installation of an integrated circuit on a printed circuit board will provide sufficient ESD protection to protect against a $2^{nd}$ type of ESD event.

Figure 23:
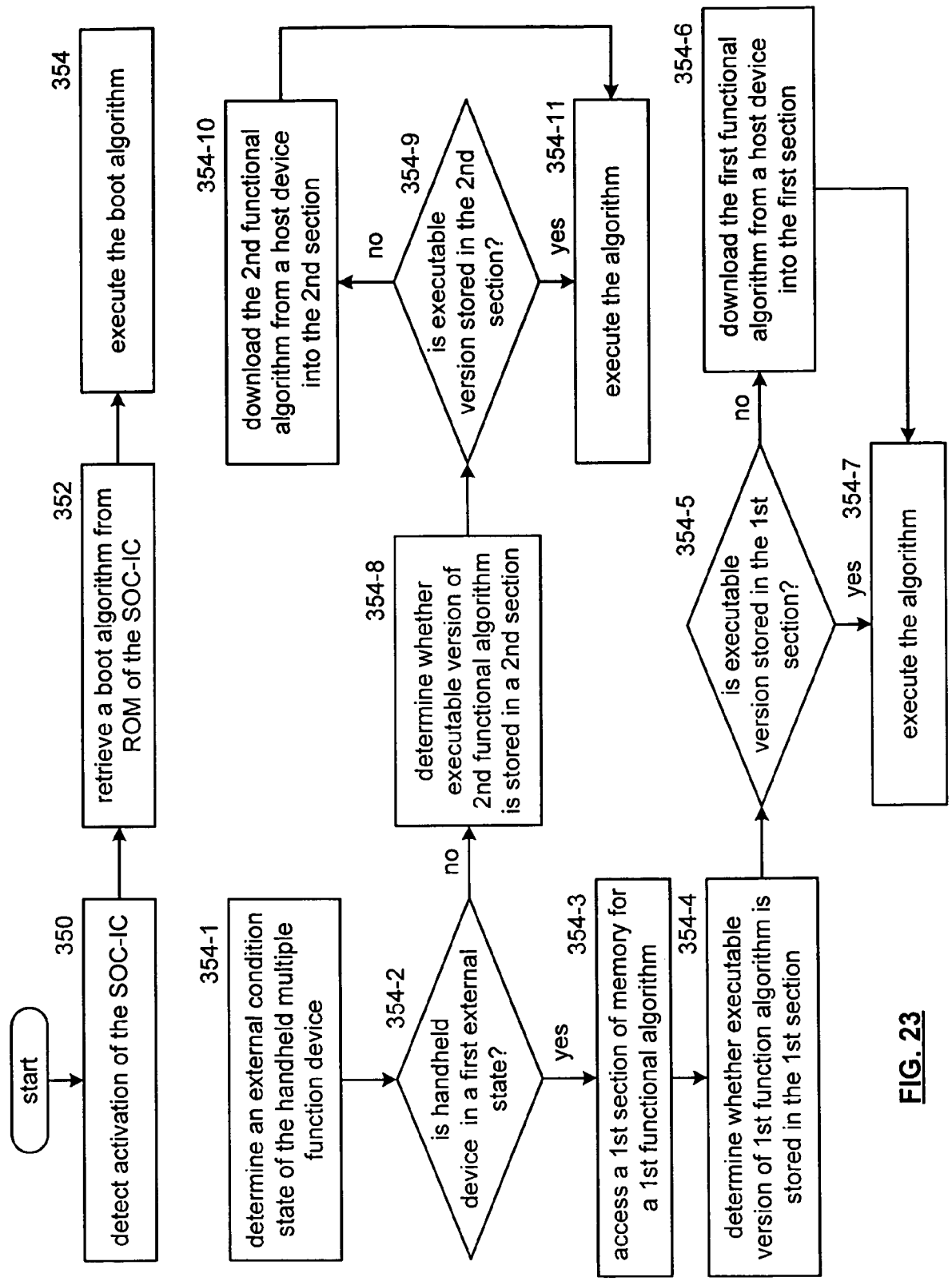
FIG. 23 is a logic diagram of a method for loading and/or programming a system on a chip in accordance with one embodiment of the present invention.

FIG. 23 is a logic diagram of a method for booting up, and/or programming a system-on-a-chip integrated circuit that is used in a handheld multiple function device. The process begins at Step 350 where activation of the system-on-a-chip integrated circuit is detected. This may also include the detection of a reset of the system-on-a-chip. For example, to activate a reset of the system-on-a-chip, the play button of the handheld device may be held for 5 seconds. Having detected the activation of the system-on-a-chip, the process proceeds to Step 352 where a boot algorithm is retrieved from on-chip ROM of the system-on-a-chip. The process then proceeds to Step 354 where the boot algorithm is executed.

Processing Steps 354-1 through 354-11 illustrate the execution of the boot algorithm. At Step 354-1 an external condition state of the handheld functional device is determined. The external condition may correspond to the device being coupled to a host or not coupled to a host. The process then proceeds to Step 354-2 where a determination is made as to whether the device is in a $1^{st}$ external state. The $1^{st}$ external state may correspond to when the device is a portable unit and a $2^{nd}$ external state may correspond to when the handheld device is coupled to a host. If the device is in a $1^{st}$ external state (e.g., is functioning as a portable device) the process proceeds to Step 354-3. At Step 354-3 a $1^{st}$ section of memory is accessed for a $1^{st}$ functional algorithm. For example, the $1^{st}$ functional algorithm may correspond to MP3 playback, voice dictation record, WMA playback, et cetera. The process then proceeds to Step 354-4 to determine whether an executable version of the $1^{st}$ functional algorithm is stored in the $1^{st}$ section of the system memory of the handheld device. An executable version is one that is stored and is not corrupted.

The process then proceeds to Step 354-5 where the processing branch is based on whether an executable version is stored in the $1^{st}$ section. When the executable version is not stored, the process proceeds to Step 354-6 where the $1^{st}$ functional algorithm is downloaded from a host device into the $1^{st}$ section of memory. To download the $1^{st}$ functional algorithm, the handheld device is coupled to the host device.

If the $1^{st}$ version is executable and/or has been downloaded and is thus executable, the process proceeds to Step 354-7 where the $1^{st}$ functional algorithm is executed.

If the handheld device is in a $2^{nd}$ external state, the process proceeds to Step 354-8 where a determination is made as to whether a $2^{nd}$ executable version of the functional algorithm is stored in a $2^{nd}$ section of memory. This executable version may correspond to a file storage algorithm, a USB interface algorithm, and/or any other type of algorithm that facilitates the communication between a handheld device and a host device.

The process then proceeds to Step 354-9 where the processing branch is based on whether the executable version of the $2^{nd}$ functional algorithm is stored in a $2^{nd}$ section of the memory of the system memory. If not, the process proceeds to Step 354-10 where the $2^{nd}$ functional algorithm is downloaded from the host device into the $2^{nd}$ section of memory. Once an executable version of the $2^{nd}$ functional algorithm is stored in the system memory, the process proceeds to Step 354-11 where the executable algorithm is executed.

Figure 24:
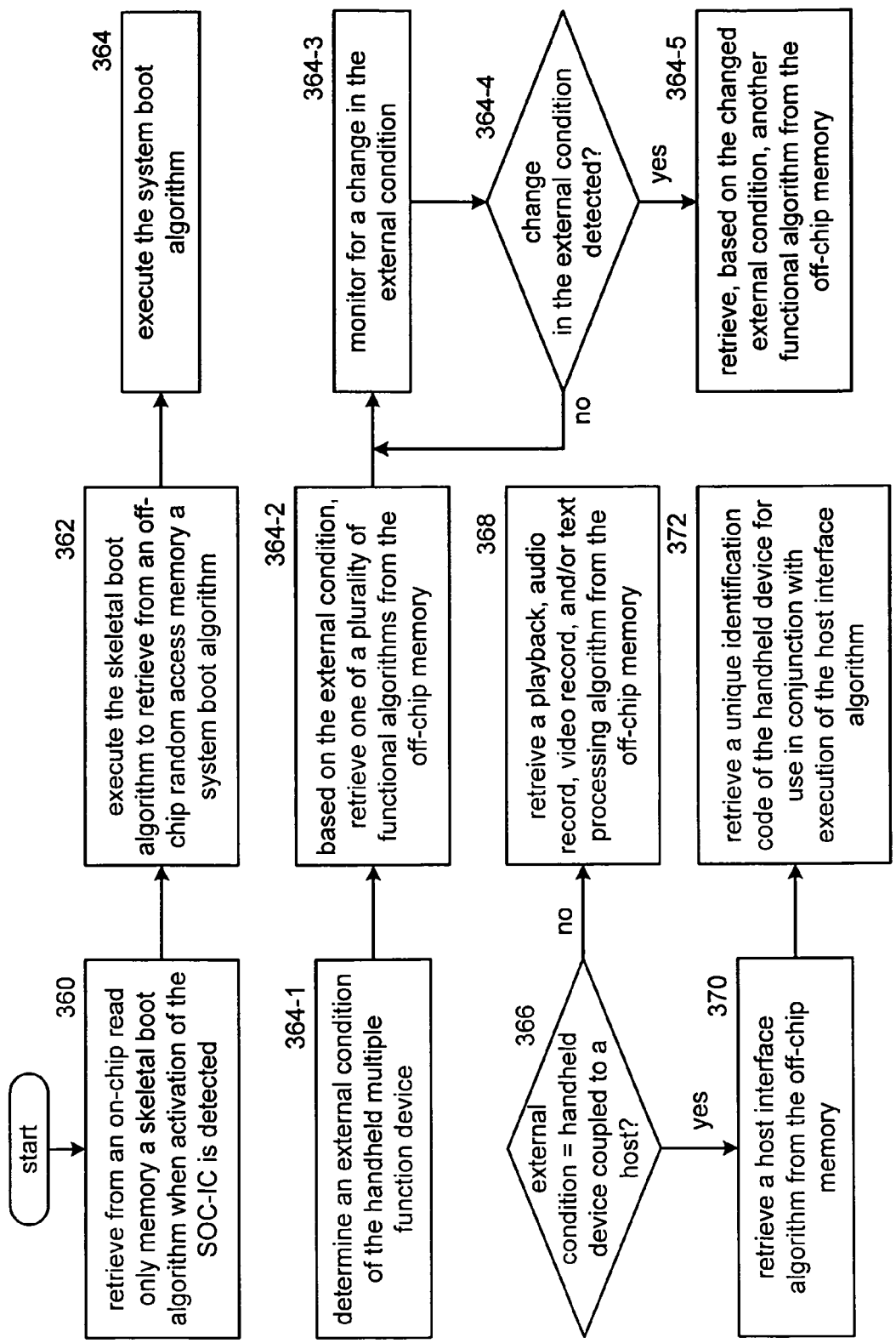
FIG. 24 is a logic diagram of a method for booting up a system on a chip in accordance with one embodiment of the present invention.

FIG. 24 is a logic diagram of a method for booting a system-on-a-chip integrated circuit that may be used in a handheld multi-functional device. The process begins at Step 360 where a skeletal boot algorithm is retrieved from on-chip read-only memory when the system-on-a-chip integrated circuit is activated. The process then proceeds to Step 362 where the skeletal boot algorithm is executed to retrieve from an off-chip RAM a system boot algorithm. The process then proceeds to Step 364 where the system boot algorithm is executed.

The execution of the system boot algorithm is further illustrated with respect to Steps 364-1 through 364-5. At Step 364-1, the processing module of the system-on-a-chip integrated circuit determines the external condition of the handheld multiple function device. This may be done as illustrated with respect to Steps 366-372. At Step 366, the processing unit determines whether the external condition corresponds to the handheld device being coupled to a host. If not, the process proceeds to Step 368 where the processing module retrieves a playback, audio record, video record and/or text processing algorithm from the off-chip system memory.

If, however, the external condition corresponds to the handheld device being coupled to the host, the process proceeds to Step 370. At Step 370, the processing module retrieves a host interface algorithm from the off-chip memory. The process then proceeds to Step 372 where the processing module retrieves a unique identification code of the handheld device for use in conjunction with the execution of the host interface algorithm. For example, if the host interface algorithm corresponds to a USB interface algorithm (e.g., version 1, 2, et cetera), in accordance with the standard, each device has a USB identification code. This code may be stored in the off-chip RAM for ease of manufacturing a USB interface compliant device and used when the USB interface algorithm is executed.

Returning to the execution of the system boot algorithm the process proceeds to Step 364-2. At Step 364-2, the processing unit, based on the external condition, retrieves one of a plurality of functional algorithms from the off-chip memory. The functional algorithm may correspond to a file system algorithm when the device is coupled to a host for facilitating storage of data received from the host or may correspond to a playback algorithm when the handheld device is not coupled to the host.

The process then proceeds to Step 364-3 where the processing module monitors for a change in the external condition. The process then proceeds to Step 364-4 where the processing module branches its functionality based on whether an external condition has changed. If so, the process proceeds to Step 364-5 where the processing module retrieves, based on the external changed external condition, another functional algorithm from the off-chip memory. For example, if the device was in a portable mode, the processing module was executing a playback algorithm or record algorithm et cetera. When the external condition has changed such that the handheld device is coupled to a host, the processing module retrieves a file system algorithm as well as the interface algorithm.

FIG. 25 illustrates a logic diagram of a method for efficient battery use by a handheld multiple function device. The process may begin at Step 380, 382 and/or 384. At Step 380, the device monitors at least one output of a system-on-a-chip for an overload condition. At Step 382, the device monitors a system voltage produced by the DC to DC converter for a system low voltage condition, which indicates that the battery is running out of energy. Note that the overload condition corresponds to a potential short of one of the outputs of the system-on-a-chip, which typically may correspond to a headphone jack short. At Step 384, the device monitors the voltage of the battery for a battery low voltage condition, which may correspond to the battery not being coupled to the handheld device. For example, the battery may fall out of the handheld device. The process then proceeds to Step 386 where the device determines whether an overload condition occurs, a system low voltage condition occurs and/or a battery low voltage is detected. If not, the device continues monitoring as described with respect to Steps 380, 382 and 384. If, however, an overload, system low voltage and/or battery low voltage is detected, the process proceeds to Step 388. At Step 388, the device enables one of a plurality of fail-safe algorithms based on the condition. The fail-safe algorithms are illustrated in FIGS. 26-28.

FIG. 26 illustrates a logic diagram of a method corresponding to an overload fail-safe algorithm. The processing begins at Step 390 where once an overload condition is detected, i.e., a short exists on the output, the at least one output is disabled for a predetermined period of time (e.g., a few milliseconds to a few tens of seconds). The process then proceeds to Step 392 where after expiration of the predetermined period of time, the output is again enabled. The process then proceeds to Step 394 where the monitoring for the overload condition is resumed. In such an overload condition, the output is disabled while the remaining functionality of the chip is kept in tact.

FIG. 27 is a logic diagram of a method illustrating a system low voltage fail-safe algorithm. In this instance, the system is detecting that the battery is running out of energy. When such a condition occurs, the processing begins at Step 396 where at least one of the outputs is disabled to remove the loading on the system-on-a-chip and hence reducing the loading on the battery. The process then proceeds to Step 398 where the current settings corresponding to the execution of a functional algorithm being executed is stored. The process then proceeds to Step 400 where the handheld device is shut down. Accordingly, by shutting the system down in this manner, when the battery is replaced, the execution of the functional algorithm may be picked up where it was left off without requiring the system to be rebooted and/or algorithms to be reloaded from the system memory.

FIG. 28 is a logic diagram of a method for a battery low voltage fail-safe algorithm. This algorithm provides the processing steps corresponding to when the battery voltage drops to zero, which typically occurs when the battery falls out of the device and/or loses contact with the device. The processing begins at Step 402 where essential current settings correspond to the execution of the at least one functional algorithm are stored. These essential settings correspond to which algorithm is being executed and allowing the algorithm to be shut down in a safe mechanism without it locking up. If the algorithm were to lock, the handheld device would be locked and would require external reprogramming to reactivate. The process then proceeds to Step 404 where the boot process is reset.

MEMORY OVERLAYS

As was noted above in reference to FIGS. 15 and 16, algorithms may be retained in another memory device (such as memory 16) and loaded into the RAM 33 as needed. The term algorithm is generic in nature and encompass a variety of software, including instructions, programs, applications, codes, etc. Accordingly, the term program is used below to define an algorithm or series of code that provide a particular function. The term instruction is used below to define a line or lines of code that provide a specific manipulative task. Program statements may be instructions, as well. Typically, the algorithms are retained in a memory device, such as memory IC 16, which is a device located external to the integrated circuit 12. Also, as described in reference to the description of FIG. 15, foundation algorithm(s) 278 are loaded into the static algorithm section 272 of RAM 33 while satellite algorithm(s) 276 are loaded into the dynamic algorithm section 274 of RAM 33. As noted, there may be a memory management portion 280 which is also loaded into RAM 33.

In practice, memory 16 typically has much larger memory capacity than RAM 33. Since only a portion of the programs resident in memory 16 may be loaded into RAM 33 at a given time, an overlay mechanism is implemented in order to swap in and out those program(s) which may be needed for current execution by various units of the handheld device, including those components present within integrated circuit 12. Since programs which are regarded as foundation algorithms are typically employed to be the main program for the device, programs loaded into the static algorithm section 272 are generally retained and utilized for the main programming to operate the integrated circuit 12. However, programs employed as satellite algorithms generally comprise those programs which tend to be more specific in function and are generally not algorithms that stay for a relatively long period of time. Since the satellite algorithms may not be employed other than for short term use or for performing a single use, feature or application, the satellite algorithms may be replaced (swapped) by other algorithms as tasks are completed. Accordingly, in one embodiment for practicing the invention, the dynamic algorithm section 274 comprises a portion of RAM, which may be regarded or referred to as an overlay space in which satellite programs/algorithms may then be loaded and subsequently replaced by other satellite programs/algorithms as tasks are performed and completed.

Figure 29:
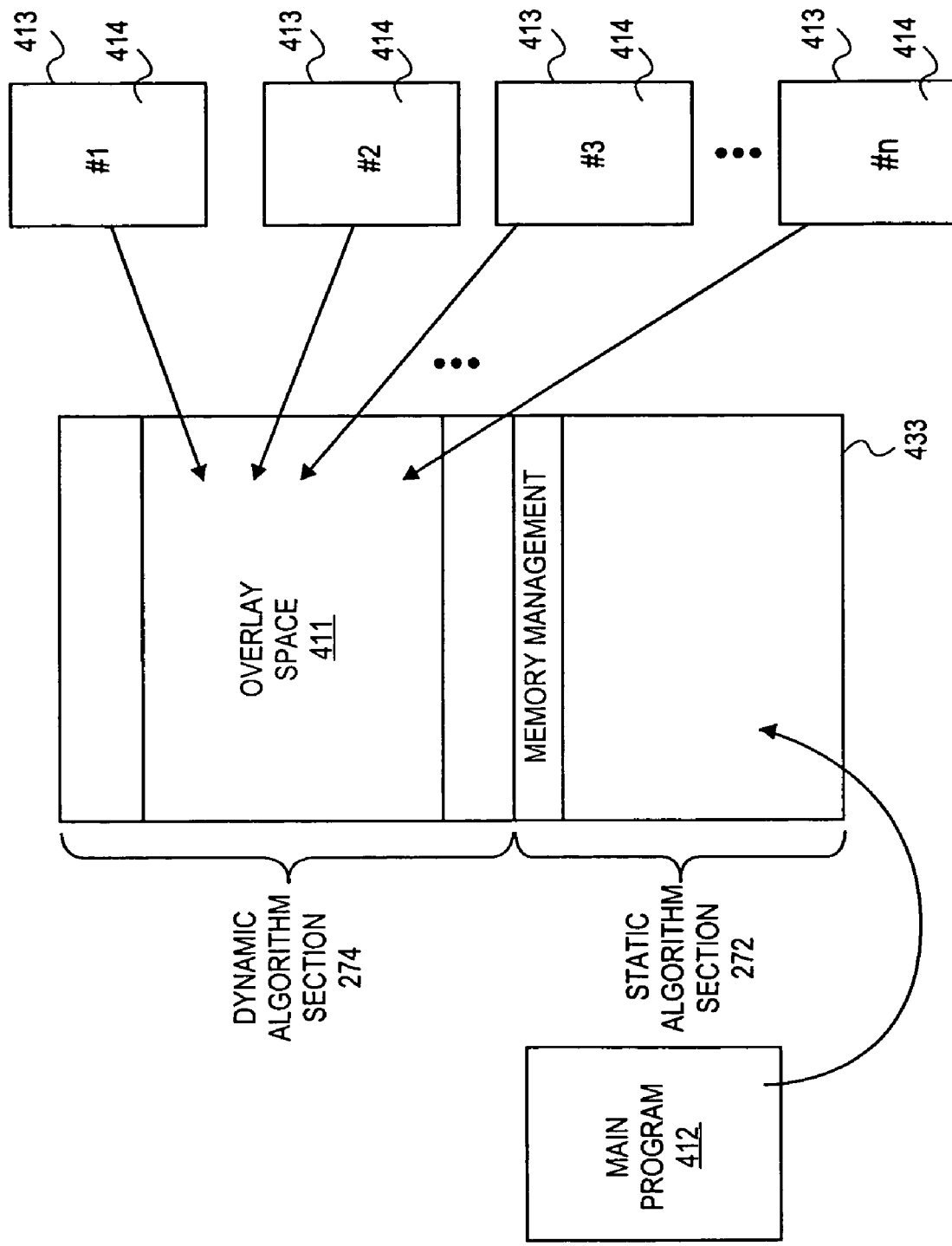
FIG. 29 is a diagram of an embodiment of a memory system in which an overlay space is assigned for overlaying programs stored in an external memory device.

One way of achieving the swapping of the satellite algorithms 276 is to employ an overlay space 411 within the dynamic algorithm section 274 of RAM 33. The overlay space 411 may comprise all of the dynamic algorithm section 274 or a portion of such dynamic algorithm section 274. FIG. 29 shows one embodiment of employing an overlay space 411 of RAM 433 in order to swap out various programs 413 (noted as program #1, #2, #3 . . . #n), which programs (or portions of programs) are loaded into the overlay space 411 as needed. It is to be noted that RAM 433 in this embodiment is equivalent to RAM 33 of FIGS. 15 and 16.

In the example embodiment of FIG. 29, a foundation algorithm (for example, a main program 412 for the operation of the handheld device) is loaded into the static algorithm section 272. The main program 412 may be the main program for the operation of the handheld device and is generally the program that is used to call various other programs, including the satellite programs 413. Since the main program 412 is generally utilized for a relatively long period of time, it is retained in the static algorithm section 272. Various satellite algorithms, such as programs 413, are generally loaded into the dynamic algorithm section 274 since these programs are not utilized for a relatively long period of time.

In the particular embodiment shown, the overlay space 411 is utilized to overlay the various programs (or portions programs) 413, when programs loaded into the overlay space 411. If there is available memory space, the overlay space 411 may contain more than one of the program 413. However, in some instances, RAM 433 may have very limited amount of memory space available, so that only one program 413 may be stored in the overlay space 411 at any given time. In that instance, programs 413, such as programs #1-#n, may be loaded and then swapped out as other programs 413 are needed. Thus, in one embodiment, the overlay space 411 in the particular embodiment described herein has sufficient memory space to retain only one program 413 at any given time. Thus, as shown the overlay space 411 is designed to allow various programs 413 to be swapped in and out as needed, but only one program 413 may reside in overlay space 411 at any given time.

In the particular embodiment shown in FIG. 29, the various satellite algorithms shown as programs 413, are typically allocated to provide a specific function. Thus, programs 413 may be regarded as functional programs or functions. Furthermore, as will be described below, since functions are generally used in static programming (static space 272), the functional programs 413 that are stored into the overlay space 411 are termed funclets. Accordingly, the programs 413 which are to be placed into the overlay space 411 are referred to as funclets 414.

Thus, in the example embodiment of FIG. 29, when funclet #1 is to be utilized by a program, such as the main program 412, funclet #1 is loaded into the overlay space 411. Subsequently, if another funclet 414, such as funclet #2, is to be utilized by the main program 412, funclet #2 is placed in to the overlay space 411, overwriting funclet #1. Similarly, other funclets #3-#N as well as funclet #1, may be loaded into the overlay space 411 as needed to perform its designated operation. Thus, as the main program 412 is executed, various functions that may be called by the main program, are now performed by the various funclets 414, by having the proper funclet 414 loaded into the overlay space 411. With a limited amount of memory capacity, RAM 433 may be configured to use the overlay space 411 to operate on programs which altogether require substantially more memory space than that available within RAM 433.

As noted for the example embodiment shown in FIG. 29, the main program 412 is retained in the static algorithm section 272 and calls various funclets which contain specific functional programs into the overlay space 411 to be operated by the main program. Subsequent as other operations are required, other funclets may be placed into the overlay space 411 for operation by the main program 412. It is to be noted that in the example of FIG. 29, only one overlay space 411 is utilized and one funclet 414 is retained within the overlay space 411 at any given time. It is also to be noted that in other embodiments it is possible that multiple funclets 414 may be retained within overlay space 411.

Figure 30:
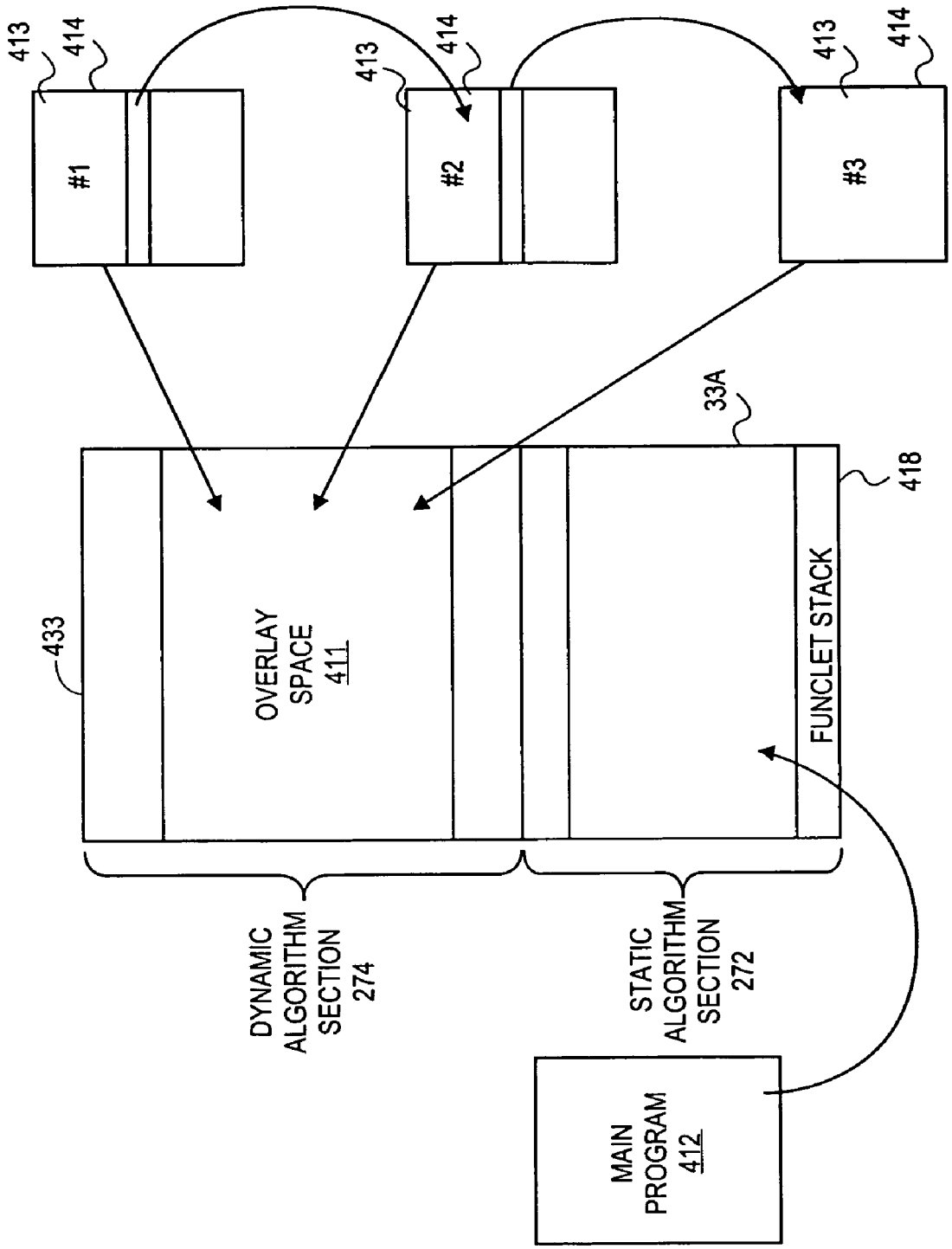
FIG. 30 is a diagram of the memory system of FIG. 29 in which the programs use nested overlays.

Referring to FIG. 30, RAM 433 may be used in order to allow nested funclets to be placed within overlay space 411. In this example embodiment, funclet #1 is placed into overlay space when called by the main program 412. However in this example, the execution of the funclet #1 may result in a second funclet (shown as funclet #2 in the example) to be called by funclet #1 to perform an operation which requires the use of funclet #2. Similarly, funclet #2 may contain a call to perform a certain operation which would be performed by the execution of funclet #3. Thus, in the example embodiment of FIG. 30, it is possible that a series of funclets may need to be nested in order to perform the function of the first funclet. In this instance, where the overlay space 411 is capable of only retaining one funclet, a series of funclet swapping occurs within the overlay space 411.

Thus in the example shown, the main program would load the overlay space 411 with funclet #1 initially to perform the operation desired of funclet #1. Subsequently during the execution of funclet #1, it requires a function that funclet #2 would perform. In this instance, funclet #1 would be replaced by funclet #2 in the overlay space 411. Similarly within funclet #2, an operation requires the use of funclet #3. Again, funclet #2 would be replaced by funclet #3 in the overlay space 411. However, in this instance since the execution of the funclets are nested, when funclet #3 completes its task, funclet #2 would need to be reloaded into overlay space 411 in order to finish the execution of the operation performed by funclet #2. Likewise, when funclet #2 completes its execution, funclet #1 will then be reloaded back into the overlay space 411 so that it then can complete its operation.

As a simple example of a nested operation, funclet #1 may be a display funclet that controls the operation of the user interface of the handheld device. Funclet #2 may be a particular menu which is to be used as part of the user interface in displaying a menu to the user. Funclet #3 may be a funclet designed to utilize a particular font to be displayed for the menu of the user interface. The nested funclet operations may be performed within the overlay space 411, but some mechanism keeps track of the order of the nested funclets, as well as the return location in retracing back through the nested group of funclets. That is, a mechanism is employed in order to track the return of one or more funclets into the overlay space 411 in order to complete the operation initiated by the main program 412.

Although a variety of mechanisms may be employed to maintain the record keeping for the nesting of the funclets, in the particular embodiment shown in FIG. 30, a stack mechanism is employed. A funclet stack 418, shown as part of static section of RAM 433, is used to stack funclet identifiers that may be pushed into the stack and then popped out of the stack as the nested operation is reversed to reload the funclets into overlay space 411 in return order. The stack 418 may also keep track of the return address as well. Although a variety of stacking mechanisms may be employed, in the particular example shown, a portion of the static algorithms section 272 is used as the funclet stack 418.

It is to be noted that with the embodiments shown in FIGS. 29 and 30, the RAM 433 is resident with an integrated circuit, such as integrated circuit 12 of FIG. 1. Furthermore, typically the funclets 414 are located external to the integrated circuit 12. In one example embodiment, the funclets 414 are resident within the memory device 16. Memory device 16 is external to the integrated circuit 12, but generally is part of the handheld device or is an add-on to the handheld device. Although a variety of memory devices may be used for memory 16, in one particular embodiment, memory 16 is comprised of flash memory. Although the size of the external memory 16 may be significantly larger in capacity than the RAM 433, the actual size is not critical to the understanding of the present invention. Thus, in one example embodiment, the RAM 433 has a memory size of approximately 64K bytes, while the external flash memory 16 has a memory capacity of 64M bytes or greater. Accordingly, significantly more data and programs may be stored in the external memory and some of the programming are stored as funclets.

It is to be noted that the programs 413 may be called directly from the main program 412 to be loaded into the overlay space 411 or from other programs or resources. However, in order to call a respective program 413 for a particular function, the main program may need to identify the particular program 413 to be loaded into the overlay space 411. Thus, when various funclets 414 are loaded into the memory 16 and configured to operate with the integrated circuit, the main program (or some other compiler program) assigns a unique application identification code, referred to also as a resource identifier, to the funclets 414 for loading into the overlay space 411. The unique resource identifier is used to reference the particular funclet 414 that is to be loaded into the overlay space 411. The resource identifiers are generally stored in the static section of the RAM 433.

Figure 31:
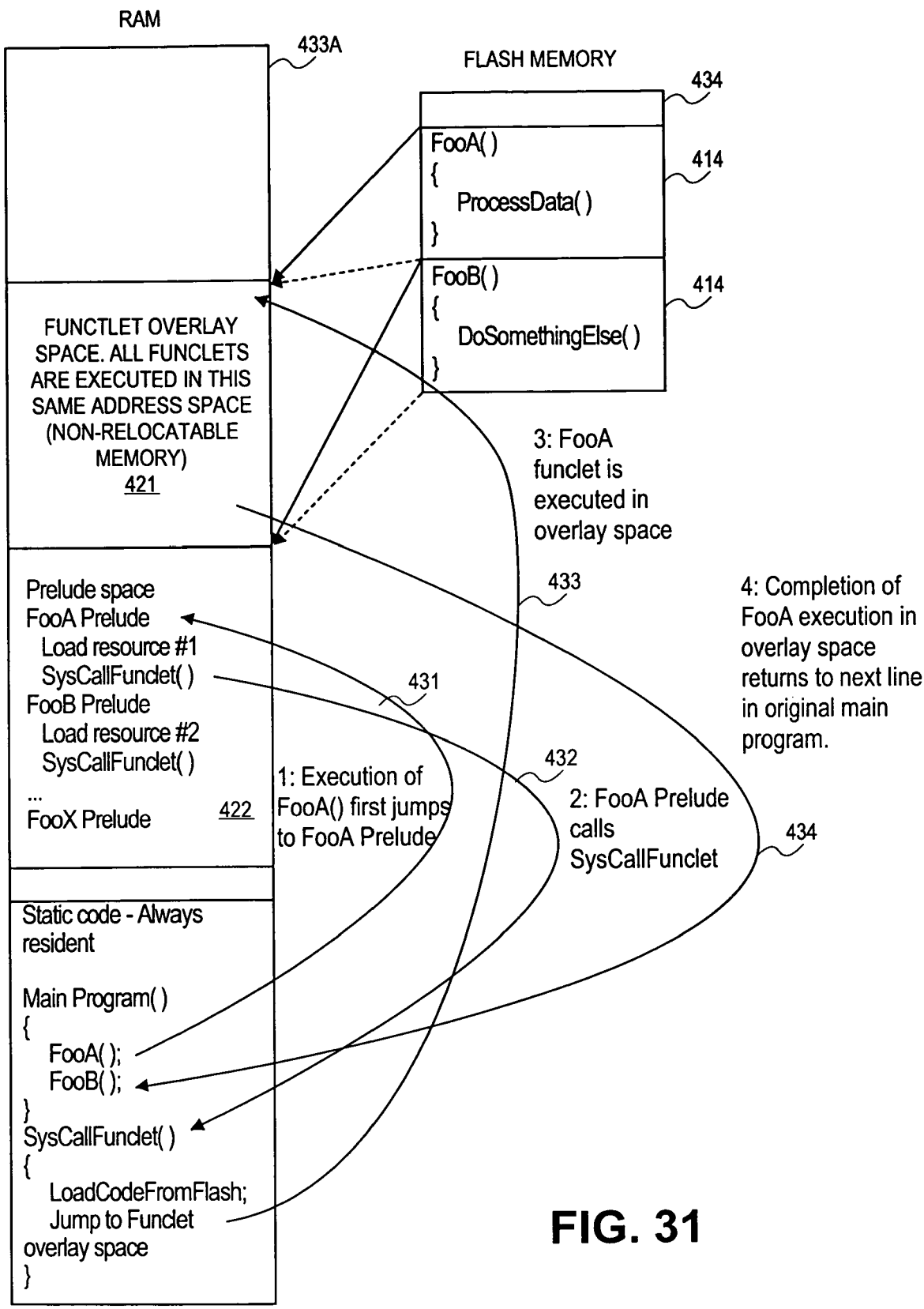
FIG. 31 is a diagram of the memory system of FIGS. 29 and 30, in which the overlaying is achieved by use of preludes and funclets.

In order to allow flexibility in programming so that the calling of the funclet 414 is transparent to the main program, an embodiment of the invention is illustrated in FIG. 31 in which funclet preludes are utilized to allow resource identifiers to be loaded separately from the main program. In FIG. 31, a RAM 433A (which is equivalent to RAM 433) is shown in which a main program is resident in the static algorithm section (equivalent to static section 272). In the dynamic algorithm section (equivalent to section 274), RAM 433A is partitioned to have a funclet overlay space 421 (equivalent to overlay space 411). A funclet prelude space 422 is also present to store funclet preludes. The funclet prelude space generally resides within the static section, but in other embodiments, it may reside in the dynamic section.

The funclet overlay space 421 operates equivalently to the overlay space 411 of FIGS. 29 and 30 to store funclets loaded from a memory device 434. Memory 434 is equivalent to memory 16. Memory 434 may be an external memory or it may be included within the integrated circuit containing RAM 433A. Furthermore, in the particular example, memory 434 is a flash memory device.

When the various funclets 414 stored in memory 434 are individually identified with a unique resource identifier, the resource identifiers are generally stored in the static portion of the RAM 433A. In the execution of the main program, a program line identifies that a particular function is to be performed. For example, the operation may be a power-down sequence to be initiated to power-down a headphone. In this instance, the program line to be executed may be in a form of a macro identifying the operation to be performed. In FIG. 31, the execution of a FooA( ) program statement causes a jump to a FooA prelude located within the prelude space 422. This is shown by arrow 431 in FIG. 31. When the FooA prelude is accessed by the main program, a load resource identifier associated with FooA prelude is loaded into a predefined register location specified by the system. In the example, FooA prelude is associated with funclet #1 and a load resource instruction loads the respective identifier to a specified storage location, which may be a register.

After the resource identifier is loaded, the prelude initiates a call to a SysCallFunclet( ) routine located in the static section of the RAM 433A. The SysCallFunclet( ) routine may be a sub-routine of the main program resident in the static section of RAM 433A or it may be a separate program. The call instruction from the prelude to the SysCallFunclet( ) routine is shown by arrow 432 in FIG. 31. Since the resource identifier has been loaded by the prelude instruction, the SysCallFunclet( ) instruction can obtain the location of the respective funclet and load the code from the memory 434 into the overlay space 421. Once the identified funclet is loaded into the overlay space 421 of RAM 434A, a jump instruction is initiated to the overlay space 421. In this particular embodiment only one overlay space 421 is allocated for the overlay of funclets, so the jump to the overlay space 421 may be established to have the same entry point for all funclets loaded into the overlay space 421. The jump to the funclet overlay space is identified by arrow 433. Having the same entry point for the overlay space 421 precludes a need to specify an entry address when the funclets are loaded and accessed.

Then, once the funclet operation is completed in the overlay space 421, execution of the control may be returned to the next line in the original main program, as shown by arrow 434. Subsequently, the next line of the main program may be executed. Subsequent instructions or program statements may then call other funclets. In the diagram of FIG. 31, the next line of the main program is shown to be a program statement to access prelude FooB( ), which causes a jump to the FooB( ) prelude in the prelude space 422. In the example shown, the jump is to FooB prelude which identifies a load resource identifier to be loaded.

It is to be noted that the main program does not identify the funclet to be called, but instead jumps to a funclet prelude in the prelude space 422 so that a resource identifier may be loaded for that prelude. A variety of funclets may be called by the selection of appropriate resource identifier numbers in the execution of the load resource identifier statement in the prelude space. Thus, when the main program calls a particular operation, such as a power down headphones operation, the funclet to be selected in response to the program statement may be programmed or modified by changing the load resource number in the particular prelude, so that the selection of the particular funclet is transparent to the main program. Thus, in the example, the main program line for powering-down the headphones would identify the operation by an instruction, which may be a macro instruction. Which funclet is to be selected for the power down sequence of the power down headphones instruction is determined by the load resource number for that prelude stored in the prelude space 422. By changing the load resource identifier number, the particular funclet to be selected for the FooA for the power down headphone operation may be programmably changed.

From the main program standpoint, the main program knows that it desires a power down of the headphones, but the operation of how that is achieved is made transparent to the main program. Accordingly, when device changes are made requiring a different funclet to be executed for a particular function, the main program need not be altered, since the selection of the funclet is not determined by the code in the main program. Instead, the load resource identifier for that funclet may be changed in the prelude space to now select a different funclet for operation with the new device. The use of the prelude allows the selection of the resource identifier in the prelude (not the main program). Furthermore, the point of entry into the overlay space need not be specified in the main program, since the same entry point into the overlay space 421 may be utilized for all funclets loaded into the overlay space 421.

When nested funclet operation is to be performed, such as the example shown in FIG. 30 where nested funclets are employed, a jump is made from the executing funclet in the overlay space 421 to a specified prelude associated with the nested jump instruction. The SysCallFunclet( ) routine is used to load the next nested funclet to be executed into the overlay space 421. Successive nested funclets are loaded into the overlay space 421 until the very last nested funclet is executed at which point the process is reversed to back track to the very first funclet. In each instance, the last funclet is written over by the current funclet loaded. Again, some mechanism, such as a funclet stack, is employed in order to maintain record of the nested funclets which are placed into the overlay space 421. All of the funclet calling is achieved by loading the particular resource identifier and using the identifier with the SysCallFunclet( ) routine to load the appropriate funclet. Then, the funclet is executed in the overlay space 421. A variety of techniques may be employed for the funclet stack, but in general the stack retains record of the order in which the funclets are called and the point of return into the particular funclet, when funclets are nested.

Furthermore, it is to be noted that the funclet overlay space 421 resides within the dynamic algorithm section 274 and the funclets are treated as satellite algorithms which may be readily changed during operation of the device. The main program and the SysCallFunclet routine are retained in the static algorithm section 272 since this programming typically does not change as readily as the programs retained in the dynamic algorithm section of RAM 433A. The prelude space 422 may be in the static section or the dynamic section. Generally, the prelude space 422 is in the static section, but in other embodiments, it may be in the dynamic section.

Figure 32:
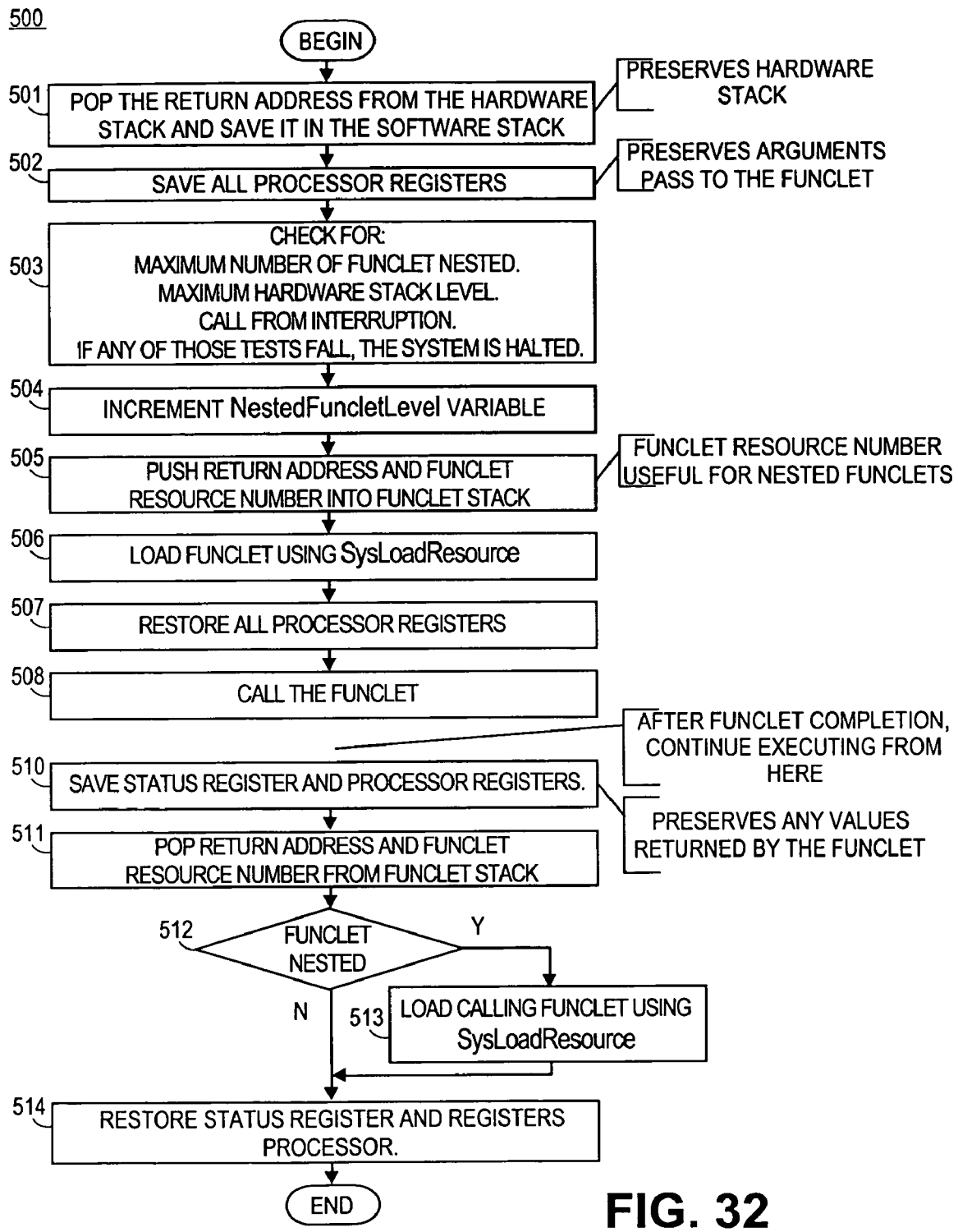
FIG. 32 is a flow diagram for a memory manager to manage the overlay for the memory system of FIG. 31.

Generally, a funclet manager may be employed in order to control the use of the prelude and the calling of the appropriate funclet into the overlay space 421. FIG. 32 illustrates one embodiment of a funclet manager that is initiated when the main program executes a code that causes it to jump to the prelude space to call the funclet. In the flow chart 500, the process begins by popping the return address from a hardware stack and saving it in the software stack (block 501) to preserve the hardware stack. Then, all the processor registers are saved in order to preserve arguments to pass to the funclet (block 502).

Subsequently, a check is made for a maximum number of nested funclets, maximum hardware stack level and a call from an interrupt. If any of those checks fail, the system is halted (block 503). Where nested funclets are present, a nested funclet level variable is incremented correspondingly (block 504). Next, the return address and the funclet resource number are pushed into the funclet stack (block 505). Next, the funclet is loaded into the overlay space (block 506). Subsequently, all the processor registers are restored (block 507) and the funclet is called (block 508). After the funclet has completed its operation, the execution continues with the status register and processor registers saved to preserve any values returned by the funclet (block 510). Then the return address and funclet resource number from the funclet stack are popped (block 511) and checked for a nested funclet (decision block 512). Where funclets are nested, the calling funclet is loaded (block 513). After all the nested funclets are returned the status register and the processor registers are restored and the funclet manager returns control to the next line in the program (block 514).

It is to be noted that the funclets may be used anywhere a function may be used. However, because of the overhead of having only one overlay space, the funclet usage is generally limited to functions used only in non-time critical operations of the system. That is, since only one overlay space is present in the RAM, some amount of funclet managing overhead is incurred in loading only a single funclet into the overlay space. Thus, the funclet usage as shown in FIG. 31 may be applied for most functions but generally used for non-time critical functions. For example, initialization of the device may be more suitable for funclet operation. Similarly, browsing a directory is also fit for a funclet operation. These operations are non-real time or non-time critical operations and may be performed using funclets in order to conserve memory space. Thus, it is generally understood that a trade-off exists between the use of a funclet in a single overlay space, so that less memory may be employed.

Aside from the use of less memory to perform a number of operations, the use of funclets has a number of other advantages. For example, funclets allow transparency to be maintained with the operation of the main program and, furthermore, funclets allow routines to be called without explicit compiler support. That is, the compiler of the main program need only compile the base program statement, such as power down headphones and need not identify the particular funclet which is to be called. Instead, the prelude for the funclet provides the resource identifier number that identifies that particular funclet to be called. Since the prelude space resides separately within the RAM, the preludes may be readily changed.

In another embodiment, the prelude space 422 operates as a programmable space, so that some or all of the prelude information within prelude space 422 may be modified. This arrangement allows considerable flexibility in programming the types and numbers of funclets that may be called from an external source such as external memory without the need to change the main program.

As noted in FIG. 31, the prelude loads the resource identifier, which it passes to the SysCallFunclet( ) routine. A variety of techniques may be employed to transfer the identifier to the SysCallFunclet( ) routine. In one example embodiment, a particular processor register is reserved to transfer the resource identifier value when execution is transferred from the prelude to the SysCallFunclet( ) routine as shown by arrow 432 in FIG. 31. It is to be noted however that a variety of other techniques may be employed to transfer the resource identifier number to the SysCallFunclet( ) routine.

Thus, by employing funclets which rely on preludes to identify which funclet is to be loaded into the overlay space, the overlaying is achieved while maintaining transparency to the programmer without explicit compiler support. Furthermore, by using a funclet to import program statements from external memory, significantly less RAM area may be employed to perform a function called by the main program. This overlay operation allows considerable programs to be stored in the external memory, which memory may be non-mapped in reference to the integrated circuit. Furthermore, in different embodiments, the funclet operation may be nested in which case a stack is used to stack and pop the funclet resource identifier and the return address to keep track of the nesting of the funclets.

Figure 33:
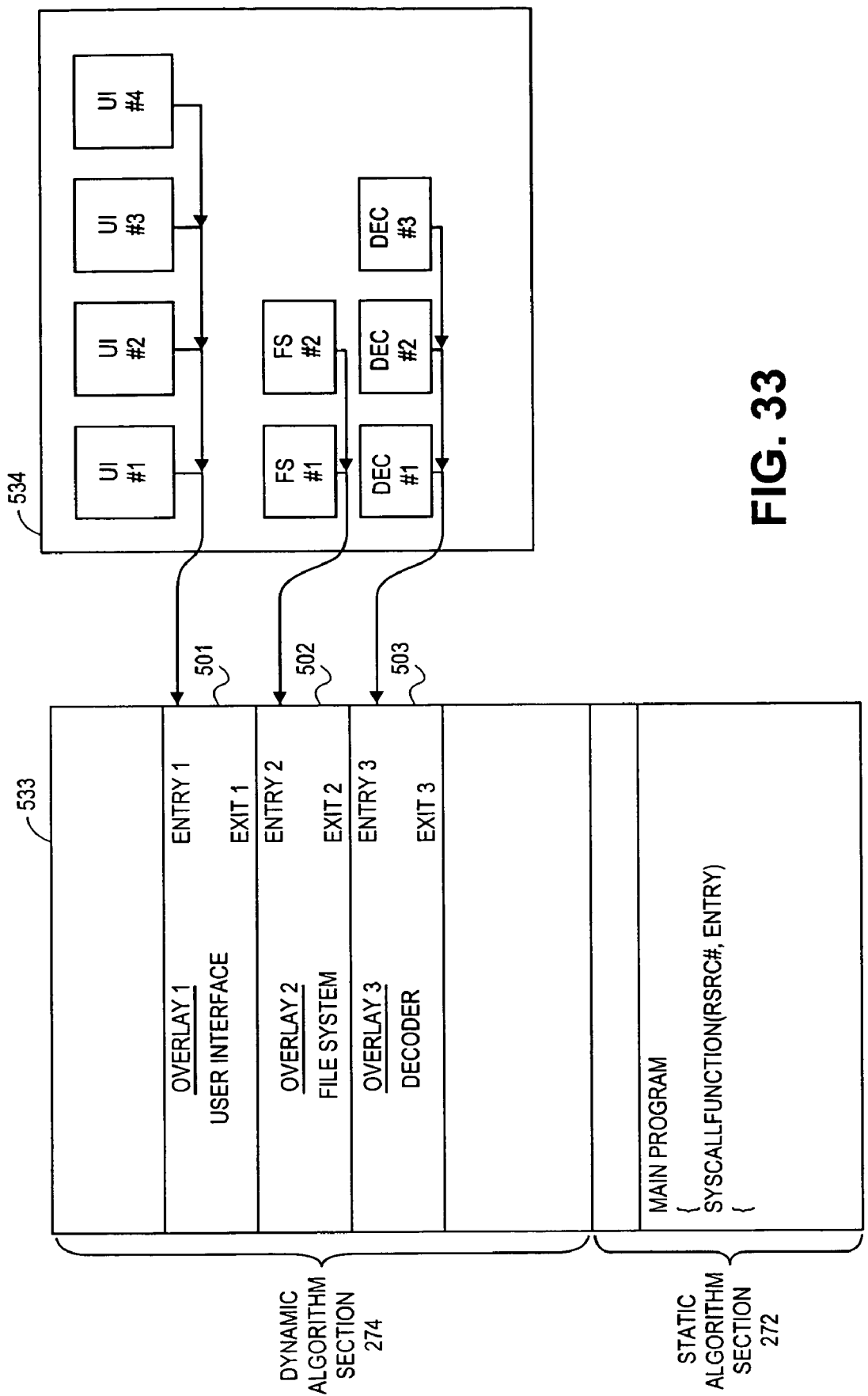
FIG. 33 is a diagram of an embodiment of a memory system in which multiple overlay spaces are implemented.

In some instances, it may be desirable to have more than one overlay space within an internal RAM. In some instances where the amount of memory present in RAM is not as limited as a situation where only one overlay space may be used, multiple overlay spaces may be implemented. Accordingly, in some embodiments a RAM may be able to employ more than one overlay space. As shown in FIG. 33, RAM 533 (equivalent to RAM 33) employs multiple overlay spaces. In the particular example three overlay spaces 501, 502, 503 are noted. The three overlay spaces are also identified as Overlay 1, Overlay 2 and Overlay 3. The main program, as well as the memory management, still reside within the static algorithm section 272 of RAM 533. The overlay spaces 501, 502 and 503 reside in the dynamic algorithm section 274 of RAM 533. Overlay spaces 501-503 are shown contiguous but need not be so. Accordingly, the individual overlay spaces are shown having an entry address and an exit address to designate the entry and exit points for each of the overlays. Thus, with Overlay 1 the entry point is noted as Entry 1 and the exit point is noted as Exit 1.

The plurality of overlay spaces may be configured in a variety of ways depending on the designer or the programmer of the system. In the particular embodiment shown, the overlay spaces 501-503 are configured to operate with a code bank of functionally similar programs which are overlaid into these spaces. For example, Overlay 1 is shown to store those functional programs related to user interface. Example Overlay 2 is shown to store programs pertaining to a file system. Example Overlay 3 is shown to store programs that relate to decoding functions. The various functional programs which are called to reside in the overlay spaces 501-503 reside within an external memory 534. It is to be noted that external memory is equivalent to earlier described memories, such as memory 16 and the memory described in reference to FIGS. 29-32. The external memory may be a flash memory. In other embodiments, memory 534 may be contained within the integrated circuit. As noted, the functional programs residing in memory 534 are designated to correspond to the functional tasks outlined in reference to the labels attributed to the overlay spaces 501-503.

Accordingly, user interface functional programs are loaded into the overlay space 501. Equivalently, file systems functional programs are loaded into the overlay space 502 and decoding functional programs are loaded into the overlay space 503. In this particular embodiment, only one functional program is placed into a particular overlay space. However, in other embodiments, a given functional overlay space, such as the user interface overlay space, may be subdivided so that more than one user interface functional program may be placed within overlay space 501. Accordingly, user interface overlay space 501 may be used to store one of the user interface functional programs from memory 534. Likewise, a file system program function is stored into the file system overlay space 502 and one of the decoding program functions is stored within the decoder overlay space 503. Although only one functional program may be stored in each of the overlay spaces, having multiple overlay spaces separated by functional tasks, allows a functional program from each of the categories to be stored within RAM 533.

An advantage of having multiple overlay spaces, in which the overlay spaces are configured according to a particular functional task, allows flexibility in swapping the various program functions in and out of the overlay space. For example, in one embodiment, user interface functional programs are swapped in and out much more often than a file system functional program. In this instance, the user interface functional programs may be overlayed without disrupting the other function categories. The multiple overlay spaces within memory 533 allows differentiation in the overlay operation based on commonality of the program function. The scheme allows multiple code banks of functional programs to be overlaid based on functionality. Thus, with multiple overlay spaces, a change in the selection of an user interface program need not necessarily cause an overlay to be performed over a file system or decode program resident in the other overlay spaces. It is to be noted that this multiple overlay scheme allows for more efficiency over the prelude-funclet arrangement that has only one overlay space. However, the trade off is in the added memory capacity for multiple overlay spaces.

Although a prelude-funclet configuration described earlier may be adapted for use with the multiple overlay scheme, there is now an added need to state the entry point for a given program. The unique resource identifiers are still used to identify the functional programs, but now the programs need an entry points for the particular overlay space selected. Since both the resource identifiers and the entry points are used, an embodiment of the invention associates both with a SysCallFunction( ) instruction. The SysCallFunction( ) includes a resource identifier and an entry point for the identified functional. The resource identifier is equivalent to the resource identifier described above with the use of preludes. Thus, the resource number identifies which of the functional programs to select from memory 534. The entry point contains the entry point (which may be the entry address) of the particular overlay space that the program function identified by the resource identifier is to be loaded into.

Similar to the operation of the overlay manager of FIG. 32, an overlay manager is also employed with the RAM 533. In one embodiment, the overlay manager sets the overlay memory spaces and stores the starting and ending addresses for the individual spaces. This information is stored, along with an identifier for the currently loaded overlay so that the entry points for each overlay space is known.

Figure 34:
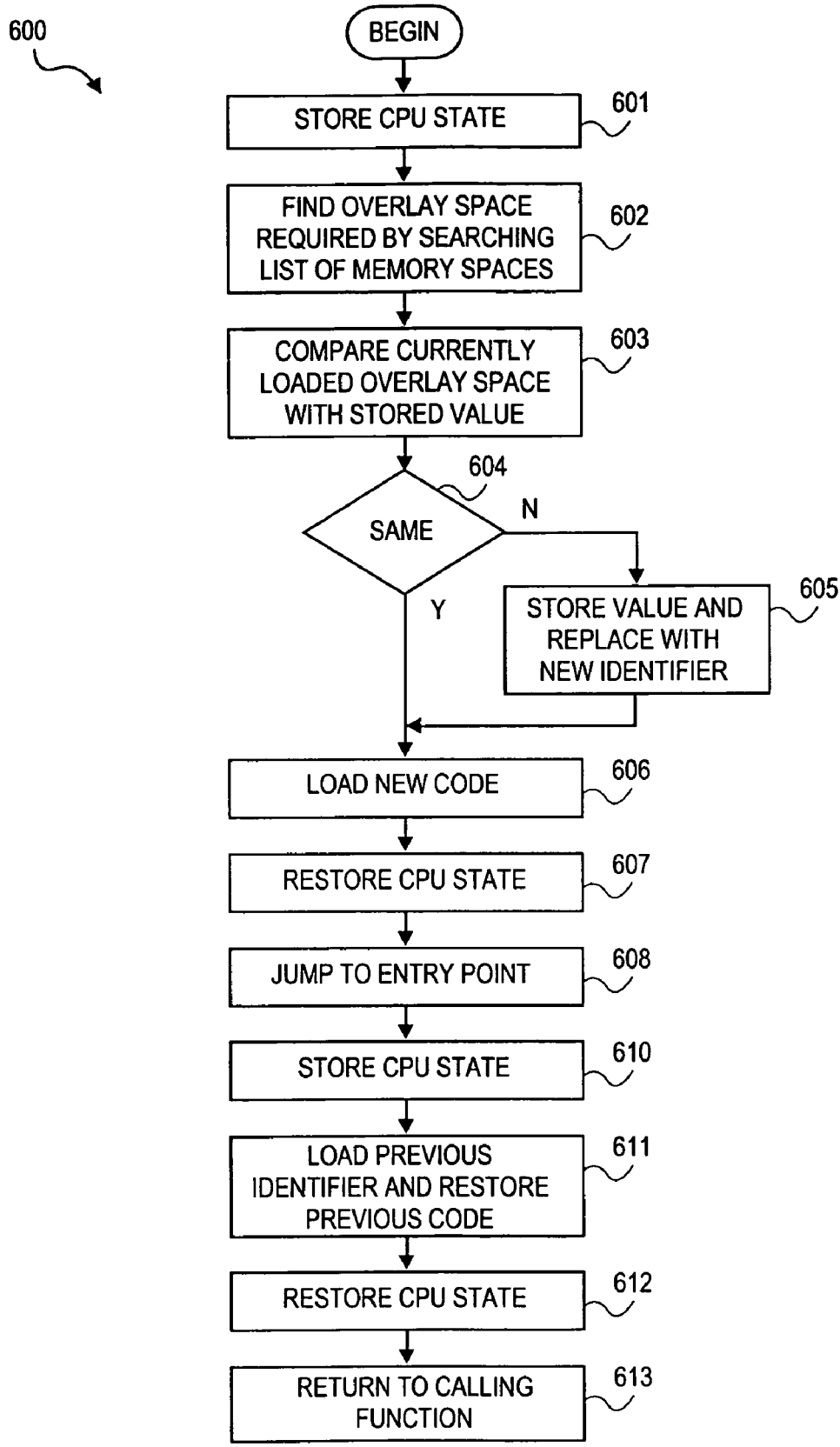
FIG. 34 is a flow diagram for a memory manager to manage the overlays for the memory system of FIG. 33.

The overlay manager operation is shown in the flow diagram 600 of FIG. 34. The overlay manager performs the function of storing off the CPU state (block 610), finding the overlaid memory space required by searching a list of memory spaces (block 602). Then, it compares the currently loaded overlay identifier with the stored value in an overlaid memory spaces structure (block 603). If different, then store the current value and replace with the new identifier (blocks 604, 605). New code is loaded from off-chip storage (block 606). Then, the CPU state is restored (block 607) and a jump taken to a routine to access the entry point (block 608).

When the function has executed and completed its processing, it will return to the overlay manager. The overlay manager will then store the CPU state (block 610), load the previous identifier and restore the previous code (block 611). Then, the CPU states are restored (block 612) and returned to the calling function (block 613). The overlay manager adds the functionality of performing overlays in multiple areas but without breaking any type checking provided by the compiler. However, in this instance, the SysCallFunction( ) is used to identify the resource identifier number of the functional program to be loaded and the entry point for the appropriate overlay space.

In an alternative embodiment, registers which are not used by a compiler may be used to pass parameters relating to the called overlay function. In this instance, the registers may pass the value, so that the identifier value need not be specified in the instruction or program statement, so that instead of a SysCallFunction( ), a different instruction or program statement specifying the registers may be used. Clearly, other embodiments may be implemented, which uses or passes information relating to the resource identifier to identify the selected function program and the overlay entry point when the function is loaded. Thus, an integrated circuit may implement a single overlay space or multiple overlay spaces. In some embodiments, both techniques may be implemented, with the differentiation being made based on the time critical nature of the function being executed.

The preceding discussion has presented a system-on-a-chip integrated circuit for use in a multi-function handheld device. It is to be noted that other embodiments may be derived from the teaching of the disclosed embodiments of the present invention, without deviating from the scope of the claims. Furthermore, some or all of the manipulative tasks performed by software programs may reside on a variety of media and the programs may be transferred by a variety of transmission means.

FIG. 35 is a schematic block diagram of the handheld device of FIGS. 1 and/or 2 consuming power and for further managing the power consumption to provide efficient battery use in accordance with the present invention. As shown, battery 14 produces a battery voltage that, via a switch, is coupled to the DC-to-DC converter 26. The DC-to-DC converter produces a system voltage 812 which may correspond to $V_{DD1}$ or $V_{DD2}$ as shown in FIGS. 1-4. The multimedia module 24 is powered via the system voltage 812 and produces at least one output as shown in FIGS. 2 and 3. In this illustration, only the headphone jack 52 output of the multimedia module is shown. As shown, a pair of headphones 810 may be coupled to the headphone jack 52.

In operation, the processing module 20 executes an algorithm, as well be further described with reference to FIGS. 38-42, to monitor the battery usage by the handheld device and to ensure that, once the battery has been as close to fully consumed as possible, the handheld device is fully shutdown or at least partially shutdown in a safe manner such that when the battery is replaced, the handheld device will come up correctly. To facilitate the efficient battery use algorithm, the processing module 20 monitors the battery voltage, the system voltage 812 and/or the current and/or voltage of each output of the multimedia module 24, in this example the headphone jack 52. Typically, the monitoring of an output of the multimedia module 24 will be detecting whether an overload condition, produced by a short circuit, and/or faulty equipment coupled thereto, results in an excessive amount of power being drawn by that particular output. For example, if the headphones were faulty such that they cause a short within the headphone jack 52, an overload condition would result. When an overload condition results, the processing module 20 disables the output for a predetermined period of time (e.g., one second to ten seconds). When the predetermined period of time expires, the processing module 20 enables the output again and resumes monitoring for an overload condition. If the overload condition persists, the output is again disabled. The disabling and enabling of the output may be done by a switch mechanism and/or by placing an output driver at a high impedance state to disable, for this example, the headphone jack 52. If the overload condition persists after several retries, the processing module 20 may cease to continue the retry and generate an error message for display on the handheld device indicating that the particular output is experiencing an overload condition.

The processing module 20 also monitors the system voltage 812 for a system low voltage condition. A system low voltage condition results when, for example, the desired system voltage 812 is 3.3 volts and drops from the 3.3 voltage by a few percentile or more. The tolerance for the low system voltage condition may be relatively small (e.g., a few percent voltage drop) based on how well the output(s) of the DC-to-DC converter 26 are regulated. The less well regulated the output supply of the DC-to-DC converter is, the greater the tolerance needs to be for the low system voltage condition. The drop in the system voltage 812 may include or exclude load transients that cause ripple on the output of the DC-to-DC converter 26.

When a low system voltage condition arises, it is indicative that the amount of power being consumed by the handheld device is beyond the remaining power capacity of the battery 14 but is not causing dangerously low output voltages to be generated, which might result in an unsafe shutdown of the handheld device. In this instance, the processing module may disable one or more of the outputs of the handheld device, store the current settings of operation of the handheld device (e.g., volume setting, which particular song is being played from an MP3 storage file, bass settings, treble settings, et cetera). Once these settings have been stored, the handheld device is shutdown such that when the battery is replaced and the handheld device is reactivated, the operation continues where it left off. Alternatively, the processing module may shutdown only a portion of the handheld device. For example, the processing module for the low system voltage condition may shutdown the headphone jack which is a primary consumer of power for the handheld device but still allow for data file transfers and/or other low power consuming activities.

The processing module 20 also monitors the battery voltage. Typically, if the battery voltage drops below a particular threshold, in light of the monitoring of the system voltage 812 and the overload condition of one or more outputs, it is indicative that the battery is not making adequate contact with the power terminals of the handheld device thus appearing as no battery is present. When this condition is detected, the processing module stores essential settings corresponding to the execution of a functional algorithm being performed and shuts down the device. In this manner, the algorithm is terminated in a predictable manner, as opposed to crashing the algorithm, thus, when the device is restarted, the algorithm can be predictably be restarted.

FIGS. 36 and 37 illustrate graphs regarding power consumption of a battery. As shown in FIG. 36, battery consumption is plotted versus battery voltage. As the battery consumption approaches 100%, the battery voltage drops. The goal of the processing module 20 of FIG. 35 is to take the battery consumption as close to 100% as possible without damaging the software stored within the handheld device, which may occur if the handheld device loses power and does not shutdown in a safe manner. As such, by monitoring multiple points within the handheld device, the device may be shutdown in a safe manner while taking the battery consumption as close to 100% as possible.

FIG. 37 is a graph that plots voltage versus power consumption for CMOS integrated circuits. As shown, as the supply voltage increases the power consumption of an IC increases nonlinearly, which increases consumption of the battery (i.e., reduces battery life). Thus, the processing module monitors the battery voltage as the battery consumption is increased and, based on the power consumption of an IC versus supply voltage curve, determines how much power of the battery is left to power the handheld device. Based on the known amount of power available in the battery versus how much power is consumed by each of the portions of the handheld device, including the outputs, the processing module may determine whether the entire handheld device needs to be shutdown or only a portion thereof when a low system voltage condition is detected.

Figure 38:
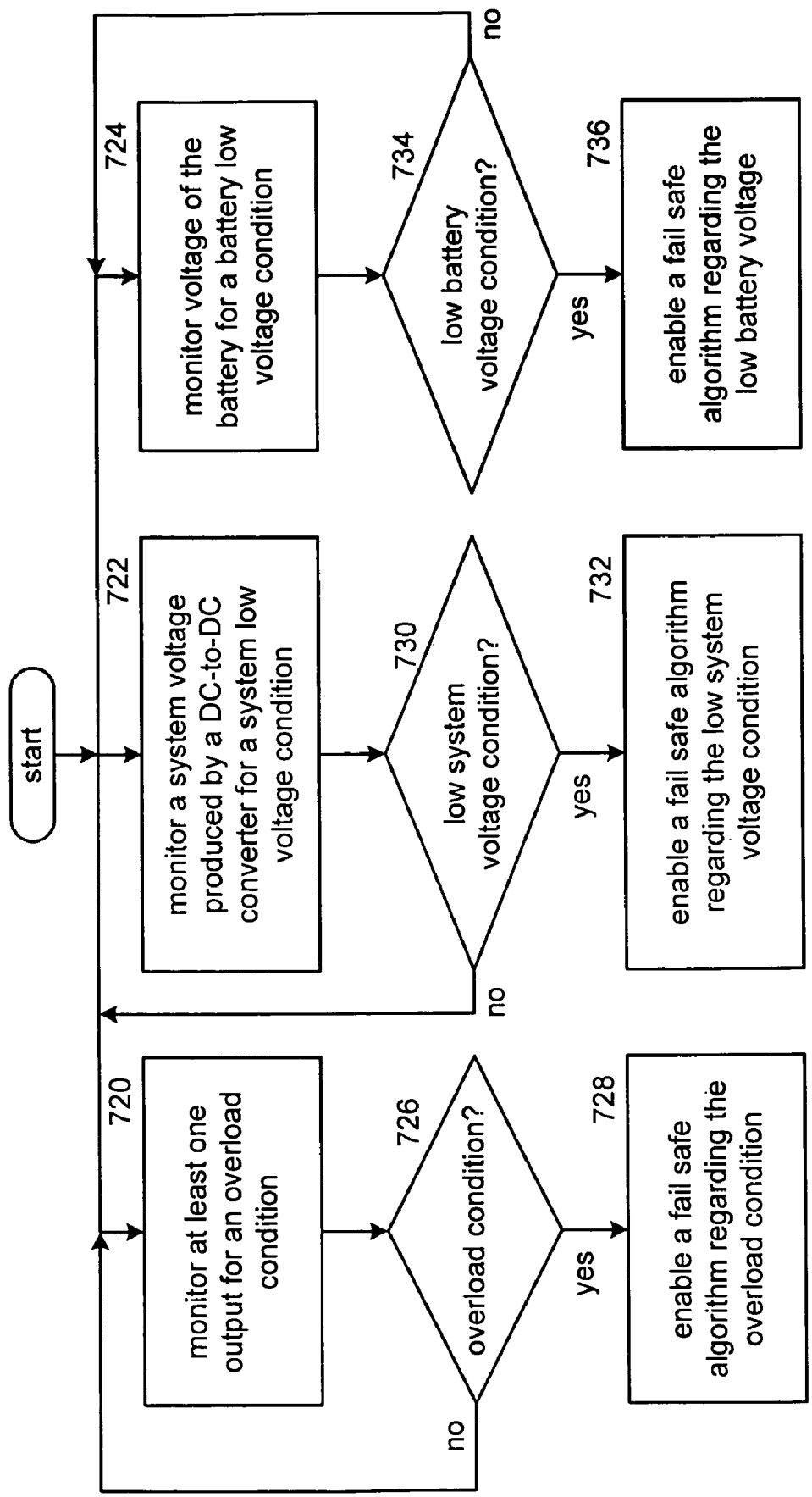
FIG. 38 is a logic diagram of a method for efficient battery use by a handheld device in accordance with the present invention.

FIG. 38 is a logic diagram of a method for efficient battery use by a handheld device. As shown, the process begins at Step 720, 722 and 724. As one of average skill in the art will appreciate, the efficient battery use by a handheld device may include one or more of the processing Steps 720, 722 and 724 and their associated steps.

At Step 720, at least one output of the handheld device is monitored for an overload condition. The process then proceeds to Step 726 where a determination is made as to whether an overload condition occurs. If not, the process loops back to the beginning of Step 720. Note that an overload condition may be detected by determining the output current provided to the particular output and when the output current exceeds a threshold indicating the overload condition.

If, however, an overload condition occurs, the process proceeds to Step 728 where a fail-safe algorithm regarding the overload condition is enabled. Such a fail-safe algorithm may be implemented as shown in FIG. 39.

At Step 738 of FIG. 39, the overload condition fail-safe algorithm begins by disabling the at least one output for a predetermined period of time (e.g., at least one second). The process then proceeds to Step 740 where after the expiration of the predetermined period of time, the at least one output is enabled. The process then proceeds to Step 742 where the at least one output is monitored again for an overload condition. If an overload condition persists, the processing module may generate an error message indicating the overload condition.

Returning to the logic diagram of FIG. 38, at Step 722 a processing module monitors a system voltage produced by the DC-to-DC converter for a system low voltage condition. The process then proceeds to Step 730 where determination is made as to whether the low system voltage condition exists. If not, the process reverts to Step 722. Note that the system low voltage condition may be determined by determining loading on one or more outputs of the DC-to-DC converter, determining the available power duration based on the loading and on the battery voltage, and, when the available power duration is less than the power available threshold, indicating the low system voltage condition. This was illustrated and discussed with reference to FIGS. 36 and 37.

If a low system voltage condition exists, the process proceeds to Step 732. At Step 732 the processing module enables a fail-safe algorithm regarding the low system voltage condition. The fail-safe algorithm for the low system voltage condition may be implemented as shown in FIG. 40 and/or FIG. 41.

In FIG. 40, the fail-safe algorithm begins at Step 744 where at least one output of the handheld device is disabled. The process then proceeds to Step 746 where the current settings correspond to execution of at least one functional algorithm is stored. The functional algorithm may be playing of an MP3 file, recording an MP3 file, data transfer et cetera. Thus, the particular settings of the current execution of this algorithm are stored such that the algorithm may be shutdown in a safe manner without corruption. The process then proceeds to Step 748 where the handheld device is shutdown.

FIG. 41 illustrates an alternate fail-safe algorithm for the low system voltage condition. The processing begins at Step 750 where a portion of the handheld device is disabled. The process then proceeds to Step 752 where current settings corresponding to the execution of at least one functional algorithm related to the particular portion that has been disabled, are stored. The process then proceeds to Step 754 where the operation of the handheld device continues in a limited, low power consumption mode.

Returning to the logic diagram of FIG. 38, at Step 724, the processing module monitors the voltage of the battery for a battery low voltage condition. The process then proceeds to Step 734 where a determination is made as to whether a low battery voltage condition exists. If not, the process loops back to Step 724. If, however, a low battery voltage condition exists, the process proceeds to Step 736 where a fail-safe algorithm regarding the low battery voltage is enabled.

FIG. 42 illustrates an example of a fail-safe algorithm for a low battery voltage condition. The process begins at Step 756 where essential current settings correspond to execution of at least one algorithm are stored. The process then proceeds to Step 758 where the handheld device is shutdown.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

We claim:

1. A circuit for use by a multifunction handheld device that is coupleable to an audio output device, the multifunction handheld device including a color video display device and a host interface that is coupleable to a host device via a universal serial bus port, the circuit comprises:
   a processing module;
   a memory interface, operably coupled to the processing module and a memory that stores a plurality of digitally formatted files, and that stores operational instructions that cause the processing module to:
      receive a first digitally formatted file of the plurality of digitally formatted files from the host device when coupled to the host device via the host interface and store the first digitally formatted file in the memory, wherein the first digitally formatted file includes a compressed audio file;
      receive a second digitally formatted file of the plurality of digitally formatted files from a host device when coupled to the host device via a host interface and store the second digitally formatted file in the memory, wherein the second digitally formatted file includes a compressed video file;
      playback a selected one of the plurality of digitally formatted files, the playback including the generation of an audio output signal for the audio output device, when the first digitally formatted file is selected, and the playback including rendering the selected one of the digitally formatted files for the color video display device, when the second digitally formatted file is selected;
      power the handheld device from the host device when the handheld device is coupled to the host device via the host interface;
      monitor for a low voltage condition produced by a low battery voltage;
      when the low voltage condition is detected, enabling a first fail safe algorithm to:
         disable the output of the audio output signal;
         store at leant one audio setting; and
         shutdown the multifunction handheld device.

2. The circuit of claim 1 wherein the memory further stores operational instructions that cause the processing module to:
   fastforward the playback of the selected one of the plurality of digitally formatted files in response to a user fastforward command.

3. The circuit of claim 1 wherein the memory further stores operational instructions that cause the processing module to:
   capturing a video recording from a video capture device coupled thereto; and process the video recording into a third digitally formatted file for storage in the memory.

4. The circuit of claim 1 wherein the second digitally formatted file is formatted as MPEG data.

5. The circuit of claim 1 wherein the memory further stores operational instructions that cause the processing module to:
   receive an analog audio signal from a radio tuner.

6. The circuit of claim 5 wherein the memory further stores operational instructions that cause the processing module to:
   generate digital input data from the analog audio signal; and
   compress the digital input data to form a third digitally formatted file of the plurality of digitally formatted files.

7. The circuit of claim 1 wherein, when the handheld device is reactivated, the memory further stores operational instructions that cause the processing module to enable the playback of the selected one of the plurality of digitally formatted files to resume where the playback left off.

8. The circuit of claim 7 wherein the at least one audio setting includes a bass setting.

9. The circuit of claim 1 wherein the at least one audio setting includes a volume setting.

10. The circuit of claim 9 wherein the at least one audio setting includes a treble setting.

11. The circuit of claim 1 wherein the playback of the selected one of the plurality of digitally formatted files includes playback of a particular song, and the at least one audio setting includes the particular song.

12. The circuit of claim 1 wherein the memory further stores operational instructions that cause the processing module to:
   generate a third digitally formatted file of the plurality of digitally formatted files by digitally recording a voice sample and store the third digitally formatted file in the memory.

13. The circuit of claim 1 further comprising a DC-to-DC converter for supplying at least one supply voltage to the circuit.

14. The circuit of claim 13 wherein the DC-to-DC converter supplies a plurality of supply voltages to the circuit.

15. The circuit of claim 1 wherein the memory further stores operational instructions that cause the processing module to:

generate a third digitally formatted file of the plurality of digitally formatted files by digitally recording an audio input signal and store the third digitally formatted file in the memory.

16. A circuit for use by a multifunction handheld device that is coupleable to an audio output device, the multifunction handheld device including a color video display device and a host interface that is coupleable to a host device, the circuit comprises:
a processing module;
a memory interface, operably coupled to the processing module and a memory that stores a plurality of digitally formatted files, and that stores operational instructions that cause the processing module to:
receive a first digitally formatted file of the plurality of digitally formatted files from the host device when coupled to the host device via the host interface and store the first digitally formatted file in the memory, wherein the first digitally formatted file includes a compressed audio file;
receive a second digitally formatted file of the plurality of digitally formatted files from a host device when coupled to the host device via a host interface and store the second digitally formatted file in the memory, wherein the second digitally formatted file includes a compressed video file;
playback a selected one of the plurality of digitally formatted files, the playback including the generation of an audio output signal for the audio output device, when the first digitally formatted file is selected, and the playback including rendering the selected one of the digitally formatted files for the color video displays device, when the second digitally formatted file is selected;
monitor for a low voltage condition produced by a low battery voltage;
when the low voltage condition is detected, enabling a first fail safe algorithm to:
disable the output of the audio output signal;
store at least one audio setting; and
shutdown the multifunction handheld device.

17. The circuit of claim 16 wherein the memory further stores operational instructions that cause the processing module to:
fastforward the playback of the selected one of the plurality of digitally formatted files in response to a user fastforward command.

18. The circuit of claim 16 wherein the memory further stores operational instructions that cause the processing module to:
capturing a video recording from a video capture device coupled thereto; and
process the video recording into a third digitally formatted file for storage in the memory.

19. The circuit of claim 16 wherein the second digitally formatted file is formatted as MPEG data.

20. The circuit of claim 16 wherein, when the handheld device is reactivated, the memory further stores operational instructions that cause the processing module to enable the playback of the selected one of the plurality of digitally formatted files to resume where the playback left off.

21. The circuit of claim 16 wherein the at least one audio setting includes a volume setting.

22. The circuit of claim 21 wherein the at least one audio setting includes a bass setting.

23. The circuit of claim 22 wherein the at least one audio setting includes a treble setting.

24. The circuit of claim 16 wherein the playback of the selected one of the plurality of digitally formatted files includes playback or a particular song, and the at least one audio setting includes the particular song.

25. The circuit of claim 16 wherein the host interface includes a universal serial bus (USB) encoder and USB decoder and wherein memory further includes operational instructions that cause the processing module to power the handheld device from the host device when the handheld device is coupled to the host device via the host interface.

26. The circuit of claim 16 wherein the memory further stores operational instructions that cause the processing module to:
generate a third digitally formatted file of the plurality of digitally formatted files by digitally recording a voice sample and store the third digitally formatted file in the memory.

27. The circuit of claim 16 wherein the host interface includes a wireless communication link for communicating with the host device via a wireless local area network protocol.

28. The circuit of claim 16 further comprising a DC-to-DC converter for supplying a plurality of supply voltages to the circuit.

29. The circuit of claim 16 wherein the memory further stores operational instructions that cause the processing module to: receive an analog audio signal from a radio tuner.

30. The circuit of claim 29 wherein the memory further stores operational instructions that cause the processing module to:
generate digital input data from the analog audio signal; and
compress the digital input data to form a third digitally formatted file of the plurality of digitally formatted files.

31. The circuit of claim 16 wherein the memory further stores operational instructions that cause the processing module to:
generate a third digitally formatted file of the plurality or digitally formatted files by digitally recording an audio input signal and store the third digitally formatted file in the memory.

32. A circuit for use by a multifunction handheld device that is coupleable to an audio output device, the multifunction handheld device including a color video display device and a host interface that is coupleable to a host device, the circuit comprises:
a processing module;
a memory interface, operably coupled to the processing module and a memory that stores a plurality of digitally formatted files, and that stores operational instructions that cause the processing module to:
receive a first digitally formatted file of the plurality of digitally formatted files from the host device when coupled to the host device via the host interface and store the first digitally formatted file in the memory, wherein the first digitally formatted file includes a compressed audio file;
capturing a video recording from a video capture device coupled thereto;
process the video recording into a second digitally formatted file and store the second digitally formatted file in the memory;
playback a selected one of the plurality of digitally formatted files, the playback including the generation of an audio output signal for the audio output device, when the first digitally formatted file is selected, and the playback including rendering the selected one of the digitally formatted files for the color video display device, when the second digitally formatted file is selected;

monitor for a low voltage condition produced by a low battery voltage;

when the low voltage condition is detected, enabling a first fail safe algorithm to:
- disable the output the audio output signal;
- store at least one audio setting; and
- shutdown the multifunction handheld device.

33. The circuit of claim 32 wherein the memory further stores operational instructions that cause the processing module to:
fastforward the playback of the selected one of the plurality of digitally formatted files in response to a user fastforward command.

34. The circuit of claim 32 wherein the memory further stores operational instructions that cause the processing module to:
transfer the second digitally formatted file to the host device via the host interface.

35. The circuit of claim 32 wherein the second digitally formatted file is formatted as MPEG data.

36. The circuit of claim 32 wherein, when the handheld device is reactivated, the memory further stores operational instructions that cause the processing module to enable the playback of the selected one of the plurality of digitally formatted files to resume where the playback left off.

37. The circuit of claim 32 wherein the at least one audio setting includes a volume setting.

38. The circuit of claim 37 wherein the at least one audio setting includes a bass setting.

39. The circuit of claim 38 wherein the at least one audio setting includes a treble setting.

40. The circuit of claim 32 wherein the playback of the selected one of the plurality of digitally formatted files includes playback of a particular song, and the at least one audio setting includes the particular song.

41. The circuit of claim 32 wherein the host interface includes a universal serial bus (USB) encoder and USB decoder and wherein memory further includes operational instructions that cause the processing module to power the handheld device from the host device when the handheld device is coupled to the host device via the host interface.

42. The circuit of claim 32 wherein the memory further stores operational instructions that cause the processing module to:
generate a third digitally formatted file of the plurality of digitally formatted files by digitally recording a voice sample and store the third digitally formatted file in the memory.

43. The circuit of claim 32 wherein the host interface includes a wireless communication link for communicating with the host device via a wireless local area network protocol.

44. The circuit of claim 32 further comprising a DC-to-DC converter for supplying at least one supply voltage to the circuit.

45. The circuit of claim 44 wherein the DC-to-DC converter supplies a plurality of supply voltages to the circuit.

46. The circuit of claim 32 wherein the memory includes one of a flash memory and a disk memory.

47. The circuit of claim 32 wherein the memory further stores operational instructions that cause the processing module to:
receive an analog audio signal from a radio tuner.

48. The circuit of claim 47 wherein the memory further stores operational instructions that cause the processing module to:
generate digital input data from the analog audio signal; and
compress the digital input data to form a third digitally formatted file of the plurality of digitally formatted files.

49. The circuit of claim 32 wherein the memory further stores operational instructions that cause the processing module to:
generate a third digitally formatted file of the plurality of digitally formatted files by digitally recording an audio input signal and store the third digitally formatted file in the memory.

* * * * *

UNITED STATES PATENT AND TRADEMARK OFFICE
CERTIFICATE OF CORRECTION

PATENT NO. : 7,555,410 B2 Page 1 of 1
APPLICATION NO. : 11/494798
DATED : June 30, 2009
INVENTOR(S) : Daniel Mulligan et al.

It is certified that error appears in the above-identified patent and that said Letters Patent is hereby corrected as shown below:

Column 36, line 15, "leant" should be changed to --least--.

Signed and Sealed this

Sixteenth Day of February, 2010

David J. Kappos
*Director of the United States Patent and Trademark Office*